United States Patent [19]
Tatsuta

[11] Patent Number: 5,943,448
[45] Date of Patent: Aug. 24, 1999

[54] INFORMATION REPRODUCING SYSTEM, INFORMATION RECORDING MEDIUM, AND INFORMATION RECORDING APPARATUS

[75] Inventor: Seiji Tatsuta, Hachioji, Japan

[73] Assignee: Olympus Optical Co., Ltd., Tokyo, Japan

[21] Appl. No.: 08/764,136

[22] Filed: Dec. 12, 1996

[30] Foreign Application Priority Data

Dec. 25, 1995 [JP] Japan ...................................... 7-336800

[51] Int. Cl.⁶ .............................. G06K 9/38; G06T 7/60
[52] U.S. Cl. ........................................... 382/270; 382/286
[58] Field of Search ..................................... 382/270, 286, 382/312, 321, 317, 287; 358/465, 466

[56] References Cited

FOREIGN PATENT DOCUMENTS 0 670 555 A1  9/1995  European Pat. Off. .
0 717 398 A3  6/1996  European Pat. Off. .
59-61383      4/1984  Japan .

*Primary Examiner*—Scott Rogers
*Attorney, Agent, or Firm*—Frishauf, Holtz, Goodman, Langer & Chick, P.C.

[57] ABSTRACT

A binarizing section generates binarized data from an image signal of a dot code on an information recording medium read by a code reading section. The binarizing section has a reference dot detection section, a dot area measuring section, a threshold value modifying section and a threshold value determining section. The reference dot detection section binarizes the image signal with a predetermined threshold value prior to generating binarized data to detect a reference dot from a binarized code image. The dot area measuring section measures the area of the reference dot detected by the reference dot detection section. The threshold value modifying section modifies the threshold value for binarization in such a manner that the area measured by the dot area measuring section approaches a predetermined target value. The threshold value determining section binarizes the image signal with the threshold value modified by the threshold value modifying section.

24 Claims, 50 Drawing Sheets

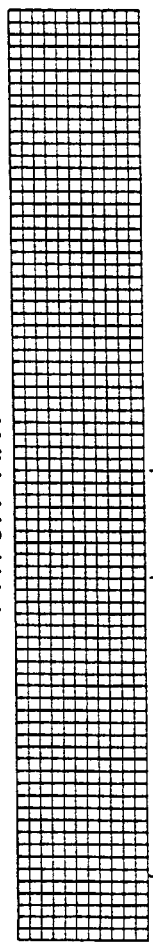
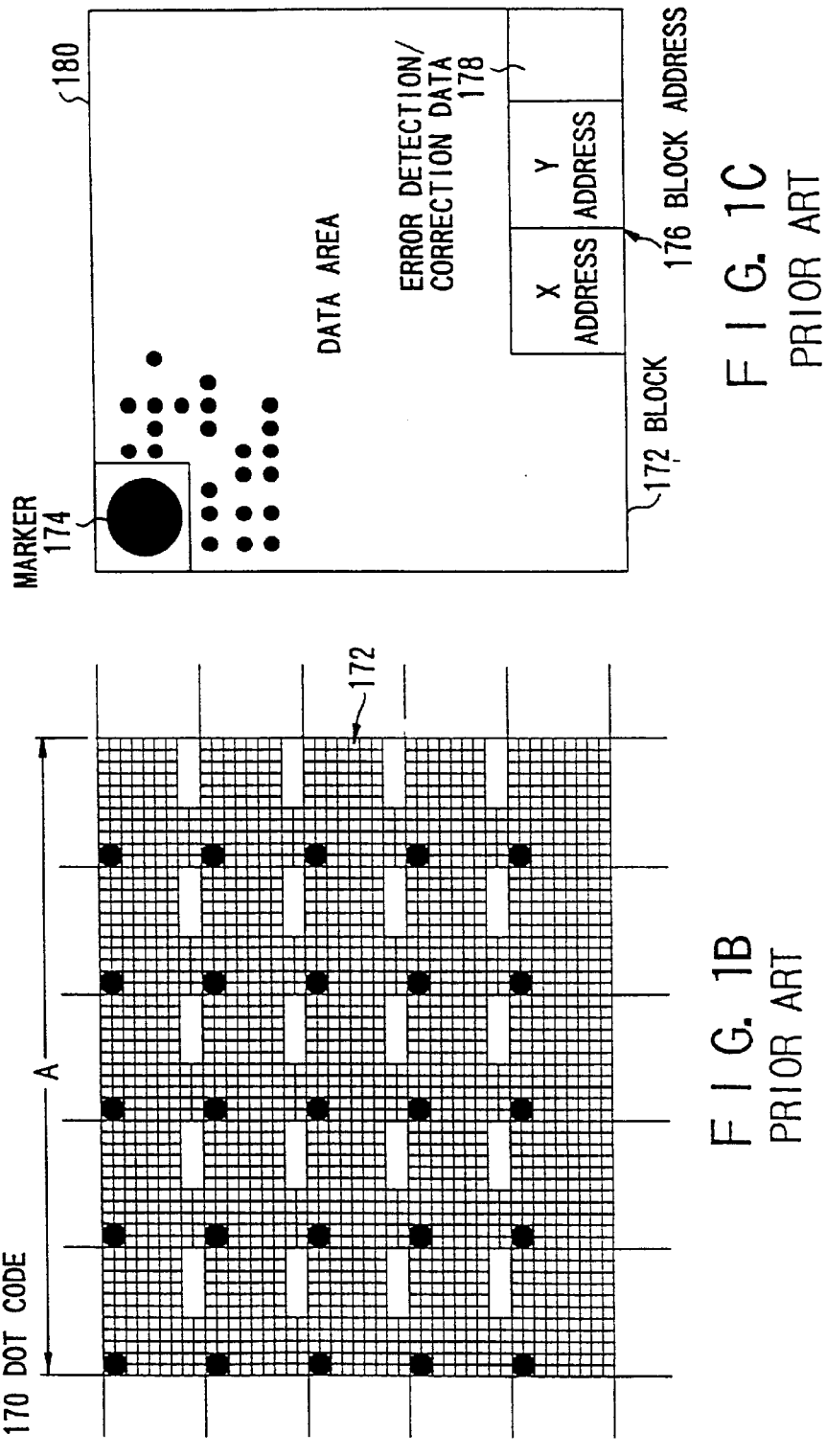

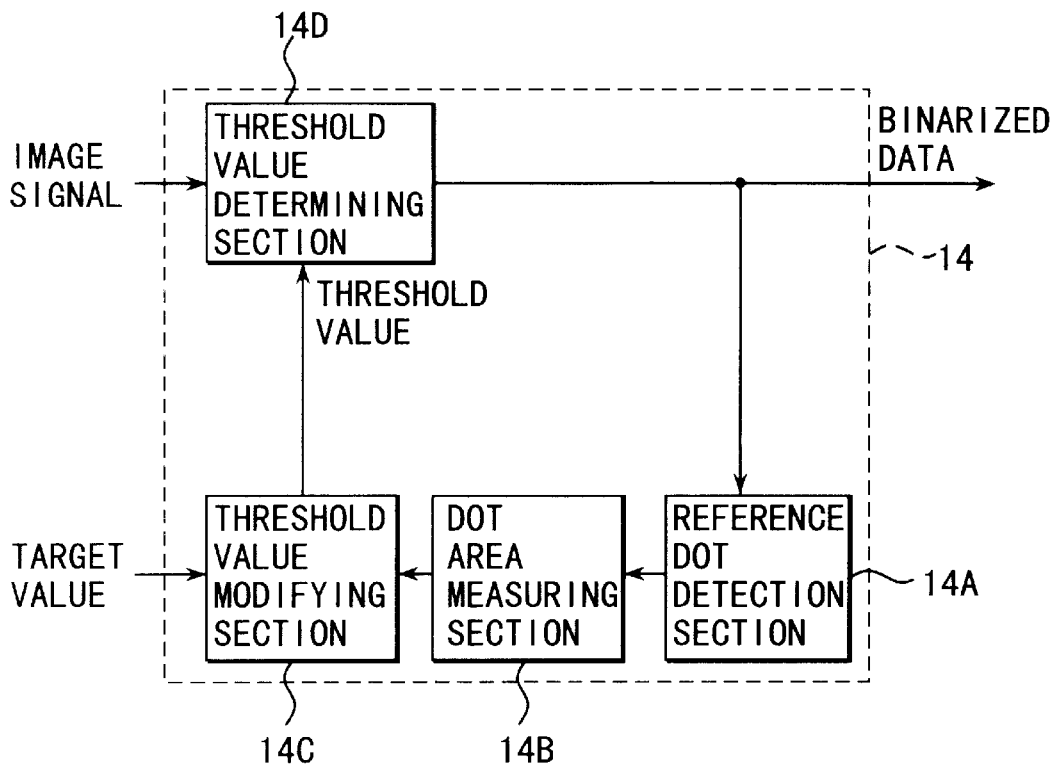
F I G. 6A
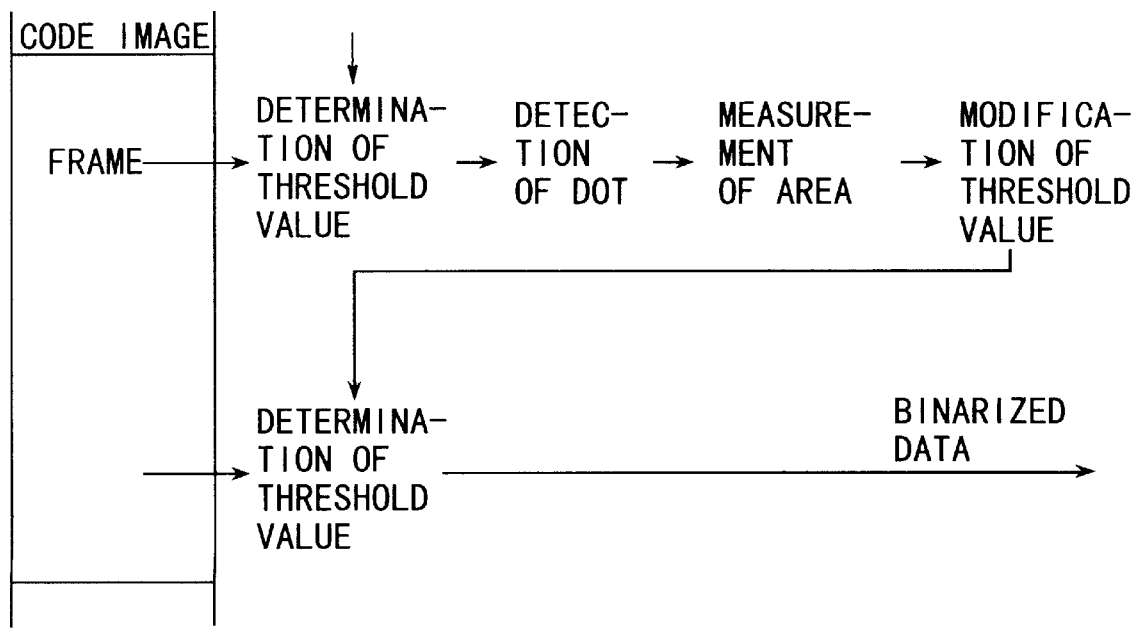
F I G. 6B

BLACK PIXEL: $P_1(x,y), P_2(x+1,y), P_3(x,y+1),$
$P_4(x+1,y+1), P_5(x+2,y+1),$
$P_6(x+1,y+2)$

AREA (=TOTAL SUM OF BLACK PIXELS): 6

CENTROID:
$$C = \frac{1}{6}\sum_{n=1}^{6} P_1 = (x+\frac{5}{6}, y+\frac{5}{6})$$

$$S' = \left(\frac{\ell}{L}\right)^2 S$$
S: AREA BEFORE CORRECTION  $\ell$: DOT INTERVAL
S': AREA AFTER CORRECTION  L: REFERENCE DOT INTERVAL

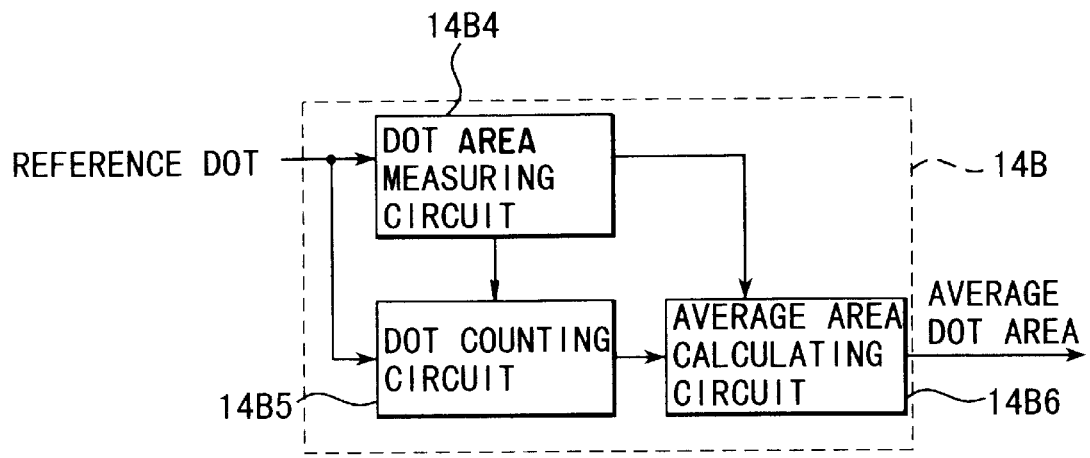
F I G. 20
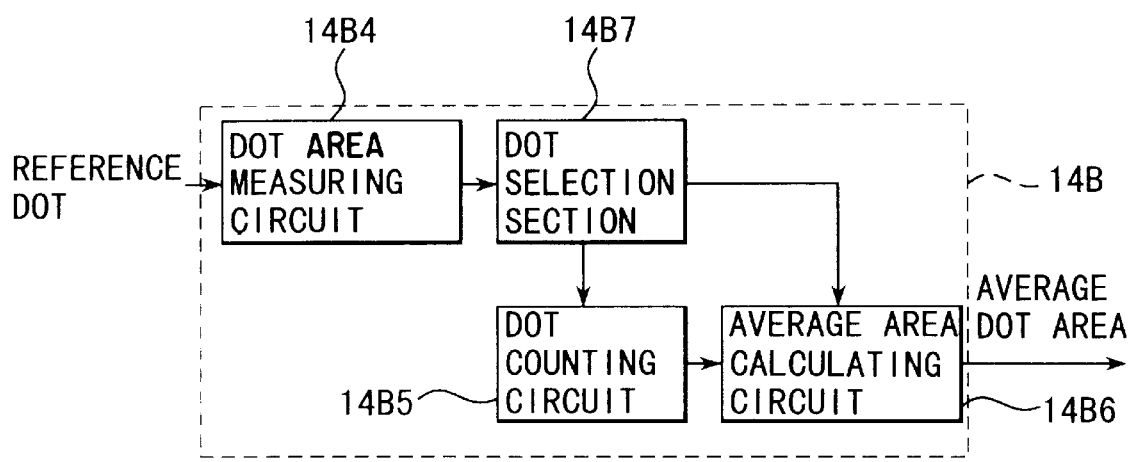
F I G. 21

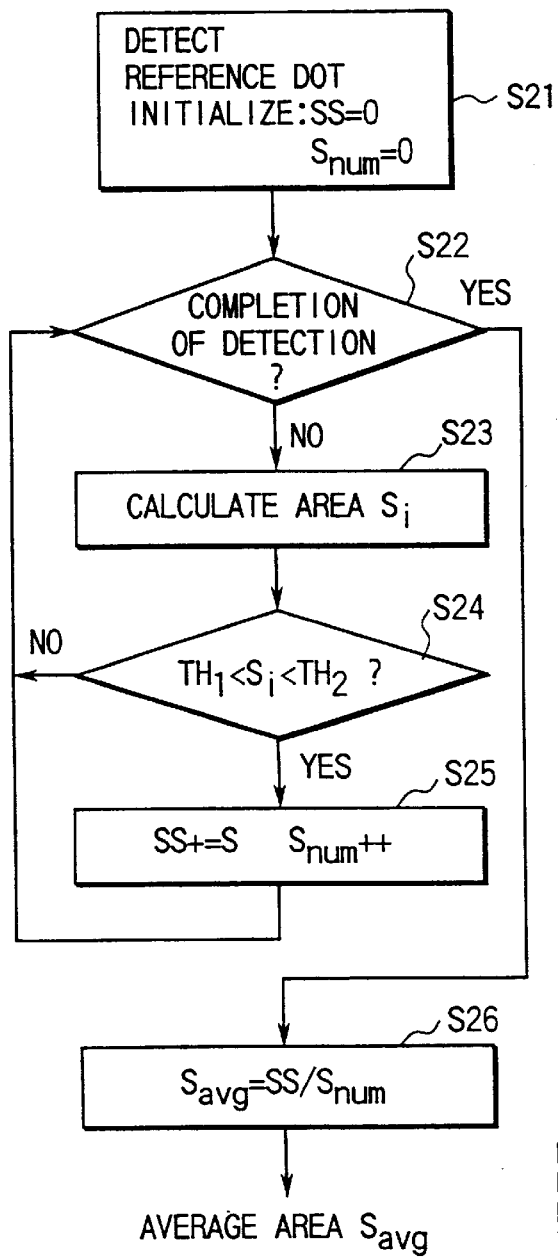
FIG. 22
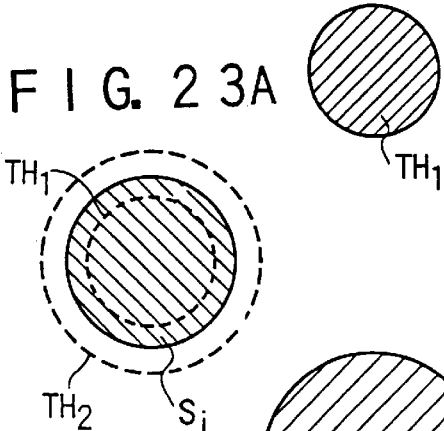
FIG. 23A
FIG. 23C
FIG. 23B
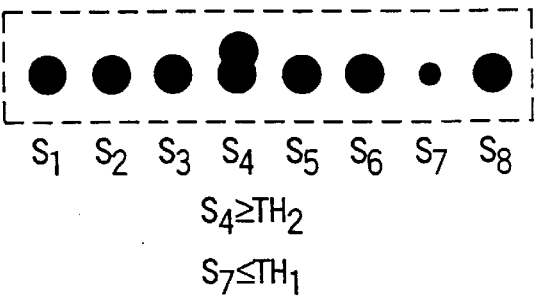
$S_4 \geq TH_2$
$S_7 \leq TH_1$
$$S = \frac{S_1+S_2+S_3+S_5+S_6+S_8}{6}$$
FIG. 24

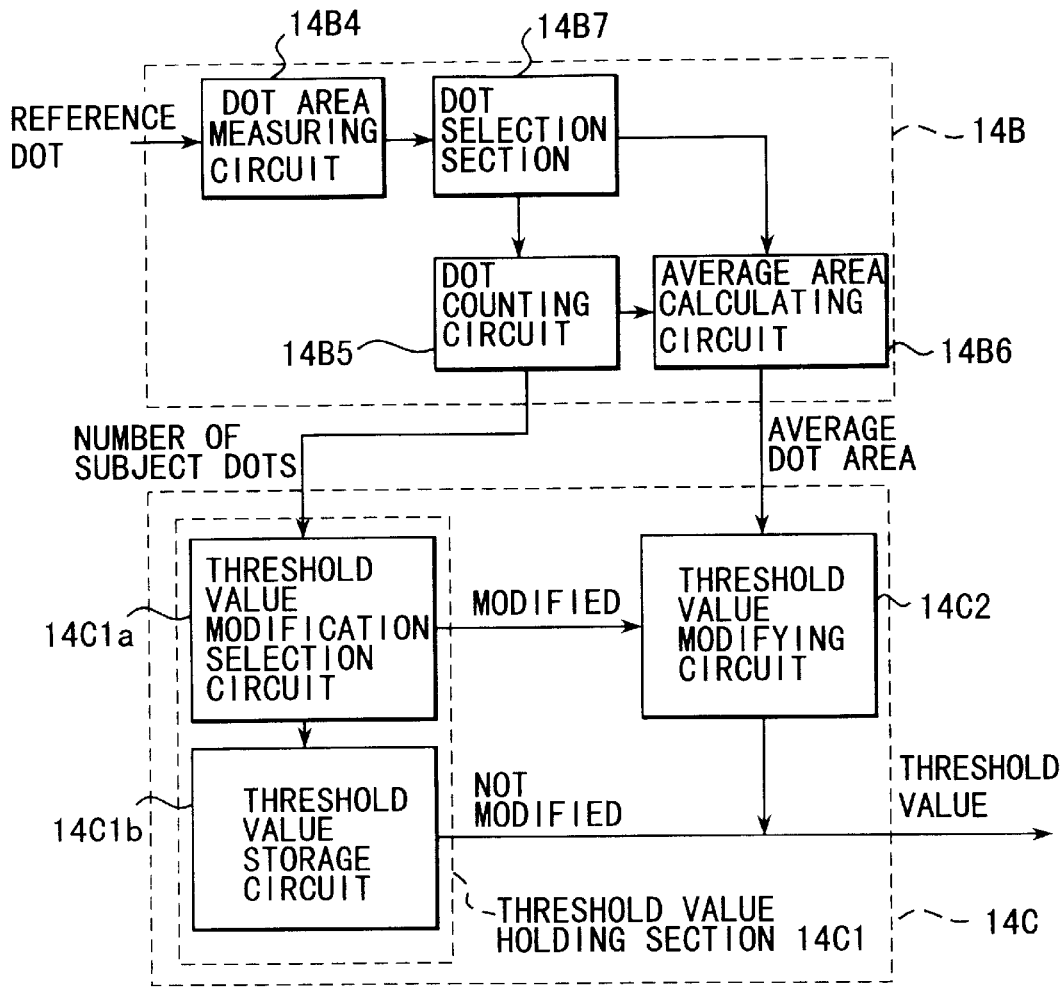
F I G. 25
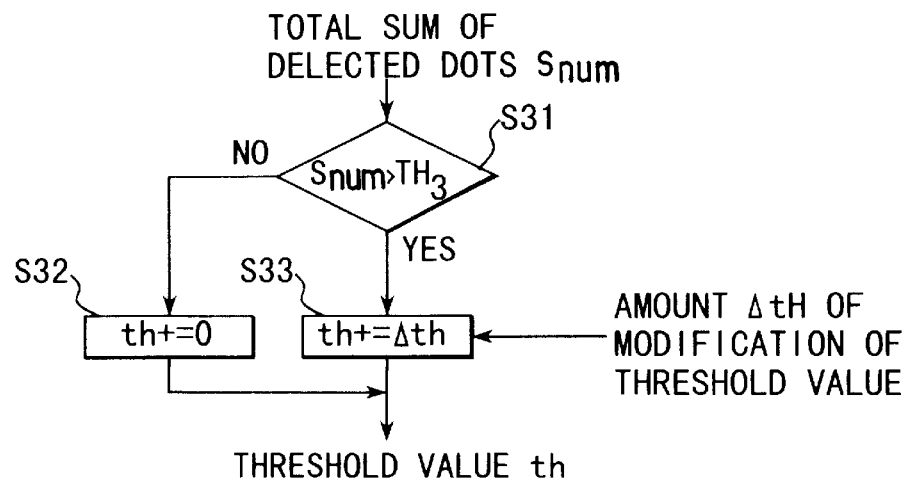
F I G. 26

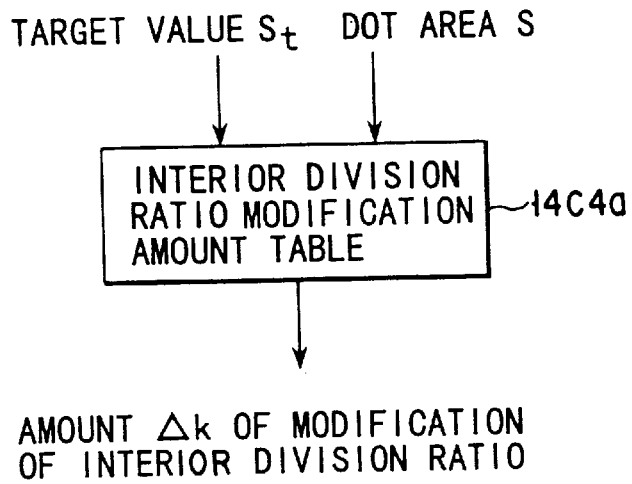

TARGET VALUE $S_t$   DOT AREA S

↓ ↓

INTERIOR DIVISION RATIO MODIFICATION AMOUNT TABLE — 14C4a

↓

AMOUNT $\Delta k$ OF MODIFICATION OF INTERIOR DIVISION RATIO

F I G. 36A

INTERIOR DIVISION RATIO
MODIFICATION AMOUNT TABLE 14C4a

| $S_t$ \ S | 6.0 | 6.5 | 7.0 | 7.5 | 8.0 | 8.5 |
|---|---|---|---|---|---|---|
| 6.0 |  | −0.06 | −0.13 | −0.20 | −0.28 | −0.37 |
| 6.5 | 0.05 |  | −0.07 | −0.14 | −0.21 | −0.29 |
| 7.0 | 0.11 | 0.06 |  | −0.08 | −0.15 | −0.22 |
| 7.5 | 0.17 | 0.12 | 0.07 |  | −0.09 | −0.16 |
| 8.0 | 0.24 | 0.18 | 0.13 | 0.08 |  | −0.10 |
| 8.5 | 0.32 | 0.25 | 0.19 | 0.14 | 0.09 |  |

IF MEASURED DOT AREA IS 7.0 AND TARGET VALUE IS 8.0, THE AMOUNT OF MODIFICATION OF INFERIOR DIVISION RATIO IS $\Delta k = 0.13$ IN ACCORDANCE WITH THE TABLE

F I G. 36B

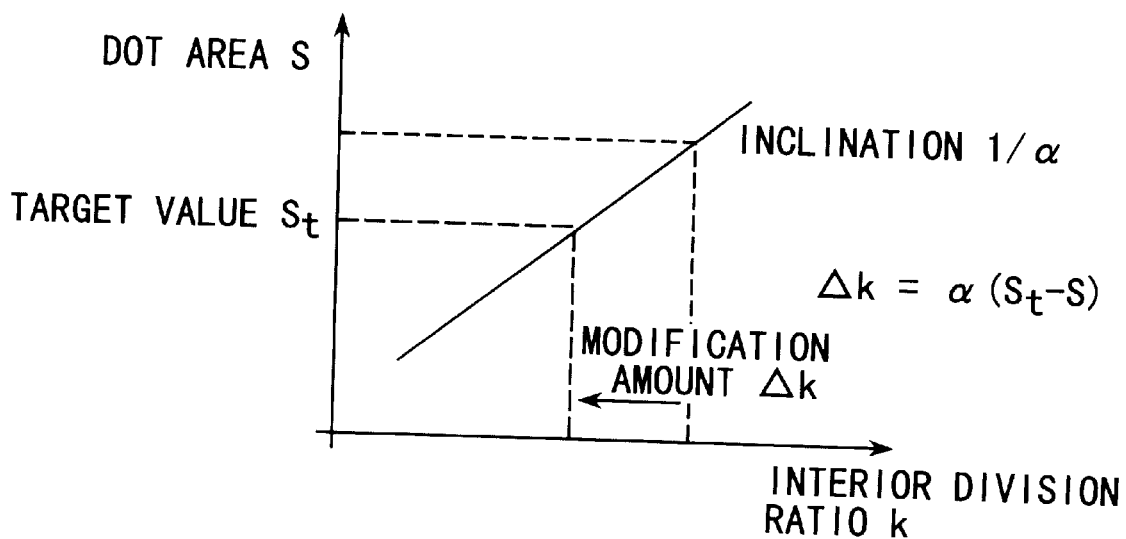
F I G. 37
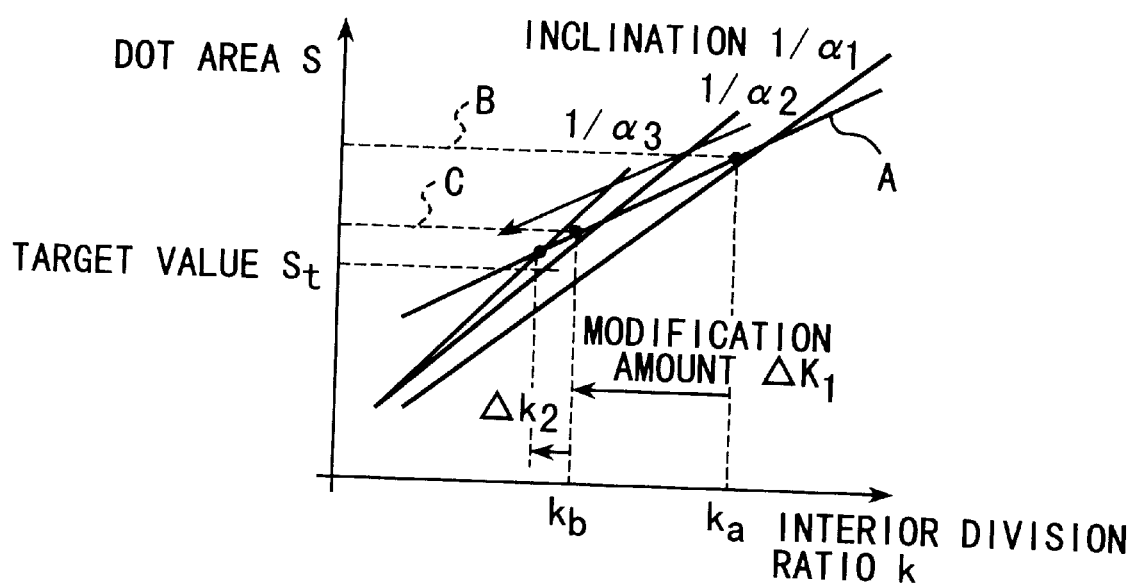
F I G. 38

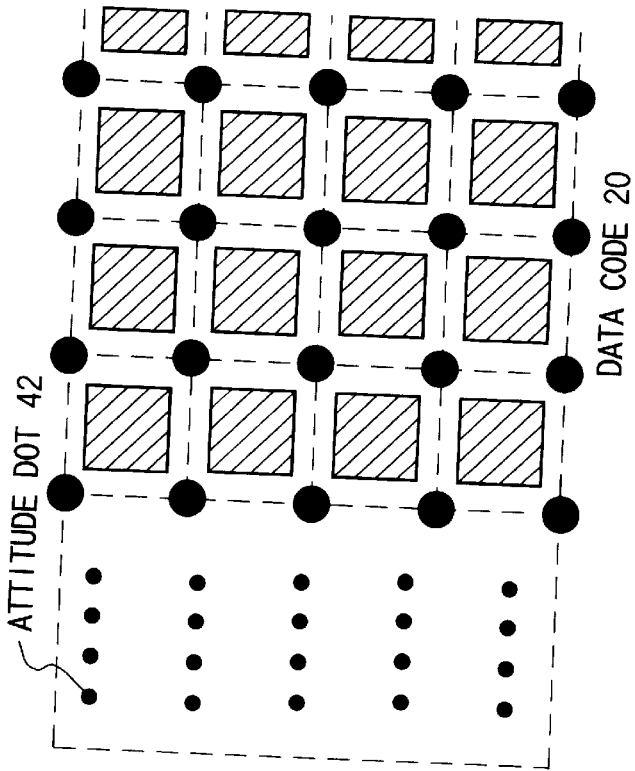
F I G. 47
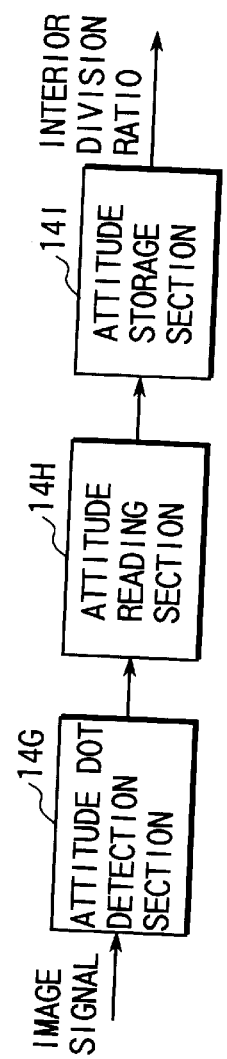
F I G. 48
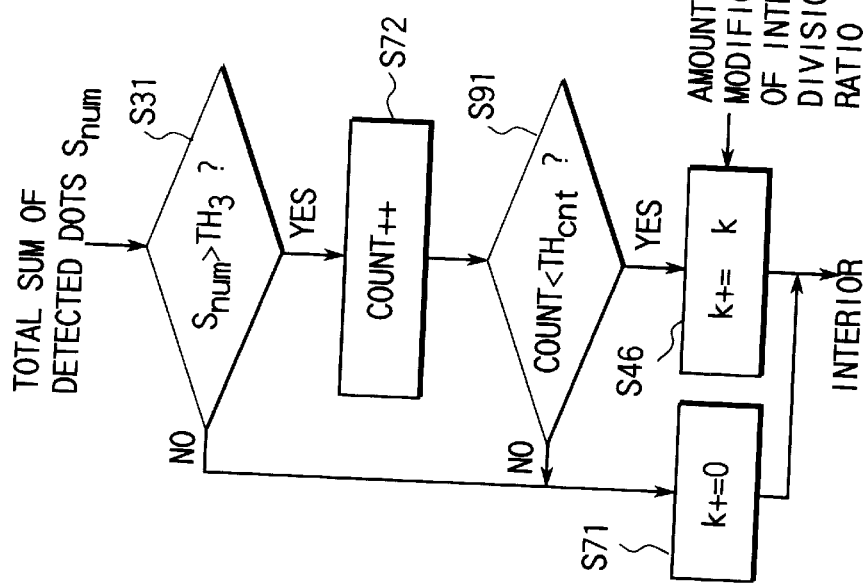
F I G. 46

| max=180 th=90 | max=190 th=95 | max=200 th=100 | max=210 th=105 |
| --- | --- | --- | --- |
| max=182 th=91 | max=193 th=92 | max=205 th=103 | max=212 th=106 |
| max=178 th=89 | max=187 th=94 | max=198 th=99 | max=207 th=104 |

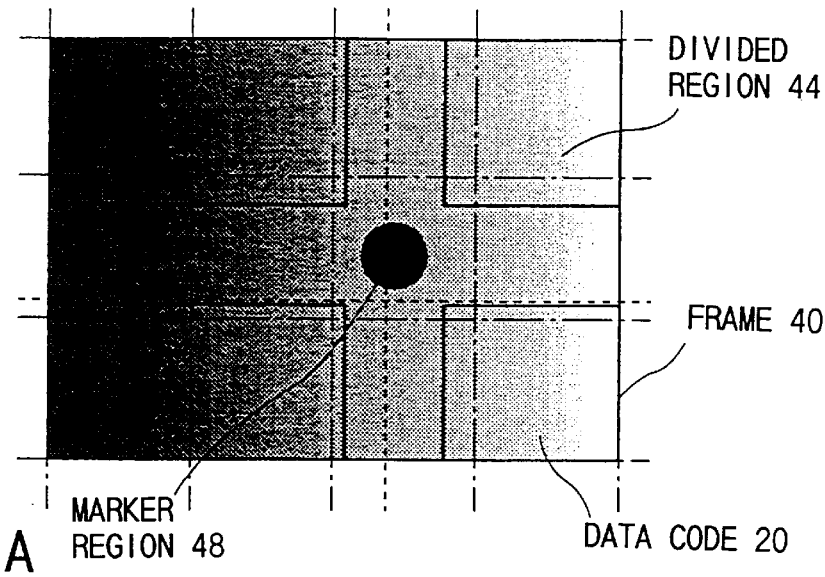

FIG. 54A

| max=180<br>min=60<br>→20 | max=190<br>min=63<br>→20 | max=200<br>min=65<br>→20 | max=210<br>min=68<br>→20 |
|---|---|---|---|
| max=182<br>min=61<br>→20 | max=193<br>min=65<br>→20 | max=205<br>min=20<br>fr_min20 | max=212<br>min=69<br>→20 |
| max=178<br>min=58<br>→20 | max=187<br>min=60<br>→20 | max=198<br>min=62<br>→20 | max=207<br>min=65<br>→20 |

FIG. 54B

WHEN INTERIOR DIVISION RATIO k=0.5 AND
MINIMUM VALUE fr_min OF OVERALL PORTION
OF PREVIOUS FRAME IS 20

| max=180<br>th=k(180-20)+20<br>=100 | max=190<br>th=k(190-20)+20<br>=105 | max=200<br>th=k(200-20)+20<br>=110 | max=210<br>th=k(210-20)+20<br>=115 |
|---|---|---|---|

DIVIDED REGION 44

FIG. 55

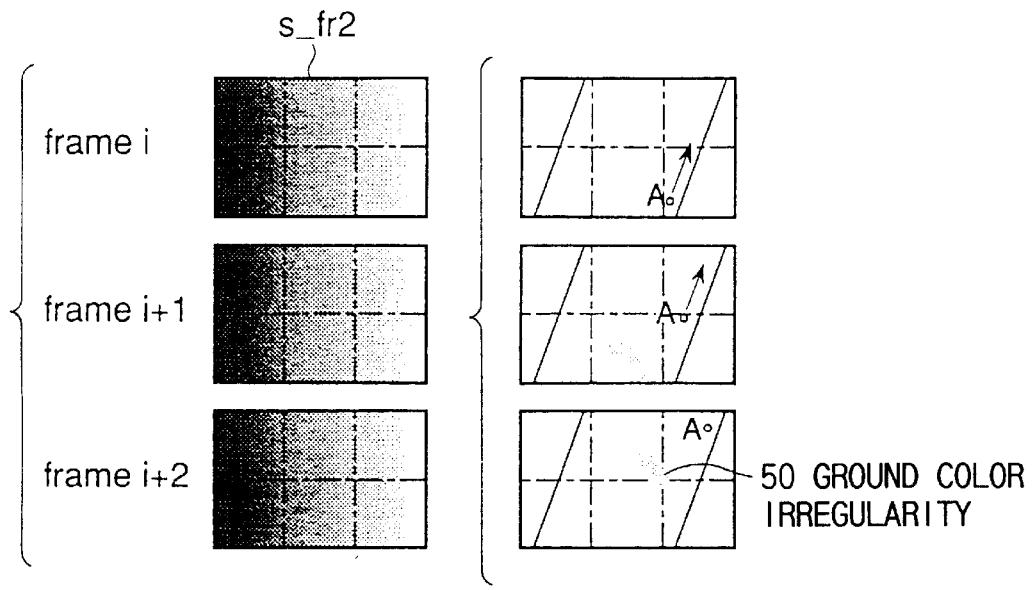
F I G. 56A    F I G. 56B
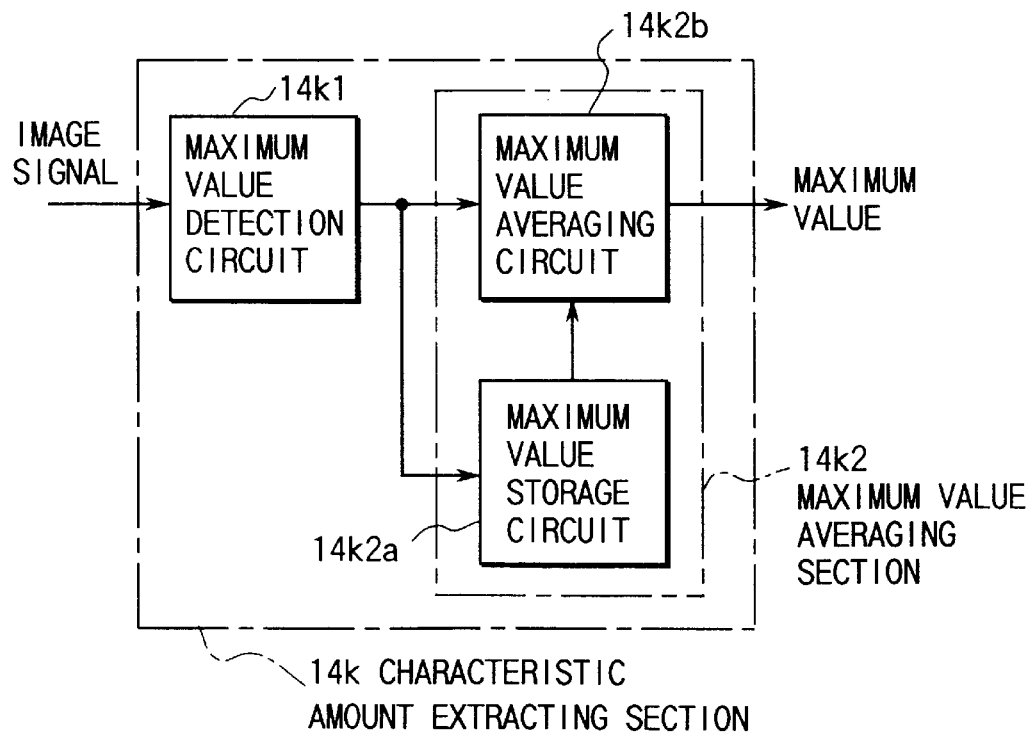
F I G. 57

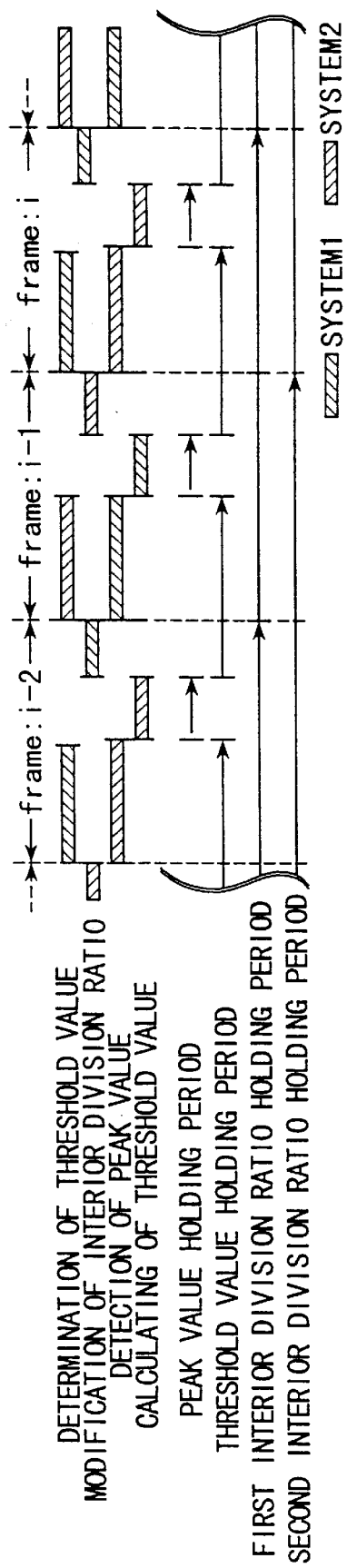

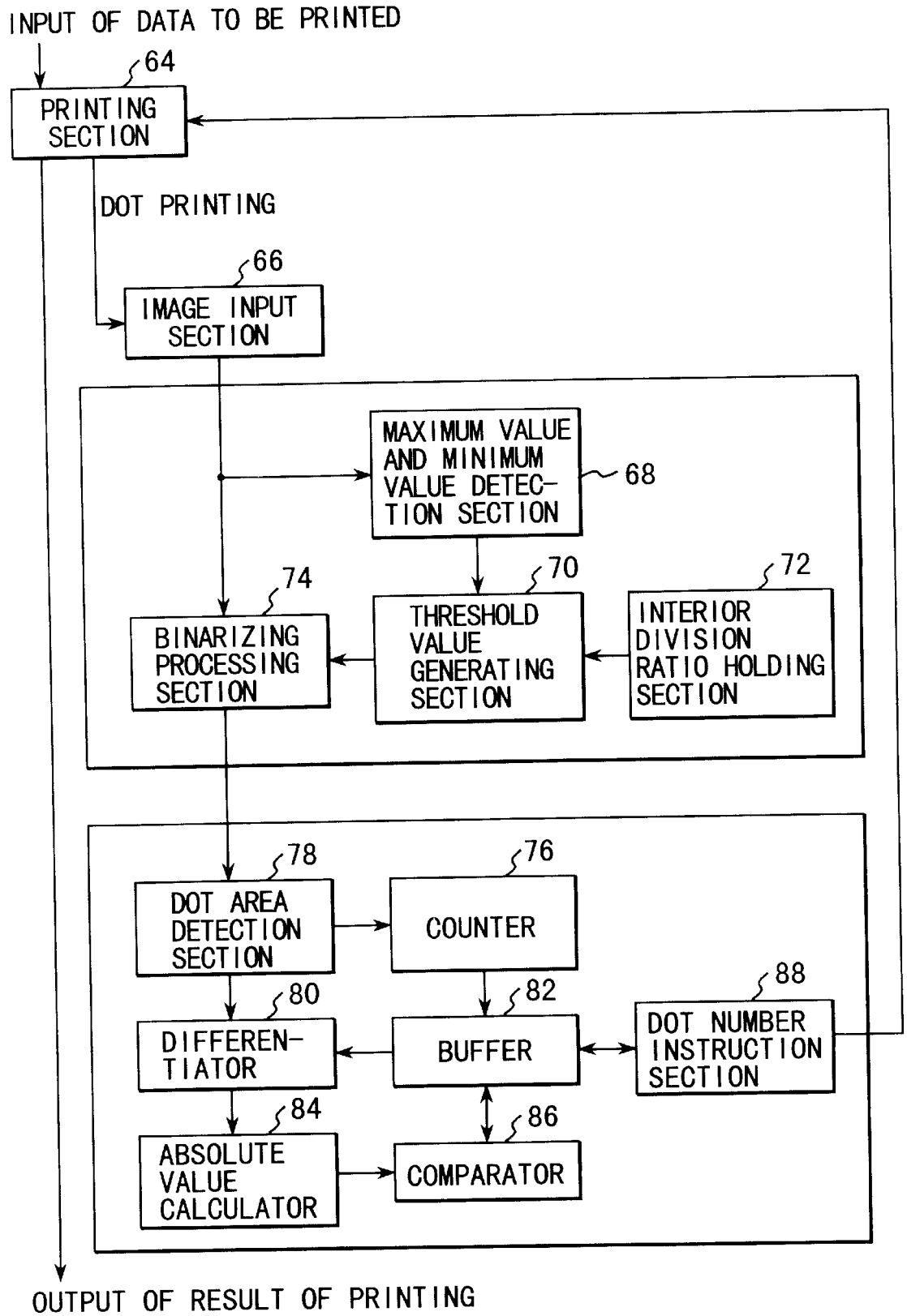
F I G. 7 2

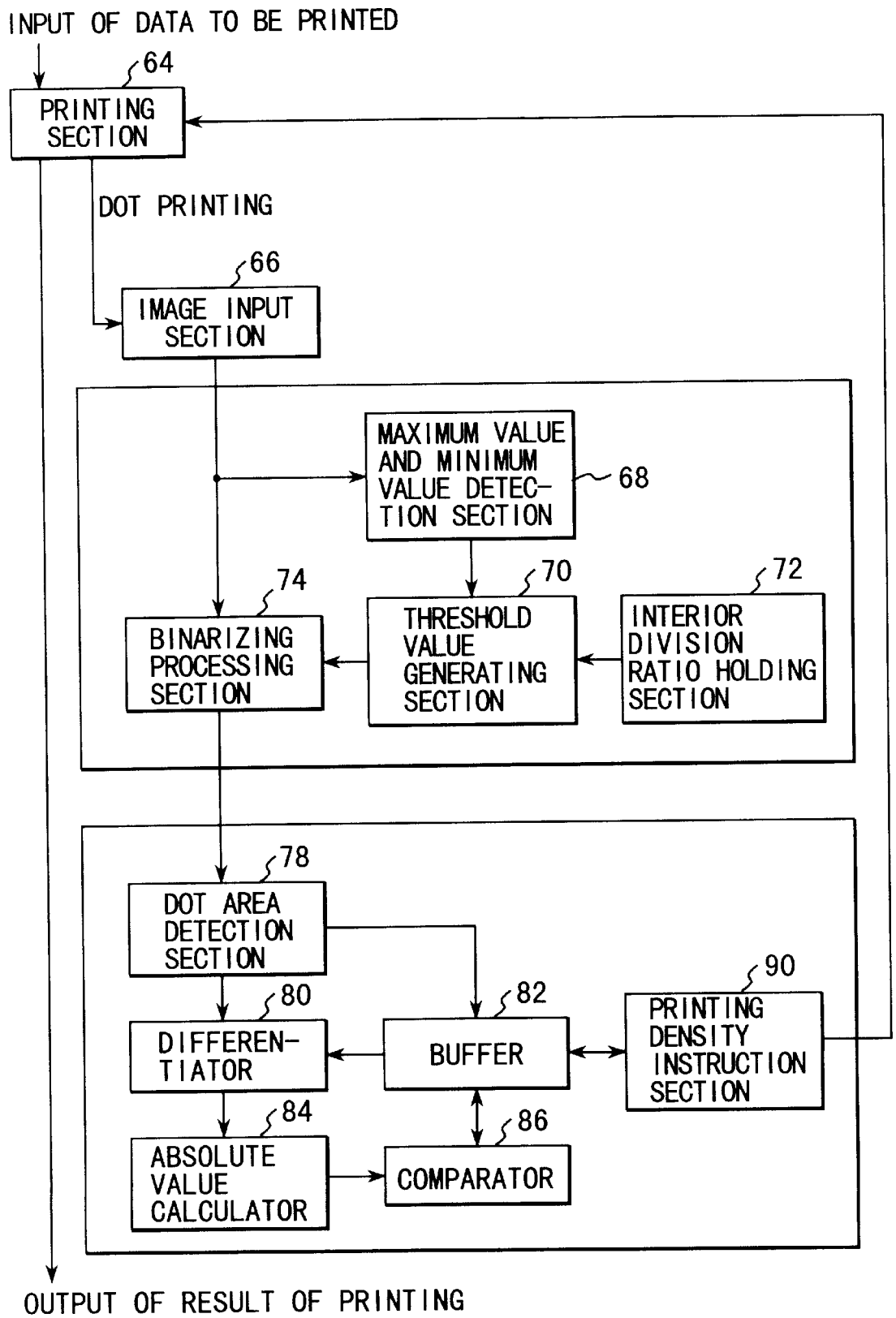
F I G. 76

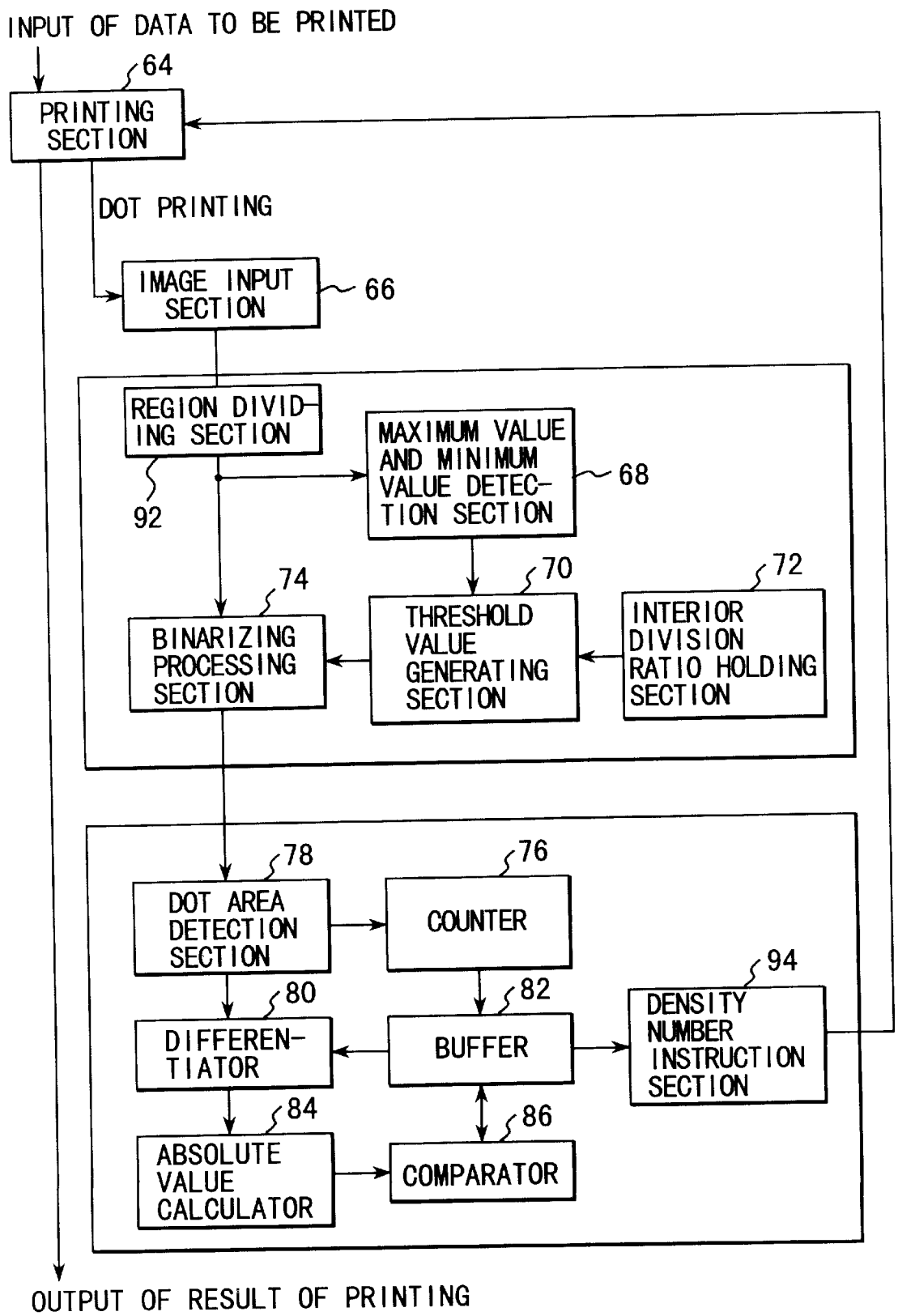
F I G. 79

INFORMATION REPRODUCING SYSTEM, INFORMATION RECORDING MEDIUM, AND INFORMATION RECORDING APPARATUS

BACKGROUND OF THE INVENTION

The present invention relates to an information recording medium, such as paper on which so-called multimedia information including audio information, such as speech and music, video information obtainable from a camera, video equipment and the like, digital code data obtainable from a personal computer, a word processor and the like has been recorded as a two-dimensional code pattern which can optically be read, an information recording apparatus for recording the two-dimensional code pattern on the information recording medium and information reproduction system which optically reads the code pattern to reproduce original multimedia information.

Hitherto, a variety of mediums including magnetic tapes and optical disks have been known as mediums for recording speech, music and the like. However, even if a multiplicity of copies of the foregoing mediums are manufactured, the somewhat costly unit price cannot be reduced. Moreover, an excessively large space is required to store the copies. What is worse, in a case where the medium, on which speech has been recorded must be sent to a remote person, labor and time takes wastefully even if it is mailed or directly transported. Also so-called multimedia information including video information obtainable from camera, video equipment and the like and digital code data obtainable from a personal computer, word processor and the like except audio information encounters similar problems.

To solve the above-mentioned problems, the applicant of the present invention has, in EP 0,670,555A1 (corresponding to U.S. Ser. No. 08/407,018) disclosed a system for recording, on an information recording medium such as paper, multimedia information including at least any one of audio information, video information and digital code data as image information which can be facsimiled and which can be copied in a large quantity with a low cost, that is, in the form of a two-dimensional code pattern formed by two-dimensionally disposing a plurality of dots serving as encoded information, and a system for reproducing the two-dimensional code pattern.

The two-dimensional code pattern disclosed above is formed as shown in FIG. 1. That is, FIGS. 1a–1c correspond to FIG. 16 of EP 0,670,555A1 and shows a dot code 170 (see FIG. 1a) serving as a two-dimensional code pattern. Area A of FIG. 1 is shown in FIG. 1B. The data format of the dot code 170 is structured such that one block 172 (see FIG. 1c) comprise a marker 174, a block address 176, an error detection and error correction data 178 and a data area 180 in which actual data is set. The blocks 172 are two-dimensionally arranged in the longitudinal and lateral directions to form a dot code 170.

FIG. 2 corresponds to FIG. 17 of EP 0,670,555A1 and shows the structure of an apparatus for reproducing multimedia information. The information reproducing apparatus comprises a detection section 184 for reading a dot code from a sheet 182 on which the dot code 170 is printed, a scan conversion section 186 which recognizes image data supplied from the detection section 184 as a dot code to normalize image data above, a binarizing section 188 for binarizing multivalue data, a demodulating section 190, an adjustment section 192 for adjusting data row, a data error correction section 194 for correcting a read error when data is reproduced and a data error, a data separation section 196 for separating data in accordance with the attitude of data, a decompression processing section for decompressing data compressed to be adaptable to the attitude of data, a display section or a reproducing section or another input device.

In the detection section 184, the dot code 170 on the sheet 182 is irradiated with light emitted from a light source 198, and reflected light is allowed to pass through an image forming optical system 200 having lenses and the like and a spatial filter 202 arranged to, for example, remove moire and the like, and then supplied to an image pickup section 204 arranged to convert optical information into an electric signal and comprising, for example, a CCD or a CMD so as to be detected as an image signal. The image signal is amplified by a preamplifier 206. The light source 198, image forming optical system 200, spatial filter 202, image pickup section 204 and the preamplifier 206 are accommodated in an external light insulating section 208 for insulating disturbance caused by external light. The image signal amplified by the preamplifier 206 is converted into digital information by an A/D conversion section 210, and then supplied to the following scan conversion section 186.

Note that the image pickup section 204 is controlled by a image pickup section control section 212. In an example case where an inter-line type CCD is employed to serve as the image pickup section 204, the image pickup section control section 212 transmits control signals including a V blank signal for vertical synchronization, an image pickup device reset pulse signal for resetting information charge, a charge transfer gate pulse signal for transmitting charges stored in charge transfer storage sections arranged two-dimensionally, a horizontal charge transfer CLK signal which is a transfer clock signal for a horizontal shift register for transferring a charge in the horizontal direction to transmit the same to the outside, a vertical charge transfer pulse signal for transferring the plurality of vertical shift register charges into a vertical direction to transfer the same to the horizontal shift register and the like.

The image pickup section control section 212 supplies a light emission cell control pulse to keep light emission timing of the light source 198 in synchronization with the timing of the transmission of the signals.

Image data is read in a period from a V blank to another V blank in one field. The light source 198 does not continuously emit light but it emits light pulses with synchronization in field units. To prevent introduction of clock noise into the output is when the pulse is emitted, timing is controlled in such a manner that exposure is performed during the V blank period, that is, a period in which the image charge is not transmitted. That is, the light emission cell control pulse is a very thin digital clock pulse which is generated instantaneously and thus supplies great electric power to the power source. Therefore, any contrivance is required to prevent unintentional introduction of noise into the analog image signal. Thus, the light source is caused to emit pulse light beams in the V blank period. As a result, S/N can be improved. The pulse light emission causing the time in which light is emitted to be shortened is significantly effective in eliminating influence of shake occurring when a manual scanning operation is performed and out of focus caused from movement of the image pickup section 204. As a result, a high speed scanning operation can be performed.

In order to prevent deterioration in the S/N ratio because of disturbance, such as external light, in spite of existence of the external light insulating section 208 when, for example, the reproducing apparatus has been inclined, a pulse for resetting the image pickup device is transmitted immediately before the light source 198 emits light in the V blank period to reset the signal of the image. Immediately after the signal has been reset, light is emitted, and immediately after the light emission, image data is read.

The scan conversion section 186 will now be described. The scan conversion section 186 is a section which recognizes image data supplied from the detection section 184 as a dot code so as to normalize the dot code. The recognition and normalization are performed as follows: initially, image data supplied from the detection section 184 is stored in an image memory 214, and then image data above is read out and supplied to a marker detection section 216. The marker detection section 216 detects a marker of each block. A data arrangement direction detection section 218 uses the markers to detect rotation or inclination or data arrangement direction. In accordance with a result of the detection, an address control section 220 reads image data from the image memory 214 to perform correction so as to supply image data to an interpolating section 222. At this time, distortion of each lens occurring in the image forming optical system 200 of the detection section 184 is corrected in accordance with information about the aberration of the lenses supplied from the correcting memory 224 so as to as well as correct the lenses. Then, the interpolating section 222 subjects image data to an interpolating process so as to convert image data into an original dot code pattern.

An output from the interpolating section 222 is supplied to the binarizing section 188. Since the dot code 170 is basically composed of white and black patterns, that is, it is binary information, the dot code 170 is binarized by the binarizing section 188. At this time, the binarizing operation is appropriately performed while causing a threshold value determination circuit 226 to determine the threshold value in consideration of an influence of disturbance and an influence of the amplitude of the signal.

Since modulation has been performed when data has been recorded, demodulation of data is initially performed by the demodulating section 190, and then demodulated data is supplied to the data row adjustment section 192.

The data row adjustment section 192 initially causes a block address detection section 228 to detect the block address of the two-dimensional block. Then, a block address error detection and correction section 230 detects and corrects an error of the block address, and then an address control section 232, in block units, stores data in a data memory section 234. Since data is stored in block units as described above, data can be stored efficiently even if intermediate data does not exist or data is input afterwards.

Then, data read from the data memory section 234 is supplied to the data error correction section 194 so that data errors are corrected. An output from the data error correction section 194 is branched into two sections one of which is, through an I/F 236, supplied to a personal computer, a word processor, an electronic notebook or the like. The other output is supplied to the data separation section 196 so that data is divided into images, characters written by the hand, graphs, characters, line drawings and sound (two types of which is original sound and synthesized sound).

The image corresponds to a natural image and is a multivalue image. The image is decompressed by a decompression processing section 238 to correspond to a compression method, for example, JPEG, and then data, which cannot be corrected, is interpolated by a data interpolating circuit 240.

Binary image information, such as characters written by the hand, graphs and the like, are decompressed by a decompression processing section 242 to correspond to the compression method, for example, MR, MH or MMR, and then data, which cannot be corrected, is interpolated by a data interpolating circuit 244.

Characters and line drawings are, by a PDL (Page Description Language) processing section 246, converted into another pattern for display. Also line drawings and characters, which have been encoded and decompressed for the code, are decompressed (for example, a Huffman coding, Lempel-Ziv coding or the like) by a decompression processing section 248 corresponding to the compression method, and then supplied to the PDL processing section 246.

Outputs from the data interpolating circuits 240 and 244 and the PDL processing section 246 are, by a synthesizing or switch circuit 250, synthesized or selected, and then converted into an analog signal by a D/A conversion section 252 so as to be displayed on a display unit 254, such as a CRT (a TV monitor) or an FMD (Face Mounted Display). Note that the FMD is a glassestype monitor (handy monitor) to be mounted on the face of the user, and can be effectively used for, e.g., a virtual reality operation or looking at an image on a large frame in a narrow space.

Speech information is decompressed by a decompression section 256 to correspond to the ADPCM coding or the like, and data, the error of which cannot be corrected, is interpolated by a data interpolating circuit 258. In a case of speech synthesis, a speech synthesizing section 260 is supplied with the code of the speech synthesis to synthesize speech from the code to transmit the speech. In a case where the code is compressed in the foregoing case, the decompression processing section 262 subjects the code to a decompression process, such as Huffman coding, Lempel-Ziv coding or the like, similarly to the characters and the line drawings, and then the speech synthesis is performed.

Outputs from the data interpolating circuit 258 and the speech synthesizing section 260 are, by a synthesizing or switch circuit 264, synthesized or selected so as to be converted into an analog signal by D/A conversion section 266, and then transmitted to a speech output unit 268, such as a loudspeaker, a headphone or the like.

Characters and line drawings are directly transmitted from the data separation section 196 to a page printer or a plotter 270 so as to be printed on a paper sheet as characters of a word processor, or enabled to be transmitted to the plotter as a line drawing or a drawing.

As a matter of course, also the image can be printed by a video printer as well as being displayed on the CRT and the FMD, and moreover the image can be photographed.

An image reproducing apparatus having the foregoing structure is arranged such that, for example, the detection section 184 and the scan conversion section 186 are accommodated in a pen-like case so as to be used as a reading section for optically reading the dot code 170 on the sheet 182; and the reading section is held by the hand to manually scan the surface of the sheet 182 along the recorded dot code 170 so as to read the code.

A group including the inventor of the present invention has developed a format which is capable of raising the recording density of dot codes of the foregoing type and has filed in U.S. Ser. No. 08/571,776 (corresponding to EP 0,717,398 A3). The format of the dot code is, as shown in FIG. 3, structured such that predetermined matching pattern dots 278 are disposed at predetermined positions with respect to the marker 174, for example, between markers adjacent in the first direction. Moreover, address dots 280 indicating the address of the block is disposed at a predetermined position, for example, between markers adjacent in a second direction. Each of the matching pattern dots 278 and the address dots 280 is composed of a dot having the same size as that of the data dots 282 disposed in the data area 180. Thus, the dot code 170 structured as described above enables the direction of the arrangement and the true center of the marker 174 serving as a reference point for reading the data dots 282 to be obtained by using the matching pattern dots 278 having a predetermined pattern. Therefore, the reference points for reading can easily and accurately be obtained. Thus, even if code patterns are recorded densely, the position of each data dot 282 can accurately be calculated so that original multimedia information can reliably be reproduced.

As the binarizing section 188 for appropriately performing the binarizing operation while causing threshold value determining circuit 266 to determine the threshold value, a binarizing circuit of a type disclosed in Jpn. Pat. Appln. KOKAI No. 59-61383 has been known. The foregoing binarizing circuit is arranged to obtain the maximum and minimum value of digital data converted by an A/D converter, the maximum and minimum value being those in the previous frame. In accordance with the obtained values, a threshold value is calculated and the obtained result of the calculation is used as the threshold value of the present frame so as to perform the binarizing operation.

The above-mentioned system for reproducing the dot code 170 is considerably affected by direct reflection because of the short distance from the surface of the sheet 182 to the image pickup section 204. Thus, a video signal obtained from the image pickup section 204 unintentionally includes noise. If the image pickup section 204 has a defective pixels, noise is generated. Noise of the foregoing type results in that the maximum and minimum values cannot accurately be obtained by the binarizing circuit. As a result, a binarizing operation using an appropriate threshold value cannot be performed. Even if an appropriate value can be obtained, an optimum threshold value cannot always be obtained from the maximum and minimum values attributable to the state where dots are printed.

BRIEF SUMMARY OF THE INVENTION

In view of the foregoing, an object of the present invention is to provide an information reproducing system, an information recording medium and an image reproducing apparatus capable of accurately extracting maximum and minimum values even from a subject having noise, capable of performing a binarizing operation with an appropriate threshold value regardless of a state where dots are printed so that original multimedia information is accurately reproduced.

According to a first aspect of the present invention, there is provided an information reproducing system comprising:
  code reading means for reading a desired dot code from an information recording medium on which multimedia information including at least any one of audio information, image information and digital code data has been recorded in the form of a dot code which can optically be read;
  binarizing means for generating binarized data from an image signal corresponding to the dot code read by the code reading means; and
  information reproducing means for restoring binarized data generated by the binarizing means to original multimedia information to reproduce multimedia information, wherein
  the binarizing means includes:
    reference dot detection means which binarizes the image signal with a predetermined threshold value prior to generating binarized data so as to detect a reference dot from the binarized code image;
    dot area measuring means for measuring the area of the reference dot detected by the reference dot detection means;
    threshold value modifying means for modifying the threshold value in such a manner that the area measured by the dot area measuring means approaches a predetermined target value; and
    threshold value determining means for binarizing the image signal with the threshold value modified by the threshold value modifying means.

According to a second aspect of the present invention, there is provided an information reproducing system comprising;
  code reading means for reading a desired dot code from an information recording medium on which multimedia information including at least any one of audio information, image information and digital code data has been recorded in the form of a dot code which can optically be read;
  binarizing means for generating binarized data from an image signal corresponding to the dot code read by the code reading means; and
  information reproducing means for restoring binarized data generated by the binarizing means to original multimedia information to reproduce multimedia information, wherein
  the binarizing means includes:
    region dividing means for dividing the picked up screen of the dot code into a plurality of regions;
    characteristic amount extracting means for extracting the characteristic amount for binarization in region units divided by the region dividing means;
    threshold value calculating means for calculating the threshold value for binarization in accordance with the characteristic amount extracted by the characteristic amount extracting means; and
    threshold value determining means for binarizing the image signal with the threshold value calculated by the threshold value calculating means.

According to a third aspect of the present invention, there is provided an information reproducing system comprising:
  code reading means for reading a desired dot code from an information recording medium on which multimedia information including at least any one of audio information, image information and digital code data has been recorded in the form of a dot code which can optically be read;
  binarizing means for generating binarized data from an image signal corresponding to the dot code read by the code reading means; and
  information reproducing means for restoring binarized data generated by the binarizing means to original multimedia information to reproduce multimedia information, wherein
  the binarizing means includes:
    peak value detection means for detecting the maximum value and the minimum value of the luminance from a predetermined detection region;
    code detection means for detecting whether or not a code exists in the detection region;
    minimum value replacing means for replacing the minimum value in the detection region with the minimum value of one of the previous field and frame in a case where the code detection means does not detect a code; and threshold value calculating means for calculating the threshold value for binarization for the same region of one of a next field and a next frame from the detected maximum value and the detected or replaced minimum value in accordance with a predetermined interior division ratio.

According to a fourth aspect of the present invention, there is provided an information reproducing system comprising:

code reading means for reading a desired dot code from an information recording medium on which multimedia information including at least any one of audio information, image information and digital code data has been recorded in the form of a dot code which can optically be read;

binarizing means for generating binarized data from an image signal corresponding to the dot code read by the code reading means; and information reproducing means for restoring binarized data generated by the binarizing means to original multimedia information to reproduce multimedia information, wherein the binarizing means includes:

peak value detection means for detecting the maximum value and the minimum value of the luminance from a predetermined detection region;

code detection means for detecting whether or not a code exists in the detection region;

minimum value replacing means for replacing the minimum value in the detection region with the minimum value of the adjacent detection region in a case where the code detection means does not detect a code; and threshold value calculating means for calculating the threshold value for binarization for the same region of one of a next field and a next frame from the detected maximum value and the detected or replaced minimum value in accordance with a predetermined interior division ratio.

According to a fifth aspect of the present invention, there is provided an information recording medium for use in an information reproducing system having code reading means for reading a desired dot code from an information recording medium on which multimedia information including at least any one of audio information, image information and digital code data has been recorded in the form of a dot code which can optically be read; binarizing means for generating binarized data from an image signal corresponding to the dot code read by the code reading means; and information reproducing means for restoring binarized data generated by the binarizing means to original multimedia information to reproduce multimedia information, the information recording medium comprising:

data dots which correspond to the contents of multimedia information and which can optically be read; and a reference dot arranged to be detected by the binarizing means and serving as a reference when the threshold value is modified to allow the area of the detected dot to approach a predetermined target value.

According to a sixth aspect of the present invention, there is provided an information recording medium for use in an information reproducing system having code reading means for reading a desired dot code from an information recording medium on which multimedia information including at least any one of audio information, image information and digital code data has been recorded in the form of a dot code which can optically be read; binarizing means for generating binarized data from an image signal corresponding to the dot code read by the code reading means; and information reproducing means for restoring binarized data generated by the binarizing means to original multimedia information to reproduce multimedia information, the information recording medium comprising:

data dots which correspond to the contents of multimedia information and which can optically be read; and a reference dot serving as a reference when the binarizing means detects the maximum value and the minimum value of the image signal level corresponding to the dot code, detects a dot from a code data binarized by a threshold value calculated from the maximum vale and the minimum value in accordance with a predetermined interior division ratio and modifies the interior division ratio in such a manner that area of the detected dot approaches a predetermined target value.

According to a seventh aspect of the present invention, there is provided an information recording apparatus for recording multimedia information including at least any one of audio information, image information and digital code data in the form of a dot code which can optically be read, comprising:

reference dot recording means for recording at least two types of reference dots having at least different areas of shapes;

reference dot reading means for reading the reference dots recorded by the reference dot recording means to binarize the read reference dots;

reference dot selection means for subjecting the area of each reference dot read by the reference dot reading means and a predetermined reference value to a comparison to select a reference dot having the different smaller than a predetermined threshold value; and recording means for recording a dot code corresponding to multimedia information in accordance with the reference dot selected by the reference dot selection means.

According to an eighth aspect of the present invention, there is provided an information recording apparatus for recording multimedia information including at least any one of audio information, image information and digital code data in the form of a dot code which can optically be read, comprising:

reference dot recording means for recording reference dots having different recording densities;

reference dot reading means for reading the reference dots recorded by the reference dot recording means to binarize the read reference dots;

recording density adjustment means for subjecting the area of each of the reference dots read by the reference dot reading means and a predetermined reference value to a comparison to adjust the recording density in such a manner that the difference is smaller than a predetermined threshold value; and recording means for recording a dot code corresponding to multimedia information in accordance with the recording density adjusted by the recording density adjustment means.

According to a ninth aspect of the present invention, there is provided an information recording apparatus for recording multimedia information including at least any one of audio information, image information and digital code data in the form of a dot code which can optically be read, comprising:

reference dot recording means for recording at least two or more types of reference dots having different recording densities;

reference dot reading means for dividing a picked up screen in such a manner that only one reference dot recorded by the reference dot recording means is included in a divided region and binarizing each divided region to read the reference dot to binarize the reference dot;

density selection means for subjecting the area of each reference dot read by the reference dot reading means and a predetermined reference value to a comparison and for selecting the density of the reference dot having the difference smaller than a predetermined threshold value; and recording means for recording a dot code corresponding to multimedia information in accordance with the recording density selected by the density selection means.

According to a tenth aspect of the present invention, there is provided an information recording apparatus for recording multimedia information including at least any one of audio information, image information and digital code data in the form of a dot code which can optically be read, comprising:

input means for inputting information relating to the information recording medium;

storage means for storing the relationship between information relating to a predetermined information recording medium and one of the area of the dot when data is recorded and the recording density; and means for reading corresponding one of the dot area and the recording density from the storage means in accordance with information input by the input means and relating to the information recording medium so as to record a dot code corresponding to multimedia information in accordance with the one of the dot area and the recording density.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1A–1C are diagrams showing a conventional two-dimensional dot code pattern;

FIG. 6A is a block diagram showing a second embodiment of an information reproducing system according to the present invention;

FIG. 6B is a flow chart showing the second embodiment of the information reproducing system according to the present invention;

FIG. 20 is a block diagram showing a seventh embodiment of an information reproducing system according to the present invention;

FIG. 21 is a block diagram showing an eighth embodiment of an information reproducing system according to the present invention;

FIG. 22 is a flow chart showing the operation of the information reproducing system according to an eight embodiment of the present invention;

FIGS. 23A–23C are diagrams showing the relationship between first and second threshold values;

FIG. 24 is a diagram showing a method of calculating an average area;

FIG. 25 is a block diagram showing a ninth embodiment of an information reproducing system according to the present invention;

FIG. 26 is a flow chart showing the operation of the information reproducing system according to a ninth embodiment of the present invention;

FIG. 36A is a diagram showing the structure of a thirteenth embodiment of the information reproducing system according to the present invention;

FIG. 36B is a table showing contents stored in an interior division ratio modification table according to a thirteenth embodiment of the information reproducing system according to the present invention;

FIG. 37 is a graph explaining the operation of a fourteenth embodiment of the information reproducing system according to the present invention and showing the relationship between the areas of a dot and the interior division ratios;

FIG. 38 is a graph explaining the operation of a fifteenth embodiment of the information reproducing system according to the present invention and showing the relationship between the areas of a dot and the interior division ratios;

FIG. 46 is a flow chart showing the operation of the information reproducing system according to a nineteenth embodiment of the present invention;

FIG. 47 is a diagram showing a dot code for use in a twentieth embodiment of the information reproducing system according to the present invention;

FIG. 48 is a block diagram showing a twentieth embodiment of an information reproducing system according to the present invention;

FIG. 54A is a diagram showing a shaded code image for explaining a twenty-fifth embodiment of the information reproducing system according to the present invention;

FIG. 54B is a diagram showing a state where the minimum luminance of the overall frame is applied to the minimum value for each of the divided regions in the twenty-fifth embodiment of the information reproducing system according to the present invention;

FIG. 55 is a diagram showing a state where the minimum luminance of the overall body of the previous frame is applied to the minimum value for each of the divided regions of the present frame in the twenty-sixth embodiment of the information reproducing system according to the present invention;

FIG. 56A is a diagram showing a state of a change of shading between frames according to a twenty-seventh embodiment of the information reproducing system according to the present invention;

FIG. 56B is a diagram showing a state of transition of the irregularity of the ground color between frames;

FIG. 57 is a block diagram showing a twenty-seventh embodiment of an information reproducing system according to the present invention;

FIG. 67 is a timing chart for explaining a two-system independent control of the interior division ratio;

FIG. 72 is a block diagram showing a first embodiment of an information recording apparatus according to the present invention;

FIG. 76 is a block diagram showing a third embodiment of an information recording apparatus according to the present invention;

FIG. 79 is a block diagram showing a fourth embodiment of an information recording apparatus according to the present invention;

DETAILED DESCRIPTION OF THE INVENTION

Figure 2:
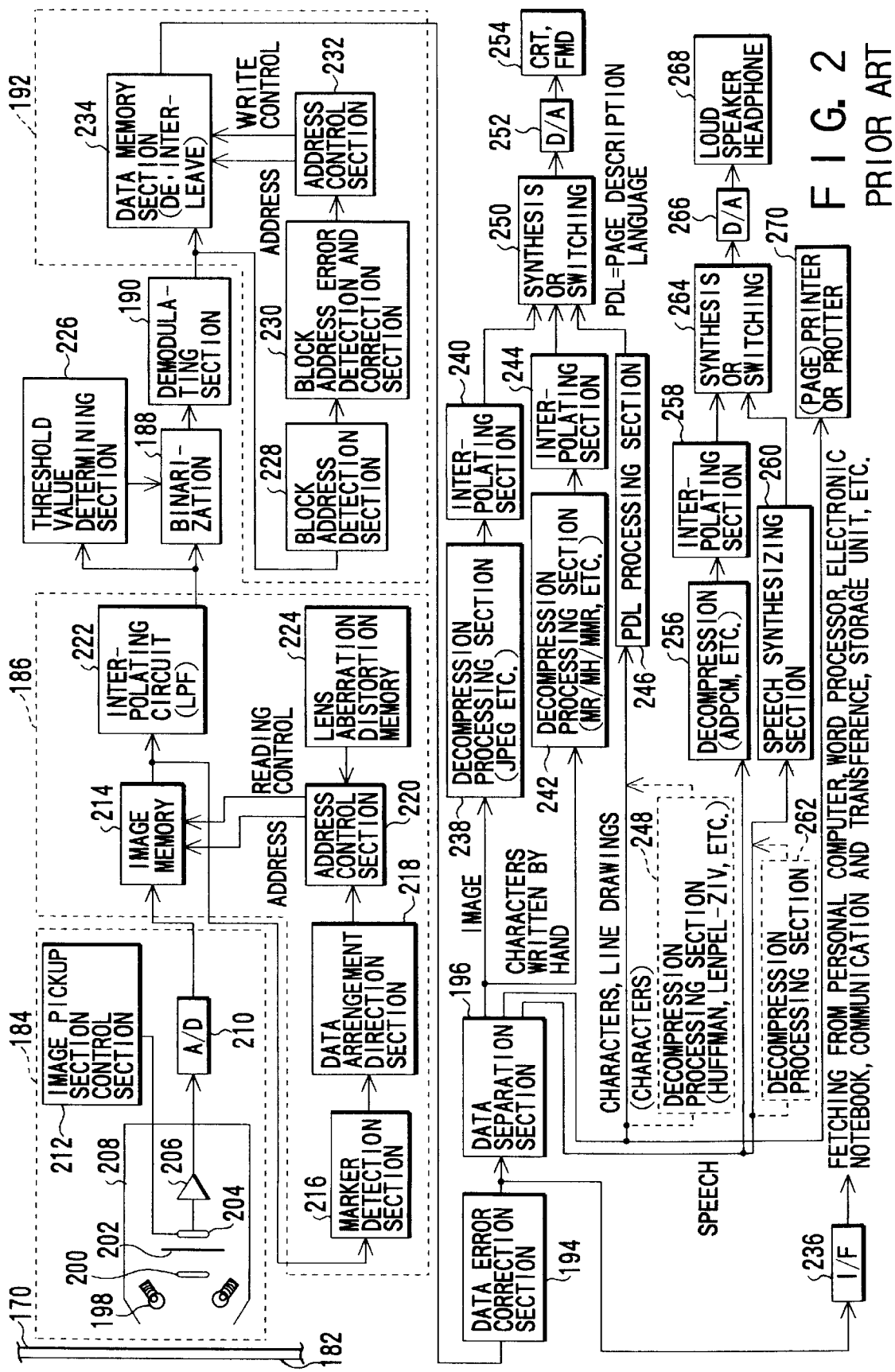
FIG. 2 is a block diagram showing a conventional information reproducing apparatus.
Figure 3:
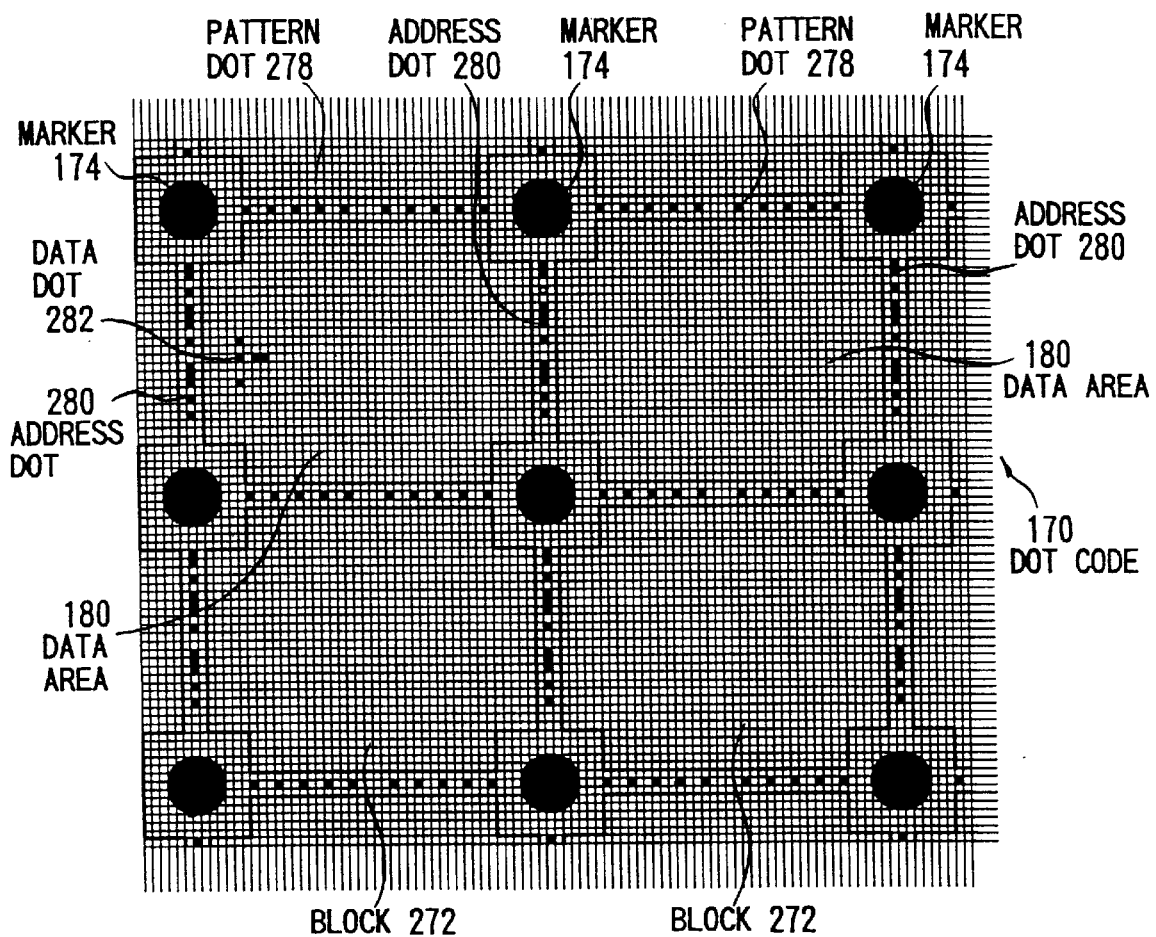
FIG. 3 is a diagram showing another form of the dot code which is a conventional two-dimensional code pattern.

Embodiments of the present invention will now be described with reference to the drawings.

Note that same structures, functions and processes among the following embodiments are given the same reference numerals.

Initially, an information reproducing system will now be described.

Figure 4A:
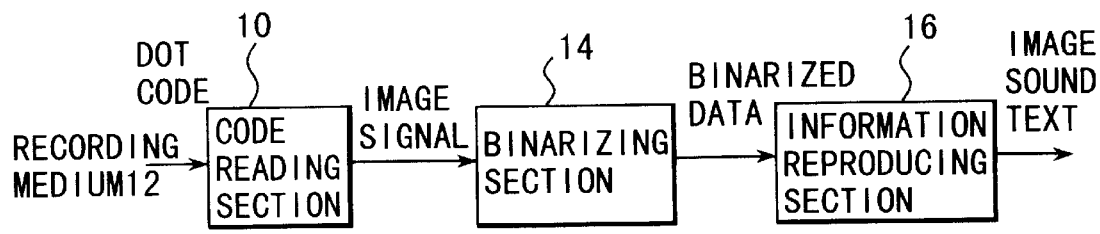
FIG. 4A is a block diagram showing a first embodiment of an information reproducing system according to the present invention.

FIG. 4A is a diagram showing the structure of a first embodiment of the information reproducing system according to the present invention. A code reading section 10 reads a required dot code from an information recording medium 12 in which multimedia information including at least audio information, image information and digital code data is recorded in the form of a dot code which can optically be read. The code reading section 10 corresponds to the detection section 184 and the scan conversion section 186 disclosed in, for example, EP 0,670,555 A1. A binarizing section 14 generates binarized data from a image signal corresponding to the dot code read by the code reading section 10. The binarizing section 14 corresponding to the binarizing section 188 and the threshold value determination circuit 226 disclosed in EP 0,670,555 A1. An information reproducing section 16 restores and reproduces binarized data generated by the binarizing section 14 to original multimedia information. The information reproducing section 16 corresponding to elements ensuing the demodulating section 190 disclosed in EP 0,670,555 A1.

Figure 4B:
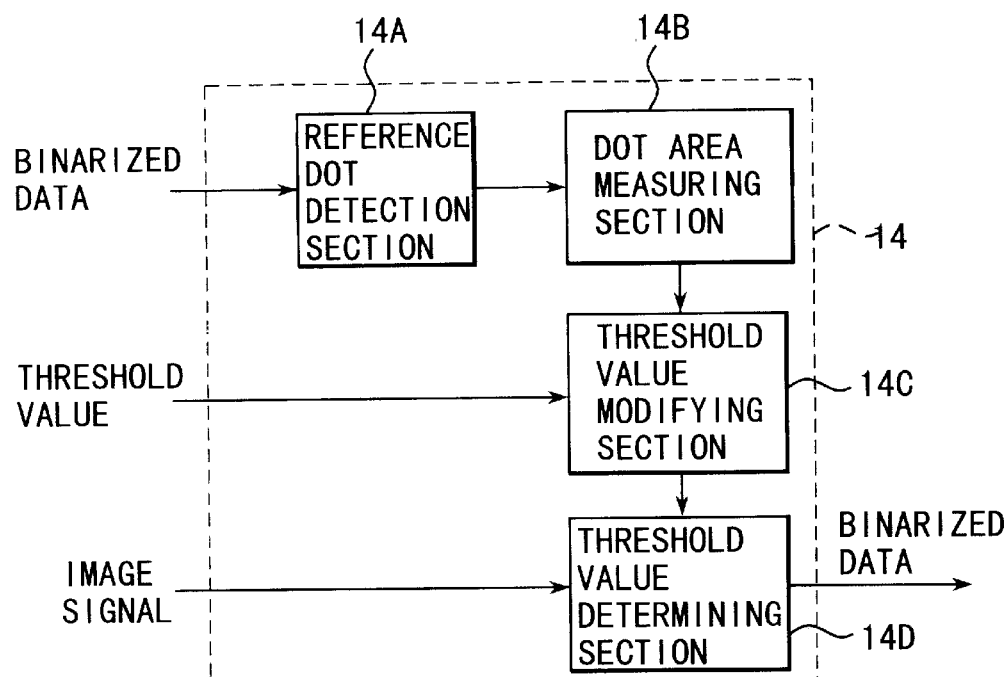
FIG. 4B is a block diagram showing a binarizing section according to a first embodiment of the information reproducing system according to the present invention.

The binarizing section 14 according to the first embodiment, as shown in FIG. 4B, comprises, a reference dot detection section 14A, a dot area measuring section 14B, a threshold value modifying section 14C and a threshold value determining section 14D. The reference dot detection section 14A, prior to generating binarized data to be supplied to the information reproducing section 16, binarizes an image signal supplied from the code reading section 10 with a predetermined threshold value, and then detects a reference dot from the binarized code information. As the reference dot to be described later, for example, a pattern dot 278 may be employed. The dot area measuring section 14B measures the area of the reference dot detected by a reference dot detection section 14A. The threshold value modifying section 14C modifies the threshold value for use in the binarizing process in such a manner that the area measured by the dot area measuring section 14B approaches a predetermined target value. The threshold value determining section 14D binarizes the image signal with the threshold value modified by the threshold value modifying section 14C, and then transmits the obtained binarized data to the information reproducing section 16.

Figure 5:
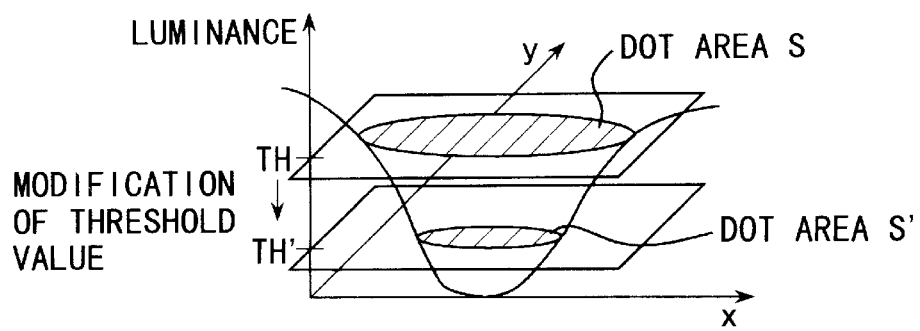
FIG. 5 is a diagram showing the area of a dot.

That is, in the foregoing structure, the picked up reference dot is binarized with appropriate threshold value TH, as shown in FIG. 5. In this case, since change in the luminance as shown in FIG. 5 is obtained when a dot image has been picked up, the change is cut by a plane of an appropriate threshold value TH so that the cross sectional is obtained as dot area S. If the dot area S is larger than a predetermined target value, the threshold value of the luminance is modified to a smaller value so that threshold value plane TH' is obtained. As a result, the dot area S', which is a cross section obtained by cutting the luminance with the threshold value plane TH', can be reduced. If the dot area S is smaller than the target value, the threshold value is modified to a larger value so that a larger dot area is obtained.

As described above, the structure in which the threshold value is modified by using the dot area enables a binarizing process to be performed with a required dot size without dependency upon the expansion and contraction of the dot attributable to the recording state.

Even if the dot has anisotropy (if the dot is not in the form of a circle, but it is, for example, an ellipse), or if the dot has whisker-like noise or stain, the binarizing process can accurately be performed.

A second embodiment of the information reproducing system according to the present invention will now be described.

In the second embodiment, the binarizing section 14 performs the process for binarizing an image signal read by the code reading section 10 in field or frame units.

That is, as shown in FIGS. 6A and 6B, the threshold value determining section 14D binarizes frame image data with an appropriate threshold value, the reference dot detection section 14A detects a reference dot, and the dot area measuring section 14B measures the area of the dot. Then, the threshold value modifying section 14C uses the area to modify the threshold value, and the threshold value determining section 14D binarizes image data in the same frame with the foregoing threshold value.

Since the threshold value of the same code image with which the reference dot area has been measured is modified to again perform the binarizing process, the binarizing process can be performed in such a manner that the dot area can accurately be adapted to a target value.

Figure 7:
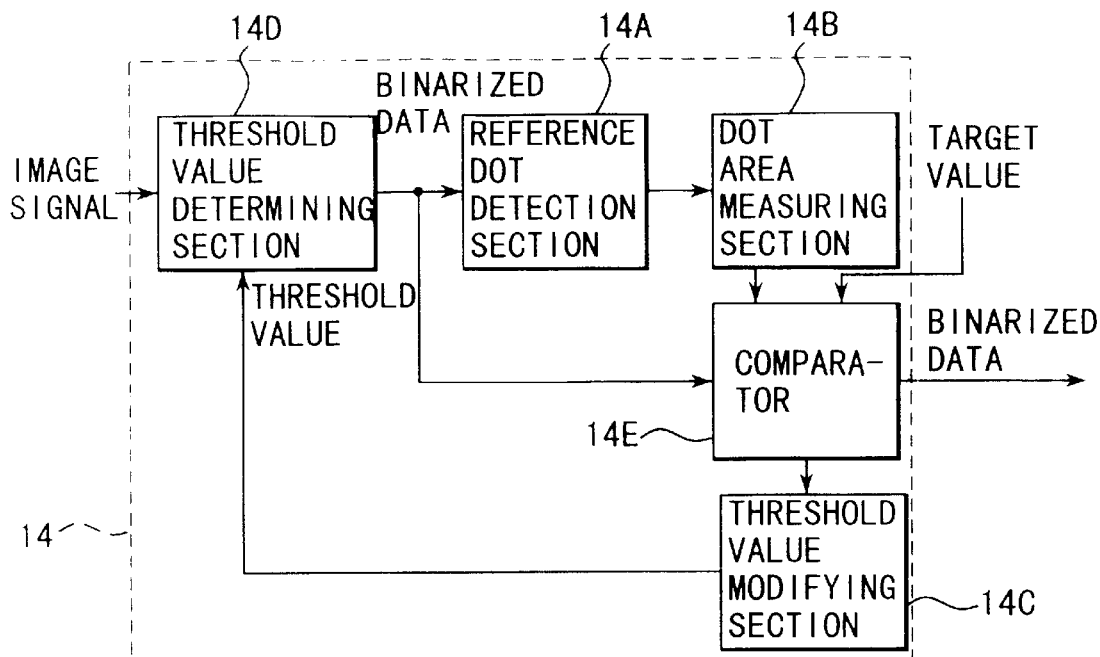
FIG. 7 is a block diagram showing another structure of the second embodiment of the information reproducing system according to the present invention.

A structure shown in FIG. 7 may be employed. That is, a comparator 14E is provided to subject the dot area measured by the dot area measuring section 14B and a target value to a comparison. Then, the threshold value is modified by the threshold value modifying section 14C until the difference is made to be within a predetermined range. If the difference has been made to be within the predetermined range, binarized data transmitted from the threshold value determining section 14D is supplied to the following information reproducing section 16.

Figure 8:
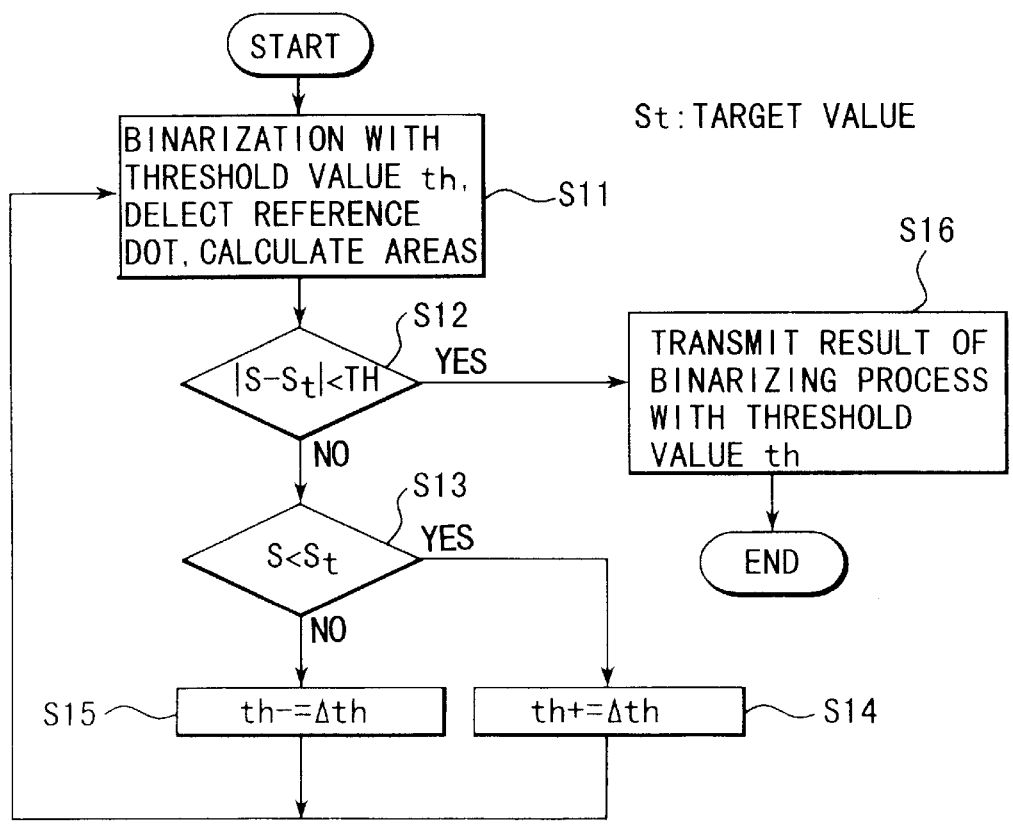
FIG. 8 is a flow chart showing the operation of the structure shown in FIG. 7.

That is, as shown in FIG. 8, an appropriate threshold value th is used to binarize image data, and a reference dot is detected, and then its area S is calculated (step S11). Then, an absolute value of the difference between the calculated area S and target area $S_t$ is obtained and the obtained absolute value is compared with a predetermined threshold value TH (step S12). If the absolute value of the difference is larger than the threshold value TH, whether the calculated area S is smaller than the target area $S_t$ is determined (step S13). If the area S is smaller than the target area $S_t$, the threshold value th for the binarizing process is enlarged by a predetermined amount Δth (step S14). If the area S is larger than the target area $S_t$, the threshold value th is reduced by the predetermined amount Δth (step S15), and then the operation returns to step S11. The above-mentioned process is repeated until the absolute value of the difference from the target area $S_t$ is made to be smaller than the threshold value TH. When the absolute value of the difference between the area S and the target area $S_t$ is made to be smaller than the threshold value TH, a result of the binarizing process obtained by using the threshold value th is transmitted (step S16).

As described above, the modification and the binarization of the threshold value are performed repeatedly until the measured dot area approaches the target value. When the dot area has satisfactorily approached the target value, the binarized data at this time is transmitted. Therefore, the binarizing process can be performed in such a manner that the dot area can accurately be adapted to the target value.

A third embodiment of the information reproducing system according to the present invention will now be described.

In a case where the image of the dot code 170 is continuously picked up, the illumination state and recording state are not changed considerably among continuous frames. The third embodiment is structured by using the characteristic that the threshold value of the present frame can be determined by using the state of the previously frame.

Figure 9A:
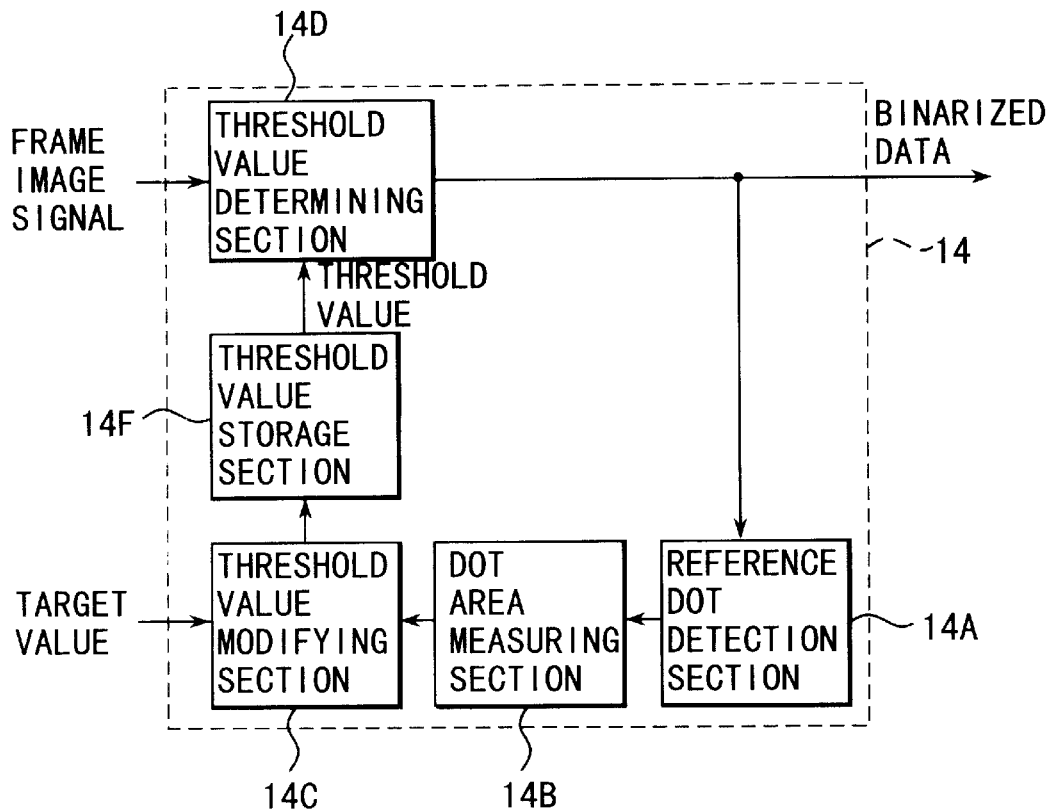
FIG. 9A is a block diagram showing a third embodiment of an information reproducing system according to the present invention.
Figure 9B:
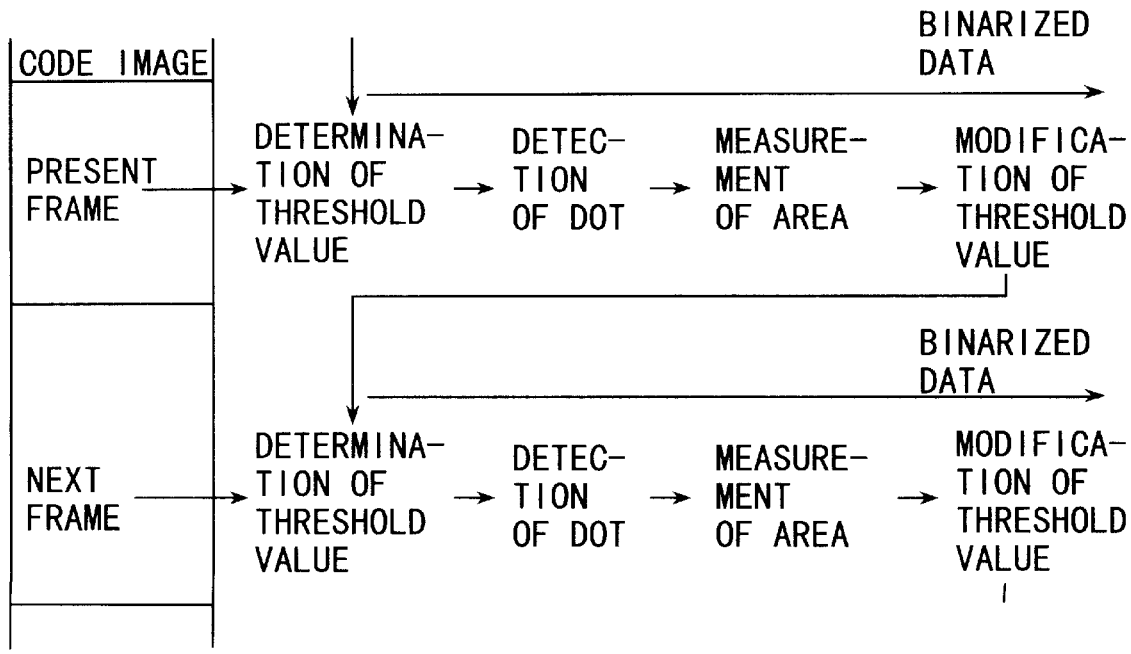
FIG. 9B is a flow chart showing the third embodiment of the information reproducing system according to the present invention.

That is, as shown in FIGS. 9A and 9B, the threshold value determining section 14D binarizes an image signal of the present frame with an appropriate threshold value for the binarizing process, the reference dot detection section 14A detects the reference dot in accordance with a result of the binarizing process, and then the dot area measuring section 14B measures the dot area. Then, the threshold value modifying section 14C uses the measured dot area to modify the threshold value, and the modified threshold value is stored by the threshold value storage section 14F so as to be used when an image signal of the next frame is binarized.

As described above, the code reading section 10 continuously reads the dot code images, and the binarizing section 14 modifies the threshold values of the read and continuous image signals from the previous field or the previous frame in accordance with the detected area of the reference dot so as to binarize the present field or the present frame by using the modified threshold values. Therefore, in a case where the code images are successively read over a plurality of frames, the quantity of light and the recording conditions are not changed considerably and, therefore, the threshold value can be determined by making a reference to the value of the previous frame. Thus, a memory for storing images can be omitted and a real time process can be performed.

A fourth embodiment of the information reproducing system according to the present invention will now be described.

In a case where a reference dot, which cannot reliably be detected, or a reference dot having a stable area and thus having poor correlation with the data dots 282 has been selected, the data dots 282 cannot easily be allow to approach a required size. Accordingly, this embodiment uses the data dots 282 or an isolated dot recorded similarly to that of the data dots 282, for example, an isolated dot having substantially the same size and the same shape as those of the data dots 282.

Figure 10A:
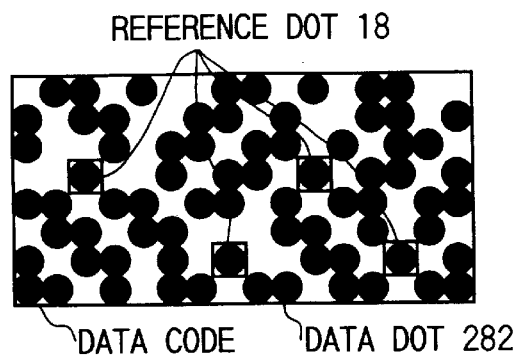
FIGS. 10A and 10B are diagrams showing dot codes for use in a fourth embodiment of the information reproducing system according to the present invention and as well as in a first embodiment of an information recording medium according to the present invention.

For example, an isolated dot among data dots is searched to be used as the reference dot 18, as shown in FIG. 10A.

Figure 10B:
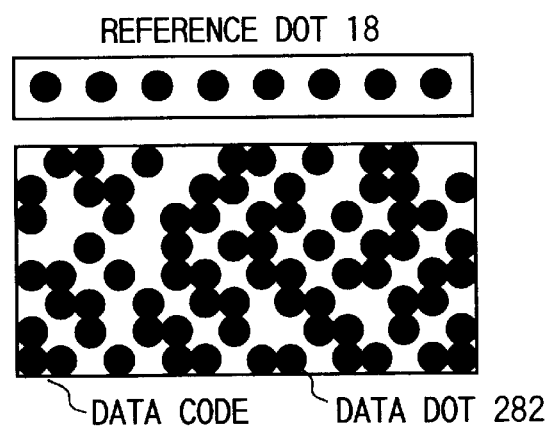

As an alternative to this, as shown in FIG. 10B, a region for a reference dot is provided in another region for the data dots 282 so as to record an isolated dot in the provided region so as to be used as the reference dot 18.

That is, a dot recorded in a state similar to that of the data dots 282 is used as the reference dot 18 so that the data dots 282 can reliably be allowed to approach a target area.

That is, since the isolated dot does not interfere with another dot, the area can accurately be measured and the recording state approximates the data dots 282 which must be read. By using the binarizing state of the reference dot 18 as a reference for determining whether the binarizing state is acceptable, an optimum binarizing state can be realized.

Figure 11A:
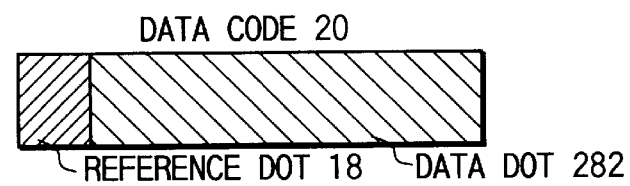
FIGS. 11A and 11B are diagrams respectively showing examples of other dot codes to be recorded on an information reproducing medium according to a first embodiment of the present invention.
Figure 11B:
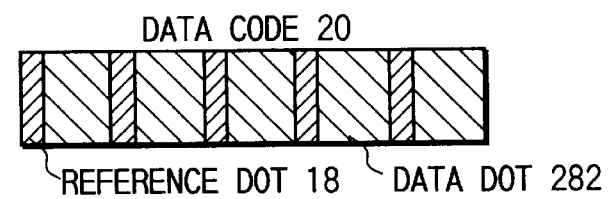

The reference dot 18 may be disposed on the code at the leading end of the same as shown in FIG. 11A, or the same may be repeated at intermediate positions of the code, as shown in FIG. 11B.

A fifth embodiment of the information reproducing system according to the present invention will now be described.

According to the fifth embodiment, the dot code 170 recorded on the information recording medium 12 comprises a data code 20 corresponding to multimedia information and a pattern code 22 for determining a position at which the data code 20 is read. Moreover, at least a portion of the pattern code 22 is used as the reference dot 18. The pattern code 22 has been described in detail in U.S. Ser. No. 08/571,776 (corresponding to EP 0,717,398 A3) filed by the applicant of the present invention.

Figure 12:
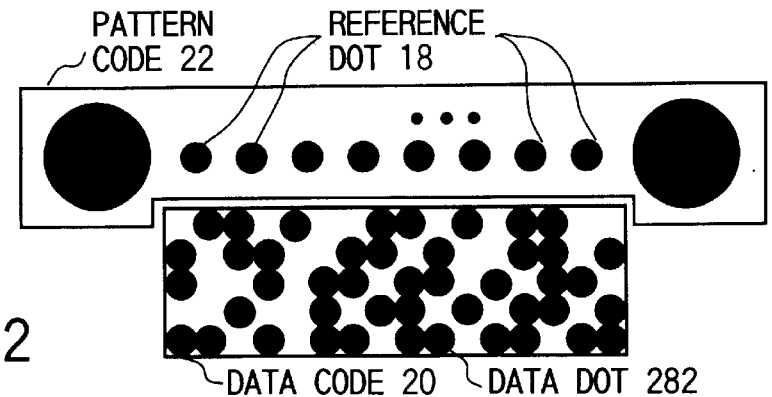
FIG. 12 is a diagram showing a dot code for use in a fifth embodiment of the information reproducing system according to the present invention.

Specifically, the pattern dot 278 in the pattern code can be used as the reference dot 18, as shown in FIG. 12.

Figure 13:
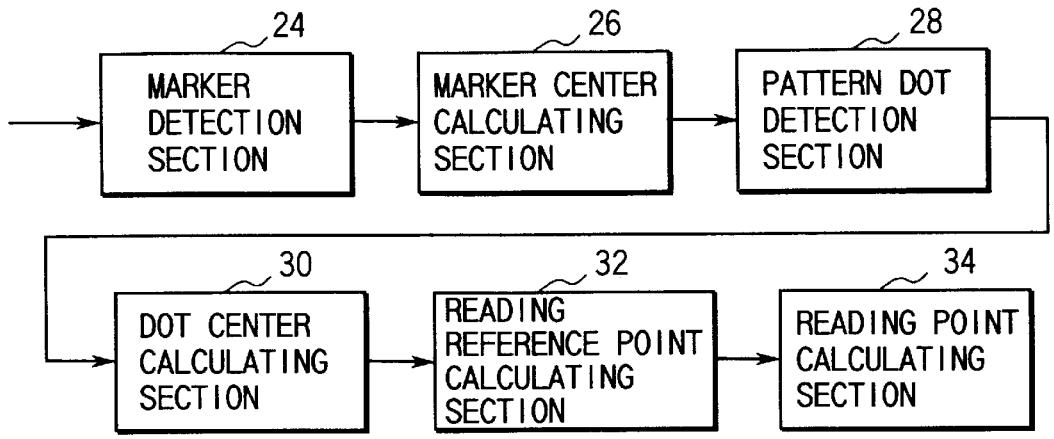
FIG. 13 is a block diagram showing a fifth embodiment of an information reproducing system according to the present invention.

That is, data dots 282 in the data code 20 have centers disposed in a lattice configuration. To decrease reading errors, the reading points must accurately be aligned to the lattice points. Accordingly, the code reading section 10 having the structure as shown in FIG. 13 uses the pattern dots 278 in the pattern code 22 to accurately determine the reading points.

Figure 14:
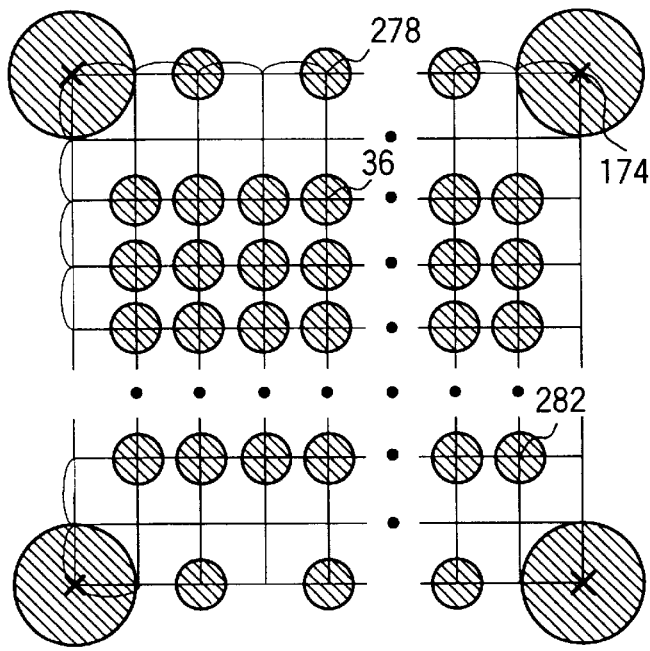
FIG. 14 is a diagram for explaining reading points.

That is, a marker detection section 24 detects the marker 174, and a marker center calculating section 26 calculates the centroid of the marker 174. Since the calculated specific centroid is, at this time, unsatisfactory in a viewpoint of accuracy to serve as a reference point for reading data dots recorded densely, it is called a "substantial center". To improve the accuracy, a pattern dot detection section 28 detects the pattern dots 278 from the above-mentioned substantial center in accordance with a known code format. The centroids of the pattern dots 278 are calculated by a dot center calculating section 30. By using distribution of the positions of the centroids, the reading reference point calculating section 32 calculates reading reference points. The reading reference points exhibit satisfactory accuracy because the error in each centroid can be averaged by the number of the pattern dots. Therefore, the reading reference point is called a true center. Then, a reading point calculating section 34 equally divides the distance between the thus-obtained true centers in accordance with the code format as shown in FIG. 14 to obtain reading points so as to read the data dots 282.

Figure 15:
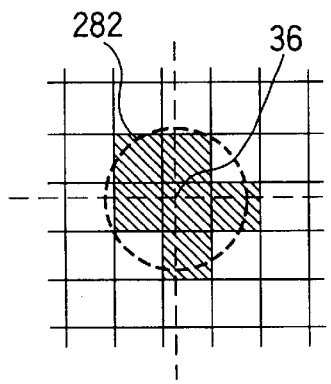
FIG. 15 is an enlarged view of a peripheral portion of a data dot obtained by picking up an image of a data code by a CCD and by binarizing the data code.

FIG. 15 is an enlarged view of a peripheral portion of the data dot 282 obtained when the image of the data code 20 has been picked up by a CCD and then it has been binarized. On the surface of the CCD, a dot recorded densely cannot be picked up in the form of a circular shape and black pixels are formed in only regions in which the dots overlap the CCD pixels by half or greater. Therefore, to decrease reading errors, the portion in the vicinity of the center of the dot, on which the state of the dot is reflected must be read. Thus, the foregoing process is required. The processes to be performed by respective processing sections may be those disclosed in, for example, U.S. Ser. No. 08/571,776 corresponding to EP 0,717,398 A3.

Figure 16:
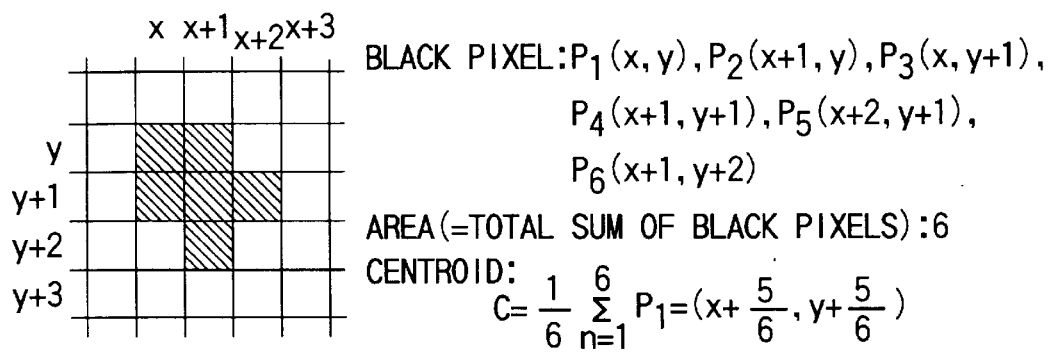
FIG. 16 is a diagram for explaining another method of calculating the centroid.

The marker center calculating section 26 and the dot center calculating section 30 are able to calculate the centroid by dividing the total sum of coordinates of black pixels forming the dot by the total sum of the black pixels, that is, the area of the dot as shown in FIG. 16.

As described above, since the pattern dot 278, which is a portion of the pattern code 22, is an isolated dot having substantially the same size and the same shape as those of the data dots 282 and the code reading section 10 calculates its area for detecting the centroid in order to determine the reading positions, the process to be performed by the reference dot detection section 14A and that to be performed by the dot area measuring section 14B can be made to be a common process. Therefore, the efficiency can be improved.

Figure 17:
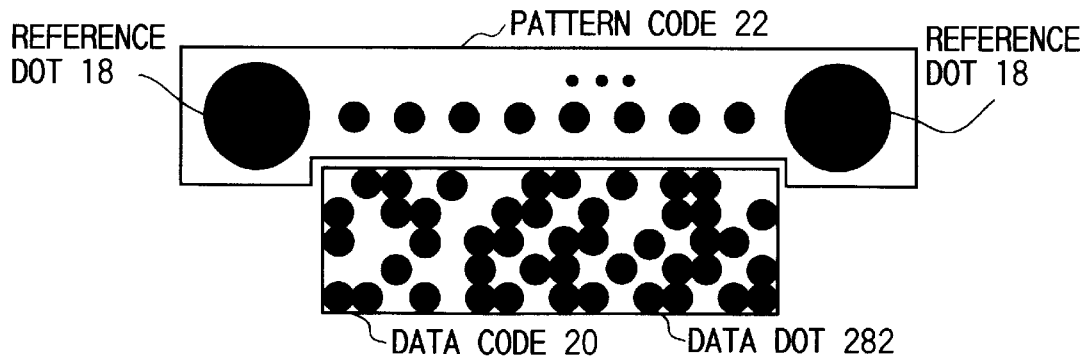
FIG. 17 shows another example of the dot code for use in a fifth embodiment of the information reproducing system according to the present invention.

As an alternative to this, the marker 174 in the pattern code may be used as the reference dot 18, as shown in FIG. 17.

That is, since the marker 174, which is a portion of the pattern code 22, is detected in an initial stage of the reading process and its area has been calculated to detect the centroid for determining the position, use of a result of the calculation enables the process to be performed efficiently.

A sixth embodiment of the information reproducing system according to the present invention will now be described.

Figure 18:
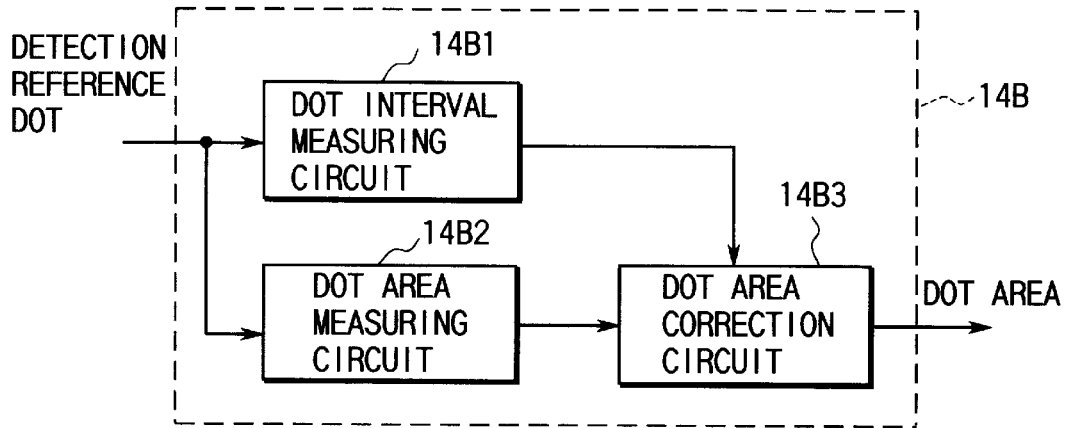
FIG. 18 is a block diagram showing a sixth embodiment of an information reproducing system according to the present invention.

In the sixth embodiment, the dot area measuring section 14B is, as shown in FIG. 18, composed of a dot interval measuring circuit 14B1, a dot area measuring circuit 14B2 and a dot area correction circuit 14B3. The dot interval measuring circuit 14B1 measures the distance between predetermined dots forming the pattern code 22, for example, that between markers. The dot area measuring circuit 14B2 measures the area of the pattern dots 278 forming the pattern code 22 which is the reference dot 18. The dot area correction circuit 14B3 corrects the area or the target value of the reference dot 18 measured by the dot area measuring circuit 14B2 in accordance with the interval between dots measured by the dot interval measuring circuit 14B1.

Figure 19:
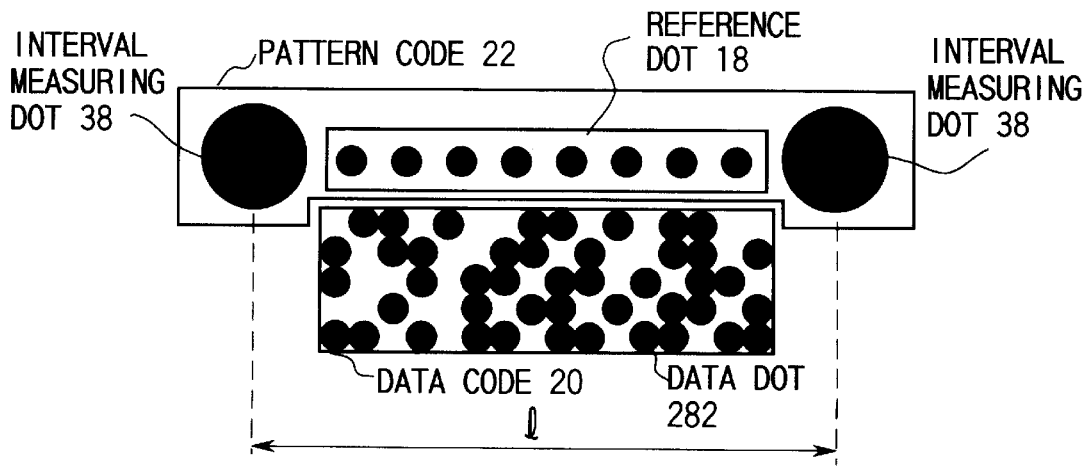
FIG. 19 is a diagram showing a dot code for use in a sixth embodiment of the information reproducing system according to the present invention.

That is, as shown in FIG. 19, a pair of markers is detected as interval measuring dots 38, the interval between which must be measured, to calculate distance l between the markers. Since a plurality of pairs of markers can be searched usually in one image pickup area (a frame), an average distance between markers obtainable by calculating the average value is used as reference dot interval L. Assuming that the area before the correction is S, corrected area S' can be obtained, for example, as follows:

$$S' = \left(\frac{l}{L}\right)^2 S$$

As described above, the distance between dots in a code having a predetermined positional relationship is measured. Then, in accordance with the measured distance, at least either of the area of the reference dot 18 or the target value of the same is corrected so that change in the dot area occurring due to upward or downward movement or distortion of the camera is corrected. As a result, the area can stably be measured.

Moreover, even if the magnification of the optical system is changed, a required operation can be performed. Moreover, a code (for example, 50 µm or 60 µm) printed at a different printing magnification can be read.

A seventh embodiment of the information reproducing system according to the present invention will now be described.

The seventh embodiment is arranged such that the reference dot detection section 14A detects a plurality of reference dots 18 and the dot area measuring section 14B calculates the average area of the detected plural reference dots 18.

That is, as shown in FIG. 20, a dot area measuring circuit 14B4 measures the area of each reference dot 18, a dot counting circuit 14B5 counts the number of the reference dots 18, the area of each of which has been measured, and an average area calculating circuit 14B6 divides the total sum of the areas of the reference dots 18 by the number of the reference dots 18 to calculate the average dot area.

In a case where the reference dot 18 is sampled by plural pixels in the longitudinal and lateral directions, the area of the reference dot 18 cannot stably be calculated because of the relative position of the reference dot 18 with respect to the pixel and noise. Therefore, the area, which is used as the reference of the binarizing process, cannot stably be calculated. Accordingly, the seventh embodiment has a structure such that a plurality of reference dots 18 are previously recorded, and then the reference dots 18 are detected. Then, a process for averaging the plural reference dots 18 is performed to improve the reliability. That is, the average area of the plural reference dots 18 is calculated so that influence of change in the area and noise occurring due to the positional relationship can be set off. Thus, the area can further accurately be calculated.

An eighth embodiment of the information reproducing system according to the present invention will now be described.

In addition to the structure according to the seventh embodiment, the eighth embodiment has an additional structure arranged such that the area of sum reference dot 18 is excluded from the calculation for obtaining the average area if the measured area of the some reference dot 18 is larger than a predetermined range.

As shown in FIG. 21, a dot selection section 14B7 is provided to cause the dot counting circuit 14B5 to perform the counting operation and the average area calculating circuit 14B6 to perform the average area calculating operation only when the area of the reference dot 18 measured by the dot area measuring circuit 14B4 is included in a predetermined range.

As shown in FIG. 22, registers SS and $S_{num}$ are initialized to "0" (step S21), and then whether or not detection has been completed is determined (step S22). If detection has not been completed, area S of the i-th reference dot 18 is calculated by the dot area measuring circuit 14B4 (step S23). Then, the dot selection section 14B7 determines whether or not the calculated area $S_i$ is included in a predetermined range, that is, from first threshold value $TH_1$ and second threshold value $TH_2$ (step S24). Note that assumptions are performed that $TH_1$ and $TH_2$ hold a relationship as $TH_1 < TH_2$, as shown in FIG. 23.

If the calculated area S is not included in the foregoing range, a determination is performed that the calculated area S is a dot area calculated erroneously attributable to a stain or blurring. Thus, the area S is deleted, and then the operation returns to step S22 so that the operation proceeds to process a next reference dot 18.

If the calculated area $S_i$ is included in the foregoing range, the calculated area S is added to the value of the register SS, and the value of the register $S^{num}$ calculated by the dot counting circuit 14B5 is increased (step S25), and then the operation returns to step S22.

After detection has been completed, the average area calculating circuit 14B6 divides the value of the register SS by the value of the register $S_{num}$ so that average area $S_{avg}$ is calculated (step S26).

If dot area $S_4$ is thickened attributable to blurring and dot area $S_7$ is thinned attributable to patchy portion, the area $S_4$ is larger than second threshold value $TH_2$ and the area $S_7$ is smaller than first threshold value $TH_1$. Therefore, the dot selection section 14B7 rejects the foregoing areas from calculation of the average area. Therefore, the number of dots which is counted by the dot counting circuit 14B5 is six, that is, $S_1$, $S_2$, $S_3$, $S_5$, $S_6$ and $S_8$. The average area to be calculated by the average area calculating circuit 14B6 is the average of the six areas.

By excluding the dot areas calculated erroneously attributable to a stain, a patchy portion or blurring as described above, the average area can stably be calculated.

A ninth embodiment of the information reproducing system according to the present invention will now be described.

The reference dot 18 cannot correctly be detected attributable to noise or the like in an inappropriate printing state or image pickup state. If the threshold value is modified to correspond to the reference dot 18 detected in the foregoing state, an inappropriate threshold value is set. The reference dot 18 cannot be detected from an image binarized with the inappropriate threshold value and restoration to a normal threshold value is sometime inhibited.

Accordingly, the ninth embodiment has a structure such that modification of the threshold value with the reference dot area is not performed if the reference dots 18 satisfying the conditions cannot be detected by a number not less than a predetermined number.

As shown in FIGS. 25 and 26, the threshold value modifying section 14C supplies, to a threshold value modification selection circuit 14C1a forming a threshold value holding section 14C1, the total sum $S_{num}$ of the reference dots 18 counted by the dot counting circuit 14B5 of the dot area measuring section 14B to determine whether the total sum $S_{num}$ is larger than third threshold value $TH_3$ (step S31). If the total sum $S_{num}$ is not larger than the third threshold value $TH_3$, the operation for modifying the threshold value which is performed by the threshold value modifying circuit 14C2 is not performed but threshold value th stored in a threshold value stored circuit 14C1b is transmitted (step S32). If the detected total sum $S_{num}$ is larger than the third threshold value $TH_3$, the threshold value modifying circuit 14C2 performs the threshold value modifying operation (+Δth) so as to transmit modified threshold value th (step S33).

If the reference dots 18 are twelve pattern dots 278 disposed between markers and if six blocks 272 are placed in one image pickup area (a frame), 96 reference dots are detected. When scanning is started, the image pickup operation starts in a state where the dot code 170 is substantially introduced into the image pickup area. Thus, there is a risk that the modification of the threshold value starts at an unsatisfactory reference dot 18. Accordingly, it is preferable that the third threshold value $TH_3$ be dots for about two blocks, that is, about 48 (12×4) dots. However, lack of one or two dots sometimes takes place for some reason or other, dots by a number larger than 40 are detected in this embodiment.

As described above, by employing the structure such that the threshold value is not modified if the satisfactory number of reference dots 18 cannot be detected, the reliability of the threshold value can be maintained. That is, since the image of the block 272 cannot satisfactorily be picked up when scanning is started, modification of the threshold value in the foregoing state sometimes deteriorates the result. Thus, modification of the threshold value is inhibited in the foregoing case so as to maintain the reliability.

A tenth embodiment of the information reproducing system according to the present invention will now be described.

Figure 27:
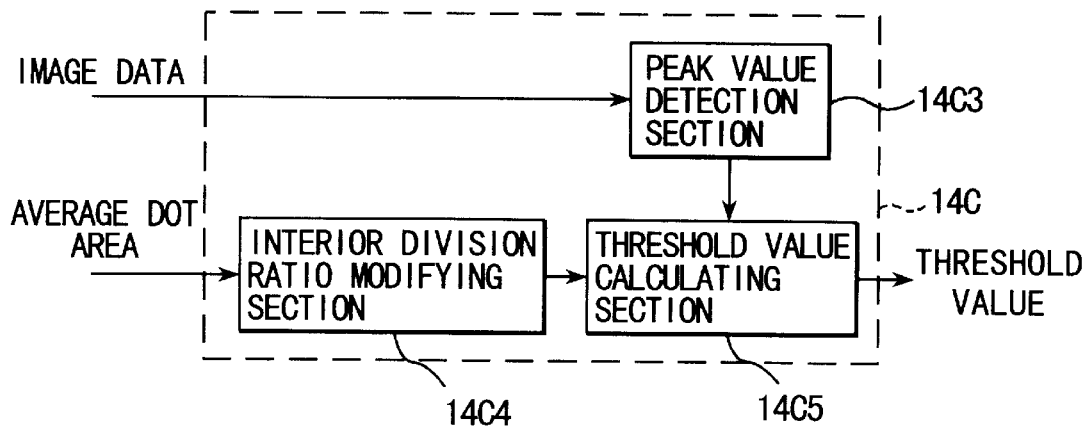
FIG. 27 is a block diagram showing a tenth embodiment of an information reproducing system according to the present invention.

According to the tenth embodiment, the threshold value modifying section 14C comprises a peak value detection section 14C3, an interior division ratio modification section 14C4 and a threshold value calculation section 14C5, as shown in FIG. 27. The peak value detection section 14C3 detects the maximum and minimum values of the luminance from a predetermined region to be detected. The interior division ratio modification section 14C4 modifies the interior division ratio in accordance with the amount of modification of the interior division ratio calculated from the difference between the area measured by the dot area measuring section 14B and a predetermined target value. The threshold value calculation section 14C5 divides the value detected by the peak value detection section 14C3 by the interior division ratio modified by the interior division ratio modification section 14C4 so as to calculate the threshold value.

Figure 28:
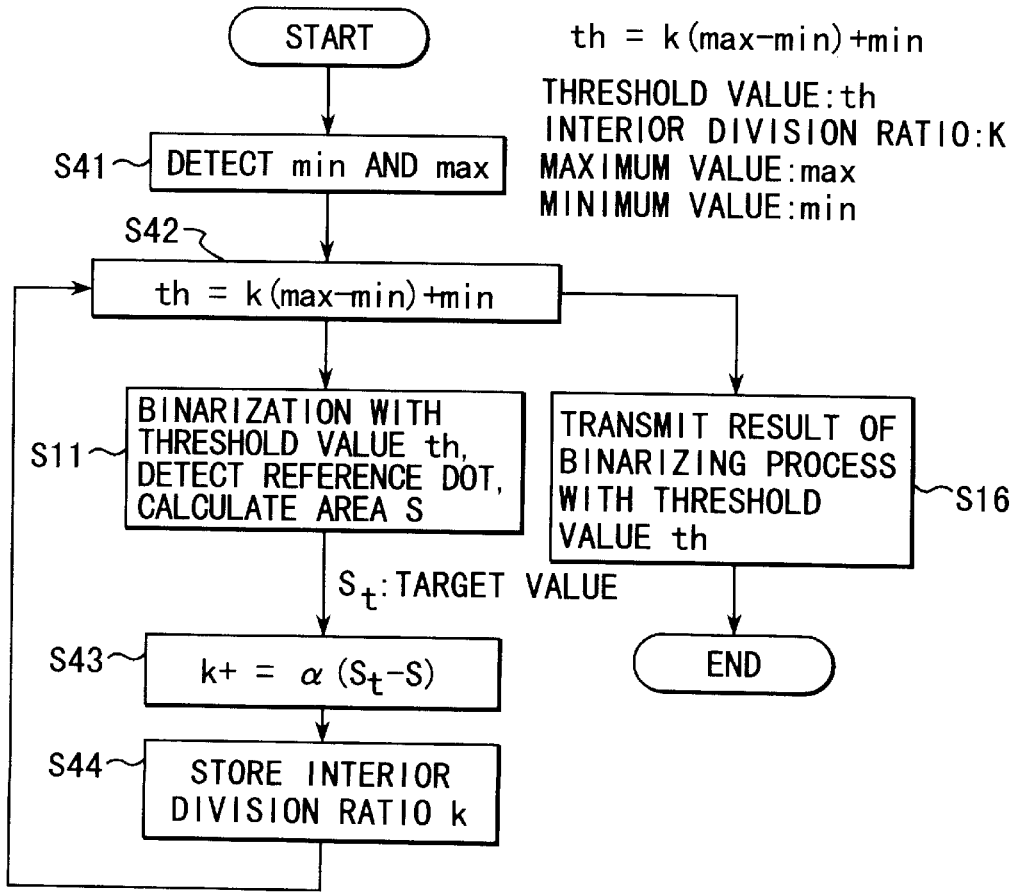
FIG. 28 is a flow chart showing the operation of the information reproducing system according to a tenth embodiment of the present invention.

With the foregoing structure, the peak value detection section 14C3, as shown in FIG. 28, detects, from image data, maximum value max and minimum value min which are peak values (step S41). The threshold value calculating section 14C5 interiorly divides the peak values by interior division ratio k so as to calculate the threshold value th (step S42). That is, the threshold value th can be calculated as follows:

$$th = k(\max - \min) + \min \qquad (1)$$

Note that the interior division ratio k is a ratio modified and stored by the interior division ratio modification section 14C4 as described later.

Thus, the reference dot 18 binarized by the calculated threshold value th is detected by the reference dot detection section 14A, the dot area measuring section 14B calculates its area S (step S11), and the interior division ratio modification section 14C4 modifies the interior division ratio k in accordance with the amount of modification of the interior division ratio calculated from the difference between the calculated area S and target value $S_t$ (step S43). That is, a value obtained by adding, to the interior division ratio k, the amount of modification obtained by multiplying the difference ($S_t - S$) between the calculated area S and the target value $S_t$ by a predetermined coefficient α is employed as a new interior division ratio k. The thus-obtained updated interior division ratio k is stored (step S44), and then the operation returns to step S42 so that the threshold value th is updated.

As described above, the threshold value th which is updated for each frame is supplied to the threshold value determining section 14D, and a result of the binarizing process is supplied to the information reproducing section 16 (step S16).

When the interior division ratio is modified as described above, the threshold value is able to easily follow change in the quantity of light as compared with the direct modification of the threshold value. Therefore, the amount of modification of the interior division ratio is reduced and convergence is performed quickly. Since the dot area does not depend on the change in the quantity of light, the binarizing process can stably be performed while reflecting the state of recording of the dot code 170.

Figure 29:
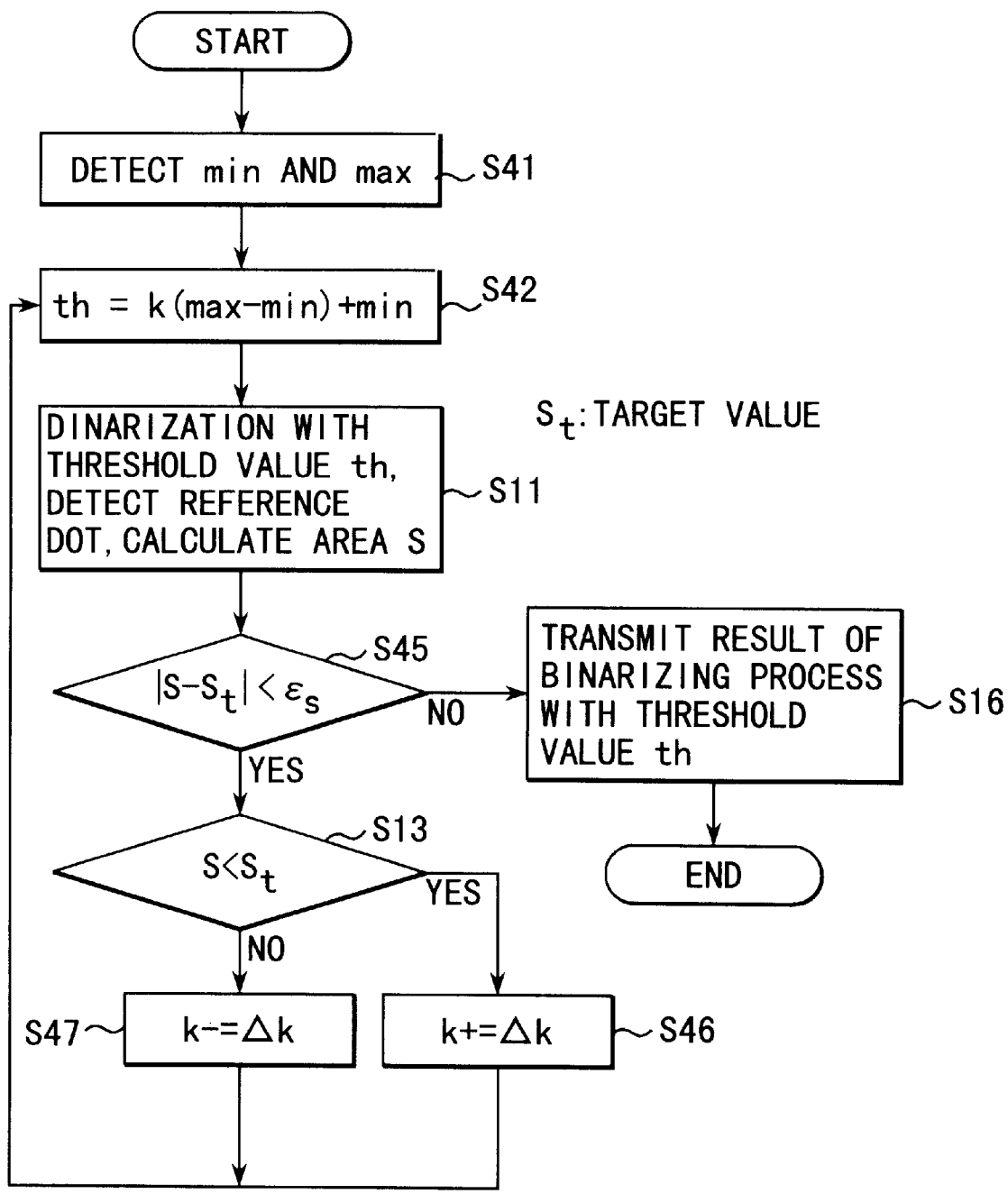
FIG. 29 is a flow chart showing another example of the operation of the information reproducing system according to the tenth embodiment of the present invention.

The tenth embodiment may be arranged as shown in FIG. 29.

That is, the peak value detection section 14C3 detects, from image data, maximum value max and minimum value min which are the peak values (step S41). Then, the threshold value calculating section 14C5 interior-divides the peak values by the interior division ratio k so that the threshold value th is calculated (step S42). A reference dot 18 binarized with the threshold value th is detected by the reference dot detection section 14A, and the dot area measuring section 14B calculates its area S (step S11).

Then, the interior division ratio modification section 14C4 determines whether the difference between the calculated area S and the target value $S_t$ is smaller than a predetermined value $\epsilon_s$ (step S45). If the difference is smaller than the predetermined value $\epsilon_s$, the foregoing threshold value th is supplied to the threshold value determining section 14D so that a result of the binarizing process performed by the threshold value determining section 14D is supplied to the information reproducing section 16 (step S16).

If the difference is not smaller than the predetermined value $\epsilon_s$, the interior division ratio is modified. In this case, whether or not the calculated area S is smaller than the target value $S_t$ (step S13) is determined. If the calculated area S is smaller than the target value $S_t$, the interior division ratio is increased by Δk (step S46). If the calculated area S is not smaller than the target value $S_t$, the interior division ratio is decreased by Δk (step S47).

As described above, the peak values are detected from the image signal, the threshold value is calculated with the initial interior division ratio, binarization is performed with the threshold value, the reference dot 18 is detected to measure its area, whether or not the difference between the calculated area and the target value is smaller than a predetermined value is determined, if it is smaller than the predetermined value, then binarized data at this time is transmitted, if it is not smaller than the predetermined value, then the interior division ratio is modified to again calculate the threshold value so as to binarize it. The foregoing repetition enables binarization of the target dot size to be reliably performed.

An eleventh embodiment of the information reproducing system according to the present invention will now be described.

Figure 30:
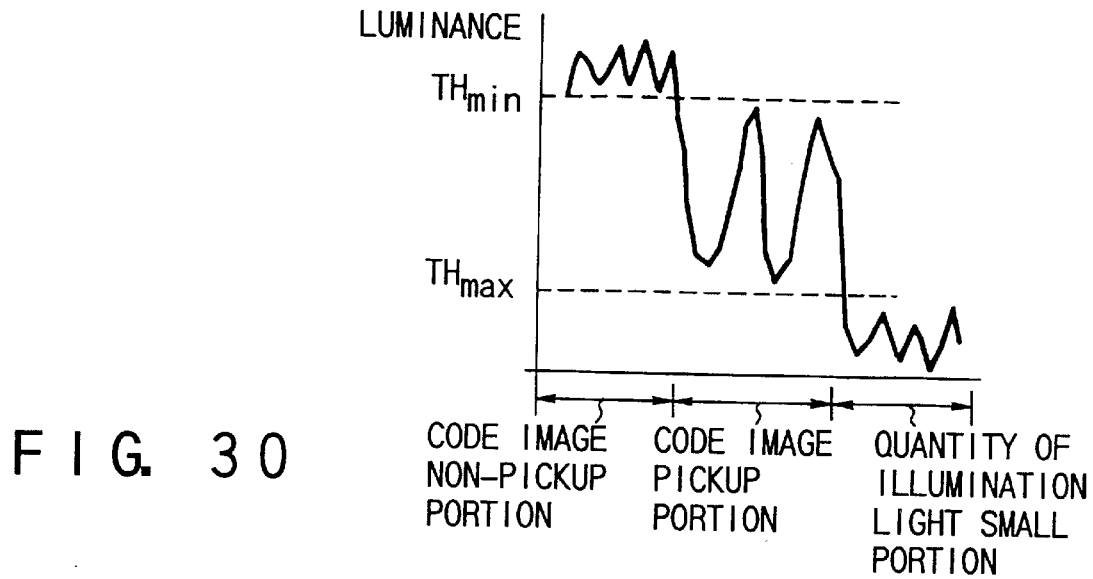
FIG. 30 is a diagram showing the operation of an eleventh embodiment of the information reproducing system according to the present invention.

In the eleventh embodiment, if the minimum value of the luminance is smaller than the threshold minimum value $TH_{min}$, a determination is, as shown in FIG. 30, performed that the dot code 170 does not exist and only the image of the surface of the information recording medium 12 is picked up so that the process is interrupted. If the maximum value of the luminance is smaller than the threshold maximum value $TH_{max}$, a determination is performed that the dot code 170 is not sufficiently irradiated with light and process is interrupted also in this case.

Figure 31:
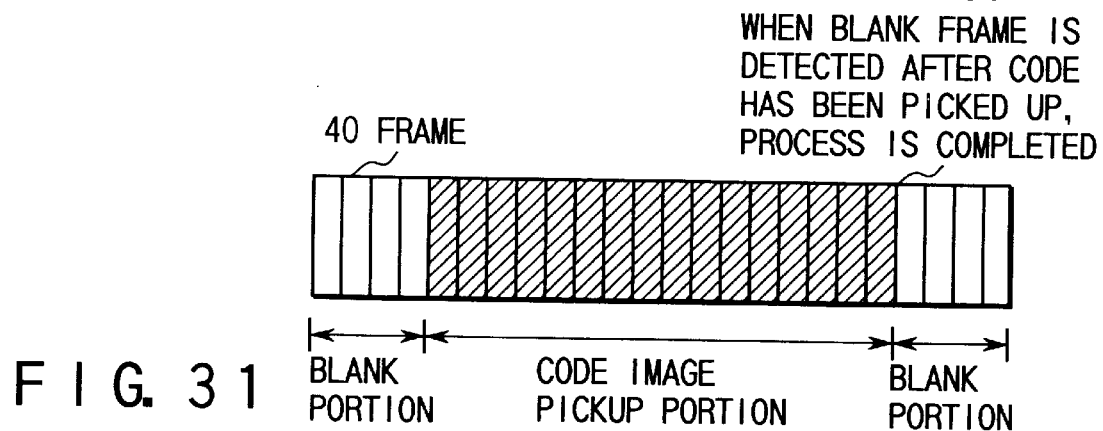
FIG. 31 is a diagram showing a frame obtained in a case where a dot code has been scanned by a handy scanner.

When the dot code 170 is scanned by a handy scanner, the image of the dot code 170 cannot be picked up in a plurality of leading and trailing frames among the plurality of the frames 40 which can continuously be obtained, thus causing a possibility to arise in that full white image being formed, as shown in FIG. 31. If the scanner is moved upwards during the scanning operation, there is a possibility that a full black image is picked up.

Accordingly, the eleventh embodiment is structured such that when the maximum value and a minimum value of the luminance have been detected from a predetermined region and when the detected values are larger than predetermined ranges, a determination is performed that the image of the dot code 170 is not correctly picked up and the following process is interrupted. As a result, processes of an inappropriate screen for reading the dot code 170 can be interrupted. Thus, a wasteful process can be omitted and the process speed can be raised.

Figure 32:
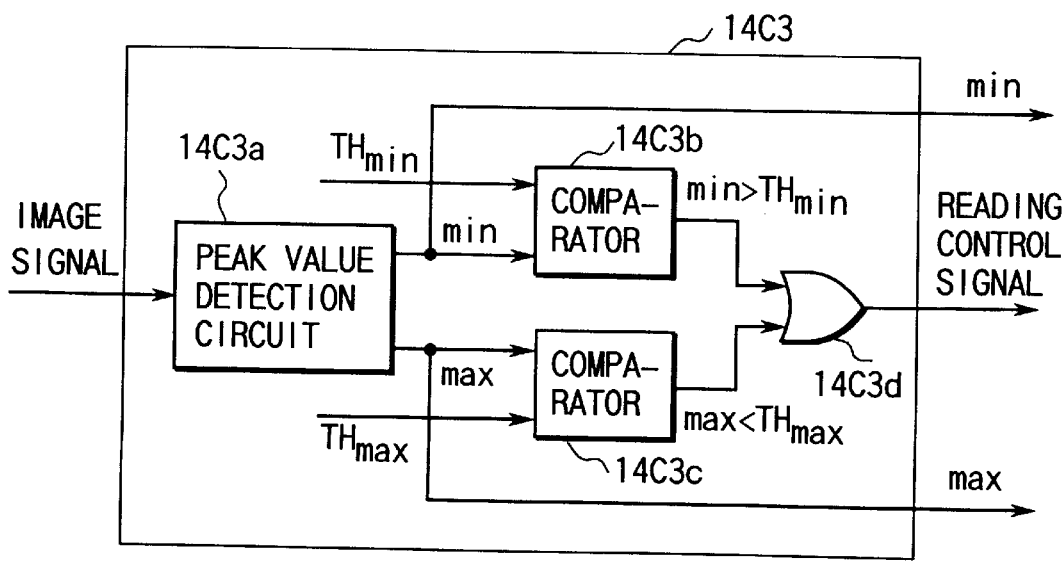
FIG. 32 is a block diagram showing an eleventh embodiment of an information reproducing system according to the present invention.

FIG. 32 is a diagram showing the structure of the eleventh embodiment. A peak value detection circuit 14C3a detects, from image data, maximum value max and minimum value min which are peak values. A comparator 14C3b subjects the detected minimum value min and the threshold minimum value $TH_{min}$ to a comparison. A comparator 14C3c subjects the detected maximum value max and the threshold maximum value $TH_{max}$ to a comparison. An OR gate 14C3d transmit, to the following unit, a reading control signal to instruct interruption of the following processes of the subject frame if a result of the comparison performed by the comparator 14C3b is such that the minimum value min is larger than the threshold minimum value $TH_{min}$ or a result of the comparison performed by the comparator 14C3c is such that the maximum value max is smaller than the threshold maximum value $TH_{max}$.

Figure 33:
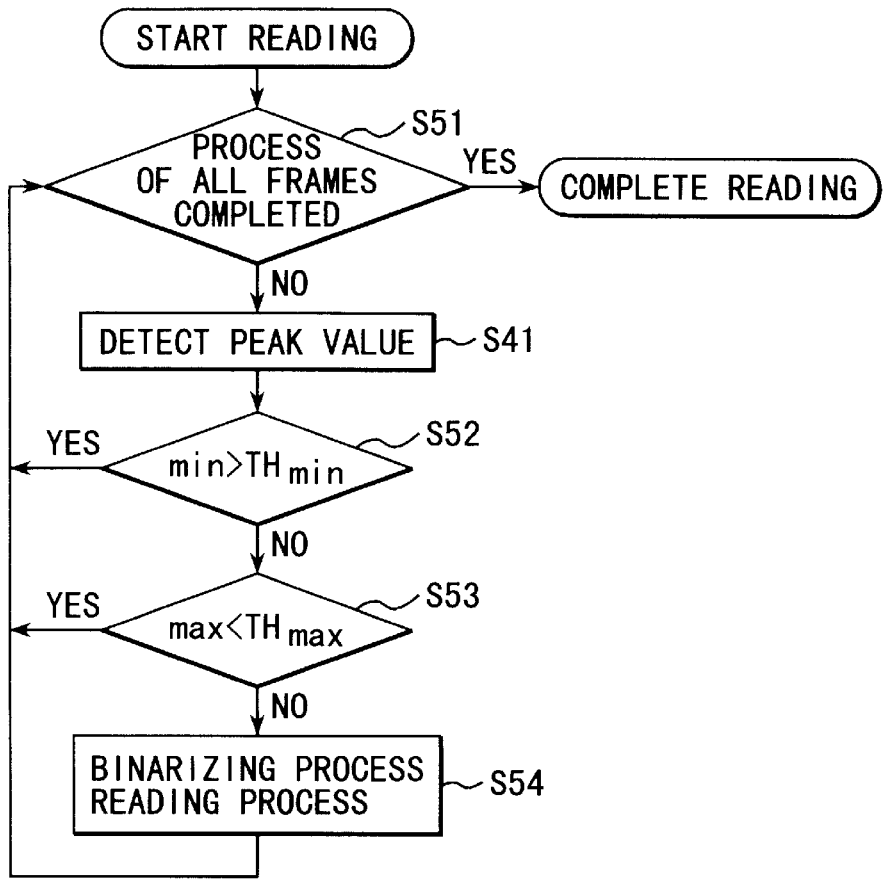
FIG. 33 is a flow chart for, by a software manner, realizing the eleventh embodiment of the information reproducing system according to the present invention.

FIG. 33 shows a flow chart for realizing the foregoing structure by a software manner. Initially, whether or not the process of the overall frame has been completed is determined (step S51). If the process has not been completed, the maximum value max and the minimum value min, which are the peak values, are detected from image data (step S41). Then, whether or not the minimum value min is larger than the threshold minimum value $TH_{min}$ is determined (step S52). If the minimum value min is larger than the threshold minimum value $TH_{min}$, the operation returns to step S51 so that a determination whether or not a next frame exists is performed.

If the minimum value min is not larger than the threshold minimum value $TH_{min}$, whether or not the detected maximum value max is smaller than the threshold maximum value $TH_{max}$ is determined (step S53). If the maximum value max is smaller than the threshold maximum value $TH_{max}$, the process of the subject frame is interrupted and operation returns to step S51 so that a determination whether or not a next frame exists is performed.

If the maximum value max is not smaller than the threshold maximum value $TH_{max}$, the foregoing binarizing process and the reading process are performed (step S54).

A twelfth embodiment of the information reproducing system according to the present invention will now be described.

Figure 34:
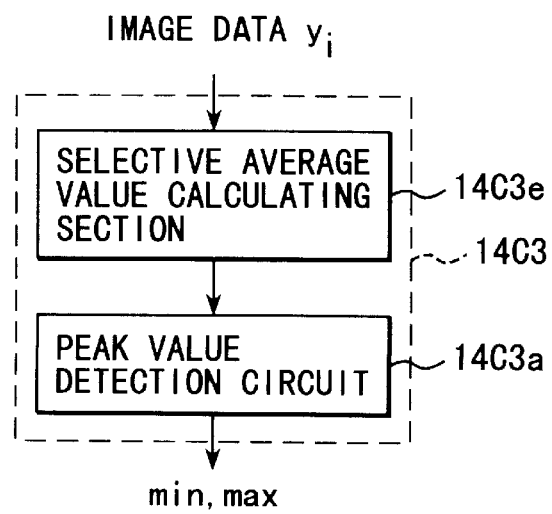
FIG. 34 is a block diagram showing a twelfth embodiment of an information reproducing system according to the present invention.

In this embodiment, as shown in FIG. 34, the peak value detection section 14C3 has a selective average value calculating section 14C3e disposed in front of the peak value detection circuit 14C3a, the selective average value calculating section 14C3e being structured to calculate the absolute value of the difference between adjacent pixels of the pixel of interest. Only when a result of the calculation is smaller than a predetermined threshold value, the selective average value calculating section 14C3e calculates the average value of the adjacent pixels. The peak values are detected from the calculated average value of luminance.

If the image pickup section 204, for example, a CCD includes a defective pixel when the image of the dot code 170 is picked up, the output of the pixel is changed considerably and adversely affects the peak value detection.

Accordingly, the twelfth embodiment has a structure such that the amount of change of the pixel values adjacent to the pixel of interest is obtained. If the amount is smaller than a predetermined threshold value, the average value of the pixel values is supplied to the peak value detection circuit 14C3a.

Figure 35:
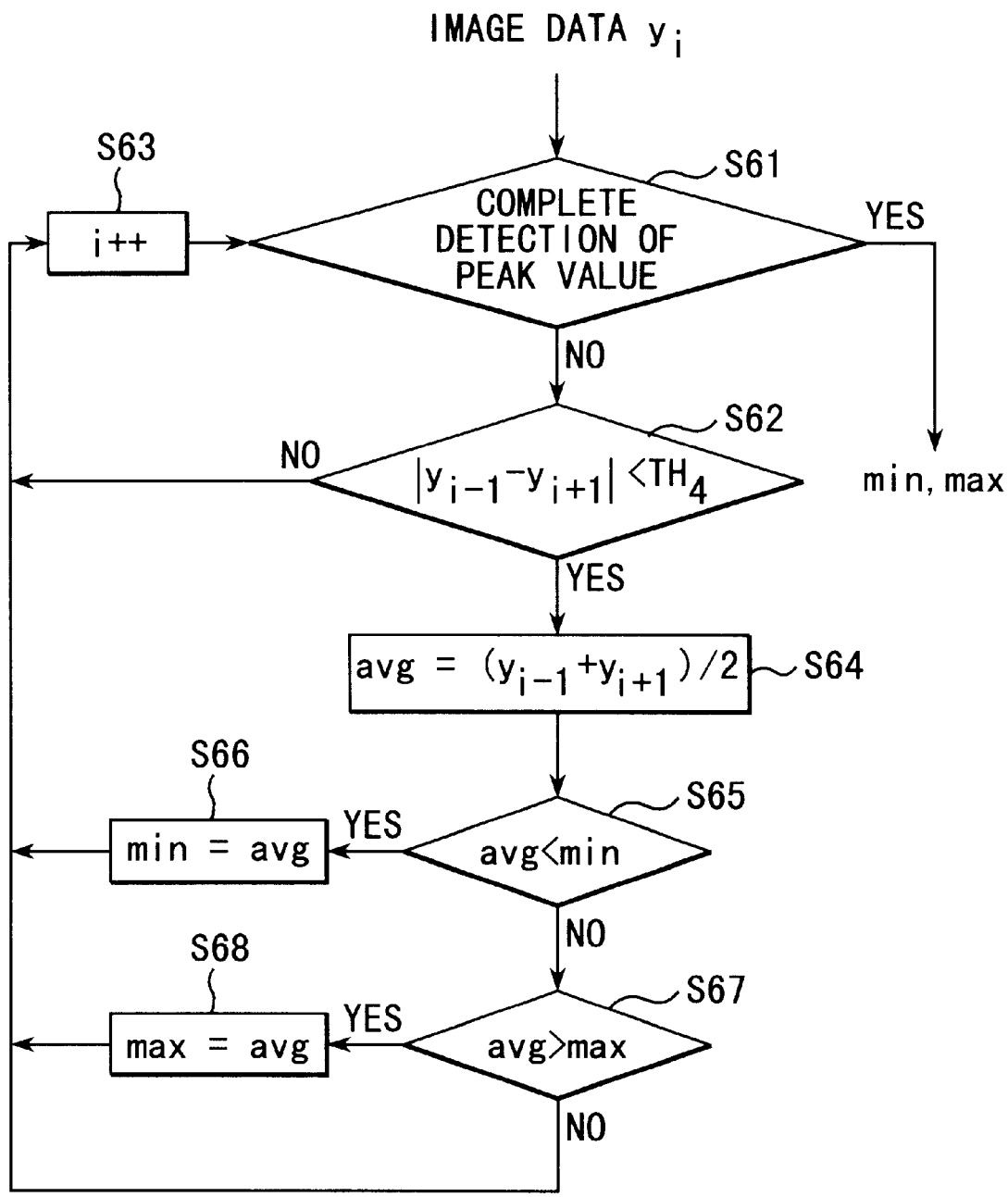
FIG. 35 is a flow chart showing the operation of the information reproducing system according to the twelfth embodiment of the present invention.

FIG. 35 is a flow chart of the operation of the twelfth embodiment. Initially, whether or not the peak value detection circuit 14C3a has completed detection of the peak values in one frame is determined (step S61). If the detection has not been completed, the absolute value of the difference between the front and rearward pixels of the i-th pixel $y_i$ of interest, that is, $y_{i-1}$ and $y_{i+1}$ is obtained. Then, whether or not the absolute value is smaller than fourth threshold value $TH_4$ is determined (step S62). If the absolute value is not smaller than the fourth threshold value $TH_4$, a determination is performed that the pixel value of the pixel $y_i$ is not a maximal value and therefore the peak value detection circuit 14C3a does not detect the maximum and minimum values. Then, the value of the i register is increased (step S63), and then the operation proceeds to a process of a next pixel.

If the absolute value of the difference between the pixel values $y_{i-1}$ and $y_{i+1}$ is smaller than the fourth threshold value $Th_4$, a determination is performed that the foregoing portion is a portion in which the maximal value is obtained. Thus, average value avg is calculated (step S64). The average value avg can be calculated as follows:

$$avg = \frac{y_{i-1} + y_{i+1}}{2} \qquad (2)$$

Whether or not the calculated average value avg is smaller than the minimum value min obtained in the previous process of the foregoing pixel is determined by the peak value detection circuit 14C3a (step S65). If the average value avg is smaller than the minimum value min, the average value avg is employed as a new minimum value min (step S66). Then, the operation proceeds to step S63. If the average value avg is not smaller than the minimum value min, whether or not average value avg is larger than maximum value max obtained in the process of the previous pixel is determined (step S67). If it is larger than the maximum value max, the average value avg is employed as a new maximum value max (step S68). If it is not larger than the maximum value max, the operation proceeds to step S63 while employing the original maximum and minimum values.

As described above, if the image pickup section 204 has a defective pixel during the reading operation, erroneous detection of the peak values can be prevented. That is, considerable change in the output attributable to the defective pixel can be prevented and the influence of a small change attributable to noise can be eliminated. Thus, the peak values can stably be detected.

A thirteenth embodiment of the information reproducing system according to the present invention will now be described.

The thirteenth embodiment, as shown in FIG. 36A, has a structure such that the interior division ratio modification section 14C4 comprises a interior division ratio modification amount table 14C4a. Thus, the measured dot area S and a predetermined target value $S_t$ are used to determine the interior division ratio modification amount Δk in accordance with the interior division ratio modification amount table 14C4a.

The interior division ratio modification amount table 14C4a is structured, for example, as shown in FIG. 36B.

Thus, if the dot area S is 7.0 and the target value $S_t$ is 8.0, an amount of modification of 0.13 is obtained and transmitted.

By obtaining the interior division ratio modification amount $\Delta k$ from the table as described above, calculations can be omitted and approximation to an optimum interior division ratio can be realized by only one operation.

A fourteenth embodiment of the information reproducing system according to the present invention will now be described.

The fourteenth embodiment has a structure such that the interior division ratio modification section 14C4 uses a predetermined coefficient $\alpha$, the dot area S and the target value $S_t$ to calculate the interior division ratio modification amount $\Delta k$ in accordance with the following equation:

$$\Delta k = \alpha(S_t - S) \qquad (3)$$

If the dot area S and the interior division ratio k has a linear relationship as shown in FIG. 37, the modification amount $\Delta k$ can be obtained from the relationship between the dot area S and the target value $S_t$ by using the foregoing linear equation.

By calculating the interior division ratio modification amount $\Delta k$ by using the linear equation, the memory for storing the table according to the thirteenth embodiment can be omitted, the calculation can be facilitated and thus the size of the hardware can be reduced.

A fifteenth embodiment of the information reproducing system according to the present invention will now be described.

In the fifteenth embodiment, the foregoing coefficient $\alpha$ is not a fixed value. The coefficient $\alpha$ is made to be the same value as that in the previous modification or a smaller value during repetition of the modification of the interior division ratio.

In a case where the dot area S and the interior division ratio k have a relationship as indicated by a thick line A shown in FIG. 38 and in a case where the dot area S obtained from binarization of the first frame with a certain interior division ratio $k_a$ is located at a position indicated by a dashed line B, the modification amount $\Delta k_1$ is calculated from the foregoing value in accordance with inclination $1/\alpha_1$, for example, "1/16". As a result, the interior division ratio k at the second frame is made to be $k_b$ and the measured dot area S is located at a position indicated by dashed line C. Then, the modification amount $\Delta k_2$ is calculated in accordance with inclination $1/\alpha_2$, for example, "1/32". As described above, graduate approach to the target value $S_t$ is performed.

As described above, a relatively larger coefficient $\alpha$ is employed in the initial stage of the modification so that the convergence is completed quickly and the following up characteristic can be improved. If a large value is employed in the latter half of the modification, convergence is inhibited and oscillation takes place. Therefore, $\alpha$ is gradually reduced as the process proceeds to the latter half of the modification so that oscillation is prevented.

Figure 39:
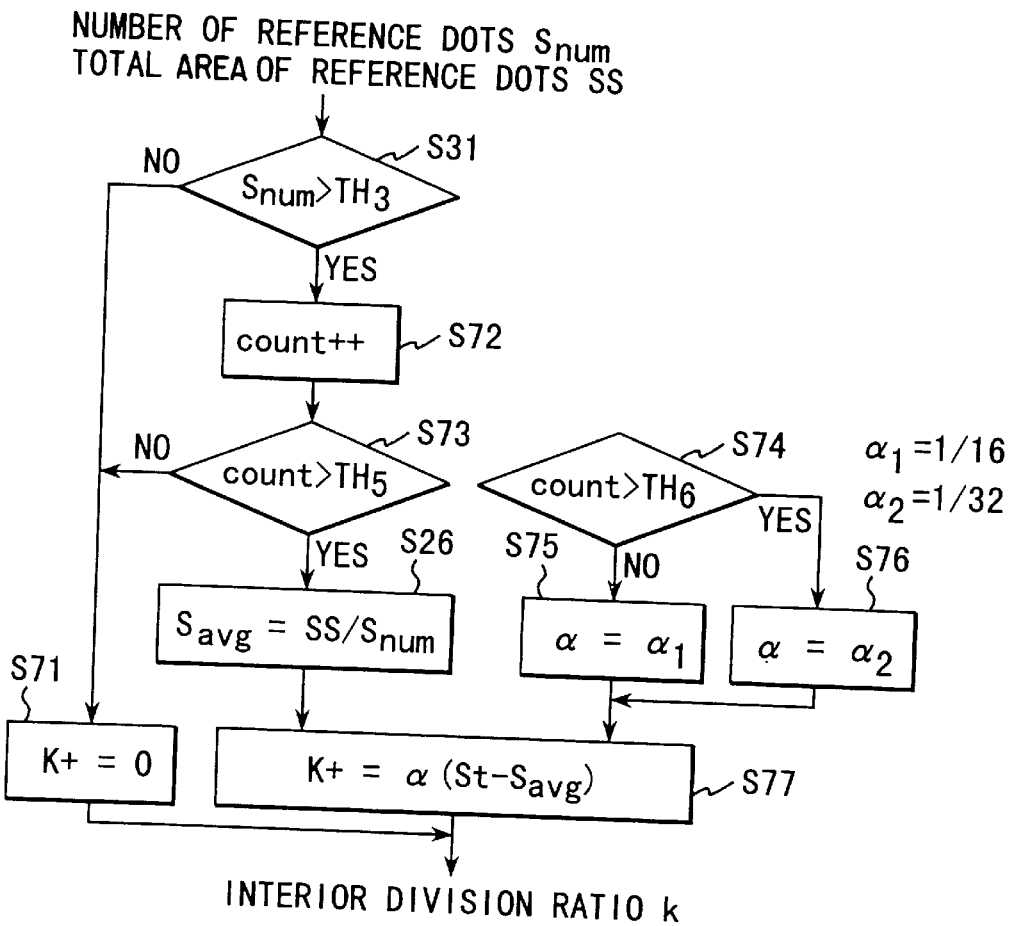
FIG. 39 is a flow chart showing the operation of the information reproducing system according to the fifteenth embodiment of the present invention.

FIG. 39 is a flow chart of the fifteenth embodiment.

The interior division ratio modification section 14C4 determines whether or not the value of the reference dot number register $S_{num}$ measured by the dot area measuring section 14B is larger than the third threshold value $TH_3$ (step S31). If the value is not larger than the third threshold value $TH_3$, the interior division ratio k is not modified (step S71) and transmitted to the threshold value calculating section 14C5.

If the value is larger than the third threshold value $TH_3$, count register count is increased (step S72), and then a determination is performed whether or not the value of the count register count is larger than fifth threshold value $TH_5$ (step S73). If the value is not larger than the fifth threshold value $TH_5$, the operation proceeds to step S71. If the value is larger than the fifth threshold value $TH_5$, the value of a reference dot total area register SS measured by the dot area measuring section 14B is divided by the value of a reference dot number register $S_{num}$ similarly measured by the dot area measuring section 14B so as to average area $S_{avg}$ is calculated (step S26).

Simultaneously, the interior division ratio modification section 14C4 determines whether or not the value of the foregoing counter register count is larger than sixth threshold value $TH_6$ (step S74). If the value is not more than the sixth threshold value $TH_6$, that is, by making the threshold value $TH_6$ is made to be "1", the coefficient $\alpha$ is set such that $\alpha_1 = 1/16$ at the first modification (step S75). If the value is larger than the sixth threshold value $TH_6$, that is, in the second and ensuing modifications, the coefficient $\alpha$ is set such that $\alpha_2 = 1/32$ (step S76).

After the average area $S_{avg}$ and the coefficient $\alpha$ have been determined, a value obtained by multiplying the difference between the target value $S_t$ and the average area $S_{avg}$ (that is, $S_t - S_{avg}$) by the foregoing coefficient $\alpha$ is added to the present interior division ratio k so that a new interior division ratio k is obtained (step S77) and transmitted to the threshold value calculating section 14C5.

As described above, a relatively large coefficient is employed in the initial stage of the modification so that the following up characteristic is improved. In the latter half of the modification in which the interior division ratios have been converged, a relatively small coefficient is employed so that oscillation is prevented.

A sixteenth embodiment of the information reproducing system according to the present invention will now be described.

Figure 40:
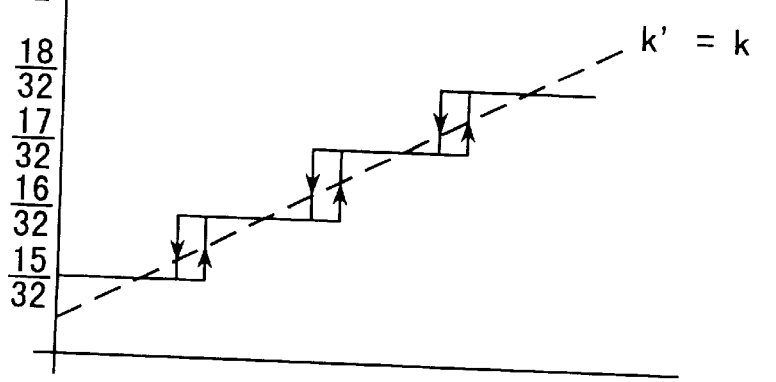
FIG. 40 is a graph showing the relationship between calculated interior division ratios and actual values for explaining the operation of a sixteenth embodiment of the information reproducing system according to the present invention.

In the sixteenth embodiment, the interior division ratio k is, as shown in FIG. 40, changed in a stepped manner and a hysteresis characteristic is provided.

By changing the interior division ratio k in the stepped manner, rapid change of the interior division ratio k, which is changed attributable to, for example, noise can be prevented. Although the portion of the descending portion of the step is sometimes considerably changed attributable to somewhat noise, the hysteresis characteristic is provided for the foregoing portion so that the interior division ratio k for this portion is stably determined.

By changing the interior division ratio in the step manner, calculations can be facilitated and the size of the hardware can be reduced. Since the hysteresis characteristic is provided, change caused by noise can be prevented and therefore the binarizing process can stably be performed.

A seventeenth embodiment of the information reproducing system according to the present invention will now be described.

The seventeenth embodiment is structured such that the modification of the interior division ratio k is performed such that whether or not the modified interior division ratio is included in a predetermined range is determined, and if the interior division ratio is not included in the range, it is clipped.

Figure 41:
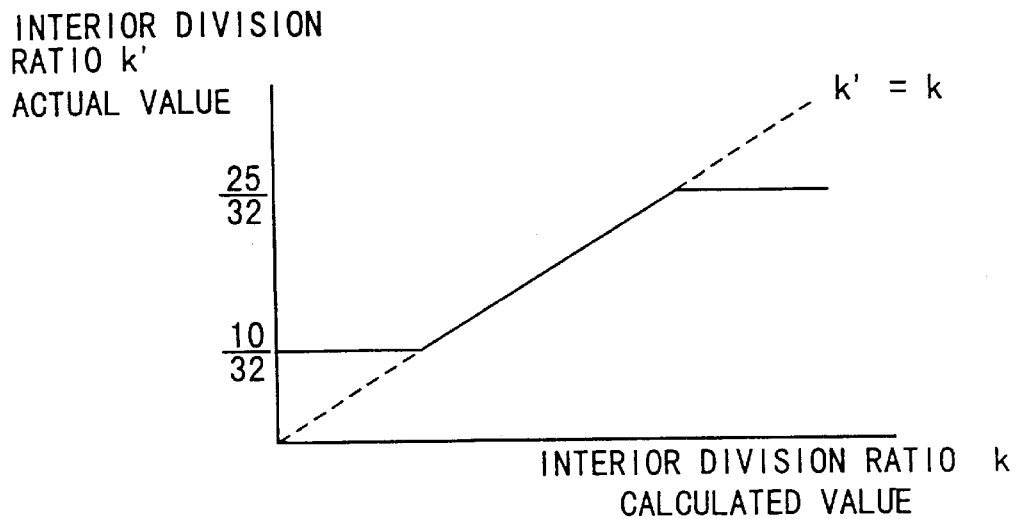
FIG. 41 is a graph explaining the operation of a seventeenth embodiment of the information reproducing system according to the present invention and showing the relationship between the areas of a dot and the interior division ratios.

That is, the interior division ratio k, as shown in FIG. 41, has continuous values from "0" to "1". In a portion in which the interior division ratio k approximates "0", the threshold value has a value near the minimum value min. In a portion in which the interior division ratio k approximates "1", the threshold value has a value near the maximum value max.

Since the foregoing binarizing operation is however considered not to be a normal binarizing operation, the value of the modified interior division ratio k is made to be a predetermined value as described above, for example, "10/32" to "25/32". If the value is not less than "25/32", all of the values are fixed to "25/32". If the value is less than "10/32", all of the values are fixed to "10/32".

Figure 42:
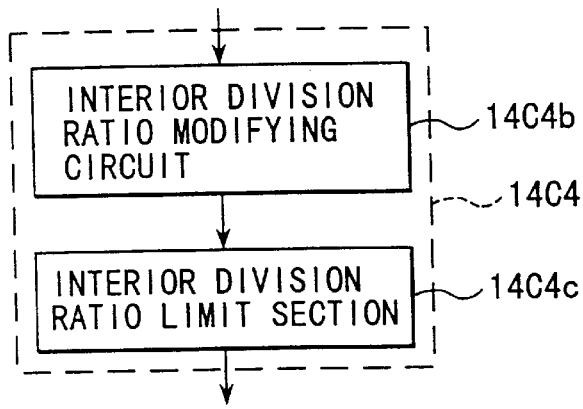
FIG. 42 is a block diagram showing a seventeenth embodiment of an information reproducing system according to the present invention.
Figure 43:
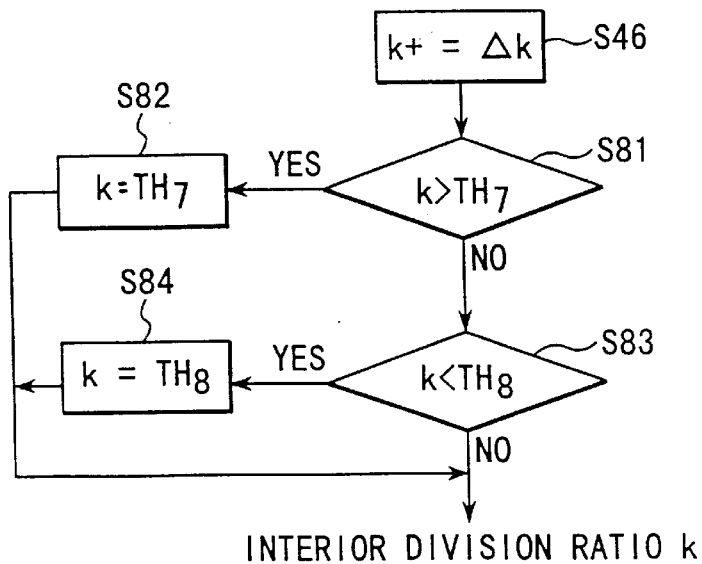
FIG. 43 is a flow chart showing the operation of the information reproducing system according to the seventeenth embodiment of the present invention.

FIGS. 42 and 43 are a block diagram and an operation flow chart of the seventeenth embodiment.

In this embodiment, the interior division ratio modification section 14C4 comprises an interior division ratio modification circuit 14C4b and an interior division ratio limiting section 14C4c. When the interior division ratio modification circuit 14C4b has added the modification amount Δk so that the interior division ratio k has been modified (step S46), a determination is performed whether or not the modified interior division ratio k is larger than seventh $TH_7$, for example, "25/32" (step S81). If the modified interior division ratio k is larger than "25/32", the interior division ratio k is set to the seventh threshold value $TH_7$ (step S82) and it is transmitted to the threshold value calculating section 14C5.

If the value is not larger than the seventh threshold value $TH_7$, a determination is performed whether or not the modified interior division ratio k is smaller than eighth threshold value $TH_8$, for example, "10/32" (step S83). If the modified interior division ratio k is smaller than the eighth threshold value $TH_8$, the interior division ratio k is set to the eighth threshold value $TH_8$ (step S84) and it is transmitted to the threshold value calculating section 14C5.

If the value is not smaller than the eighth threshold value $TH_8$, the interior division ratio k modified by the interior division ratio modification circuit 14C4b is as it is transmitted to the threshold value calculating section 14C5.

By clipping the interior division ratio k by a predetermined value, output of abnormal interior division ratio k owning to a stain, a patchy portion and blurring can be prevented and thus stable interior division ratio k can be transmitted.

An eighteenth embodiment of the information reproducing system according to the present invention will now be described.

The reference dot 18 cannot correctly be detected in an inappropriate printing condition or the image pickup condition. If the interior division ratio is modified to correspond to the area of the reference dot 18 which has been detected in the foregoing state, an inappropriate interior division ratio can be set. The reference dot 18 cannot sometimes be detected from the image binarized with the foregoing interior division ratio and thus restoration to a normal interior division ratio is sometimes inhibited.

Accordingly, the eighteenth embodiment has a structure such that the interior division ratio is not modified in the foregoing state to calculate a stable interior division ratio.

Figure 44:
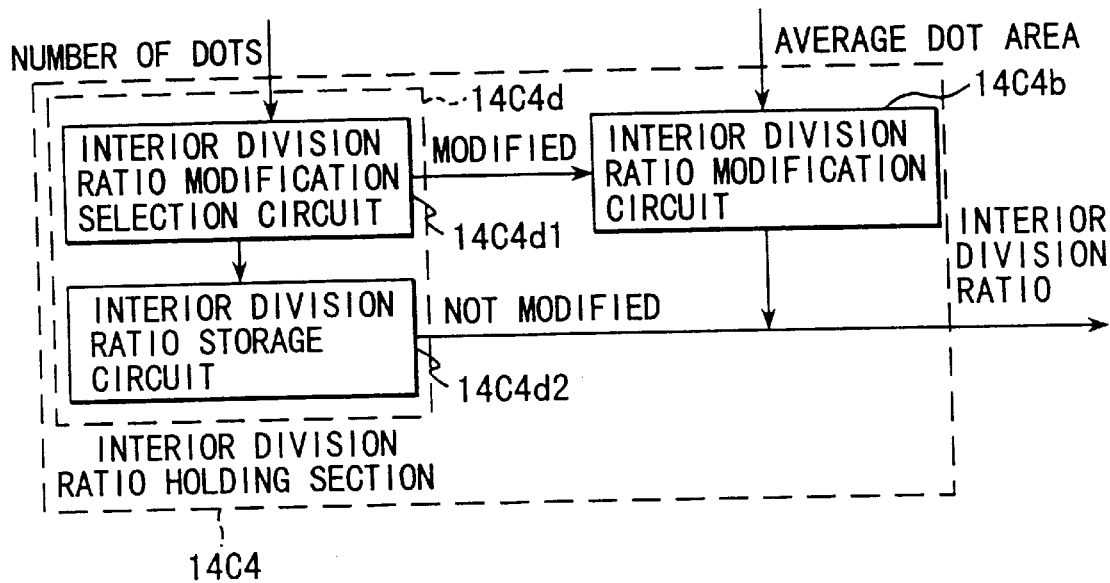
FIG. 44 is a block diagram showing an eighteenth embodiment of an information reproducing system according to the present invention.
Figure 45:
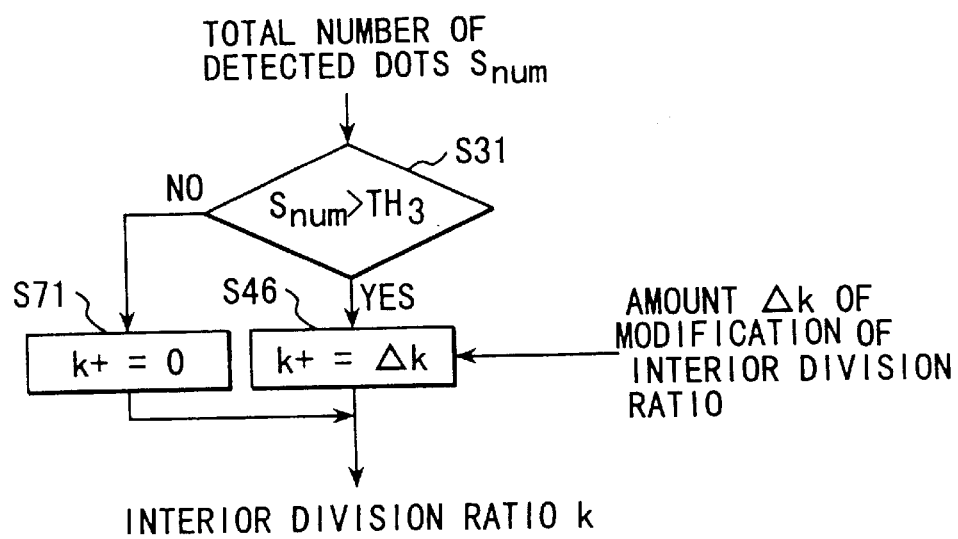
FIG. 45 is a flow chart showing the operation of the information reproducing system according to the eighteenth embodiment of the present invention.

FIGS. 44 and 45 are a block diagram and an operation flow chart of the eighteenth embodiment.

The interior division ratio modification section 14C4 comprises an interior division ratio modification circuit 14C4b and an interior division ratio holding section 14C4d. The interior division ratio holding section 14C4d has an interior division ratio modification selection circuit 14C4d1 and an interior division ratio storage circuit 14C4d2. In the interior division ratio modification selection circuit 14C4d1, a determination is performed whether or not the number of the reference dots 18 detected by the reference dot detection section 14A and counted by the dot area measuring section 14B satisfies a predetermined number (the third threshold value $TH_3$) (step S31). If the number is less than the predetermined number, the interior division ratio k stored in the interior division ratio storage circuit 14C4d2 is transmitted to the threshold value calculating section 14C5 (step S71). If the number is larger than the predetermined number, the interior division ratio modification circuit 14C4b modifies the interior division ratio k, that is, the interior division ratio modification circuit 14C4b generates a new interior division ratio obtained by adding the interior division ratio modification amount Δk (step S46) and transmits the same to the threshold value calculating section 14C5.

When a satisfactorily large number of reference dots 18 cannot be detected as described above, the modification of the interior division ratio is inhibited so that the reliability of the interior division ratio is maintained.

A nineteenth embodiment of the information reproducing system according to the present invention will now be described.

In the nineteenth embodiment, the interior division ratio modification section 14C4 modifies the interior division ratio until a field or a frame which satisfy a predetermined condition for continuous image signals read by the code reading section 10 is obtained. In the following field or frame, the modified interior division ratio is maintained.

As shown in FIG. 46, whether or not the number counted by the dot area measuring section 14B satisfies a predetermined number (the third threshold value $TH_3$) is determined (step S31). If the number is smaller than the predetermined number, the interior division ratio k is not modified and it is transmitted to the threshold value calculating section 14C5 (step S71).

If the number is not less than the predetermined value, the counter register count is increased (step S72), and then whether or not the value of the counter register count is smaller than a predetermined threshold value $TH_{cnt}$ is determined (step S91). If the value is smaller than the predetermined threshold value $TH_{cnt}$, the interior division ratio modification amount Δk is added to the present interior division ratio k so that a new interior division ratio k is set (step S46) and transmitted to the threshold value calculating section 14C5.

The foregoing process is repeated until the value of the counter register count is not less than the predetermined threshold value $TH_{cnt}$. Then, the operation proceeds to step S71 so that the interior division ratio k is not modified and transmitted to the threshold value calculating section 14C5.

That is, the number of the frames in which a sufficiently large number of dots have been detected is counted. If the number is smaller than the predetermined threshold value THcnt, the interior division ratio k is modified. If the count is not less than the predetermined threshold value $TH_{cnt}$ after the foregoing process has been repeated, a determination is performed that the interior division ratio k has been satisfactorily modified and converged. Thus, the interior division ratio k is not modified in the following frames 40.

Since the recording condition is not considerably changed during the reading operation in a case where the dot code images are continuously read, the modification of the interior division ratio with which the recording condition is corrected is completed in the first half of the frames 40. Thus, the following modification is inhibited so that a wasteful process is reduced and erroneous modification caused from noise is prevented.

A twentieth embodiment of the information reproducing system according to the present invention will now be described.

In the twentieth embodiment, attitude dots 42 including information about the subject information recording medium 12 for determining the threshold value for the binarizing section 14 are recorded in a predetermined region of the dot code 170 at a position near the reading start end, as shown in FIG. 47. The binarizing section 14, as shown in FIG. 48, comprises an attitude dot detection section 14G for detecting the attitude dots 42, an attitude reading section 14H for subjecting the image signals ready by the code reading section 10 to the binarizing process for field or frame units so as to read, from the obtained binarized image, information about the information recording medium 12 from the attitude dots 42 detected by the attitude dot detection section 14G, and an attitude storage section 14I for storing information read by the attitude reading section 14H so as to similarly apply it to each of the following images.

That is, information about the information recording medium 12, including the material of the information recording medium 12, the density of the ink at the recording operation, the amount of exposure and the like are, as the attitude dots 42, recorded in the predetermined region of the dot code 170 adjacent to the reading start end. Thus, the attitude dots 42 are first scanned and read when the dot code 170 is scanned. Information of the information recording medium 12 denoted by the read attitude dots 42, that is, information including the material of the information recording medium 12 and the density of the ink is stored in the attitude storage section 14I so as to be used when the interior division ratio is determined.

As described above, the attitudes (or attribute) of the material of the information recording medium 12, the characteristics of the recording material and the recording method can be detected prior to binarizing the dot code 170 so that appropriate parameters for the binarizing process are provided.

A twenty-first embodiment of the information reproducing system according to the present invention will now be described.

Figure 49:
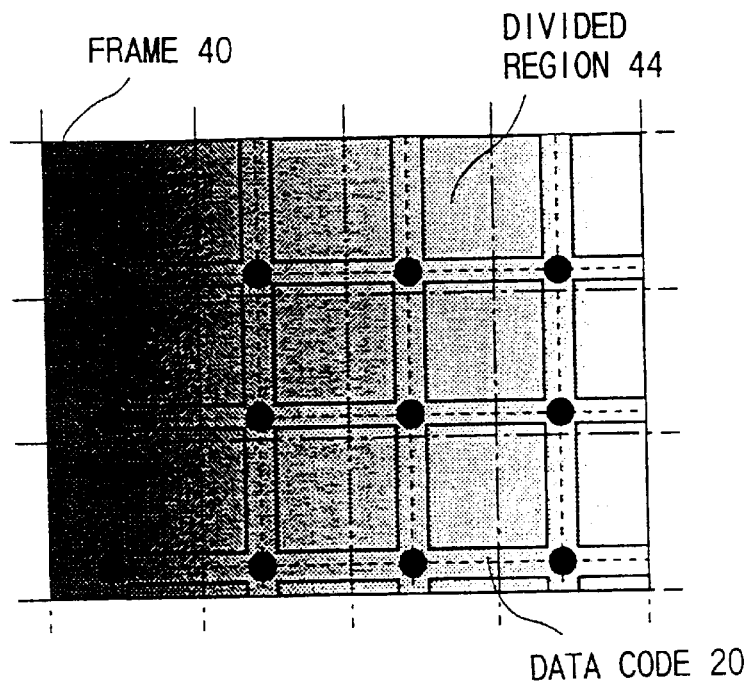
FIG. 49 is a diagram showing a shaded image for explaining a twenty-first embodiment of the information reproducing system according to the present invention.

The twenty-first embodiment is structured to solve a problem in that irregularity of the illumination system and inclination of the image pickup unit with respect to the information recording medium 12 cause the picked up image to be shaded and the binarizing operation is adversely affected. As shown in FIG. 49, the shaded code image is divided into a plurality of regions 44 including four regions in the lateral direction and three regions in the longitudinal direction. That is, since an assumption can be made that the recording condition and the illumination condition are the same among the divided region units, a characteristic amount is extracted for each of the divided regions so as to calculate the threshold value.

Figure 50:
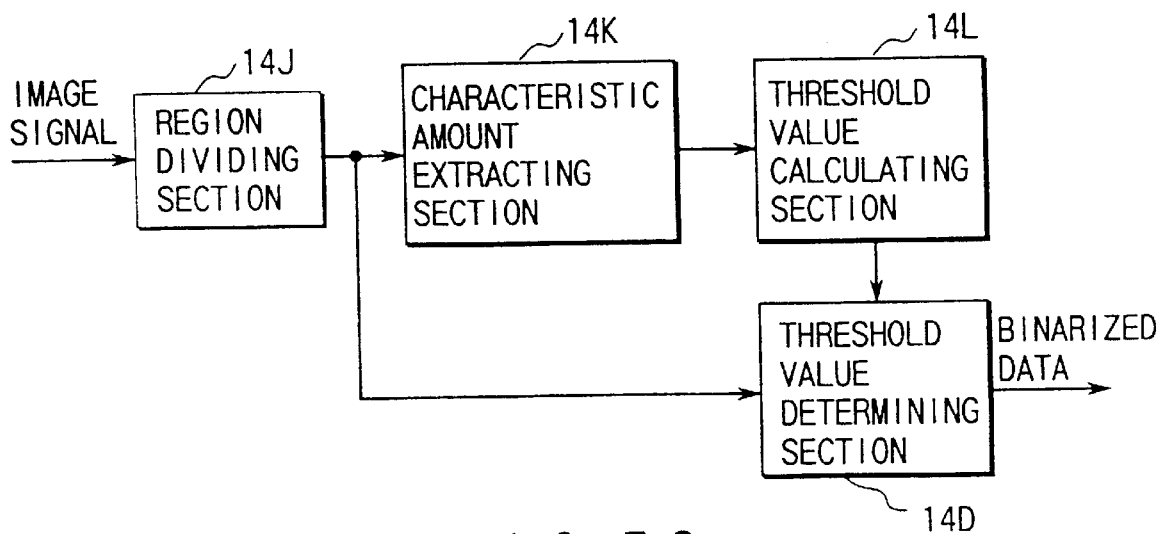
FIG. 50 is a block diagram showing a twenty-first embodiment of an information reproducing system according to the present invention.

FIG. 50 is a block diagram showing the binarizing section 14 according to the twenty-first embodiment. The region dividing section 14J divides the pick up screen of the dot code 170 into a plurality of regions. A characteristic amount extracting section 14K extracts a binarization characteristic amount of each of the regions divided by the region dividing section 14J. For each divided region, threshold value calculating section 14L calculates the threshold value for the binarizing process in accordance with the characteristic amount extracted by the characteristic amount extracting section 14K. Then, the threshold value calculating section 14L supplies the calculated threshold values to the threshold value determining section 14D so that the image signal is binarized.

Since an assumption can be performed that the recording condition and the illuminating condition are constant for the divided region units as described above, the characteristic amount is extracted for the divided region units to calculate the threshold value so that the influence of shading and the like is eliminated satisfactorily.

A twenty-second embodiment of the information reproducing system according to the present invention will now be described.

Figure 51:
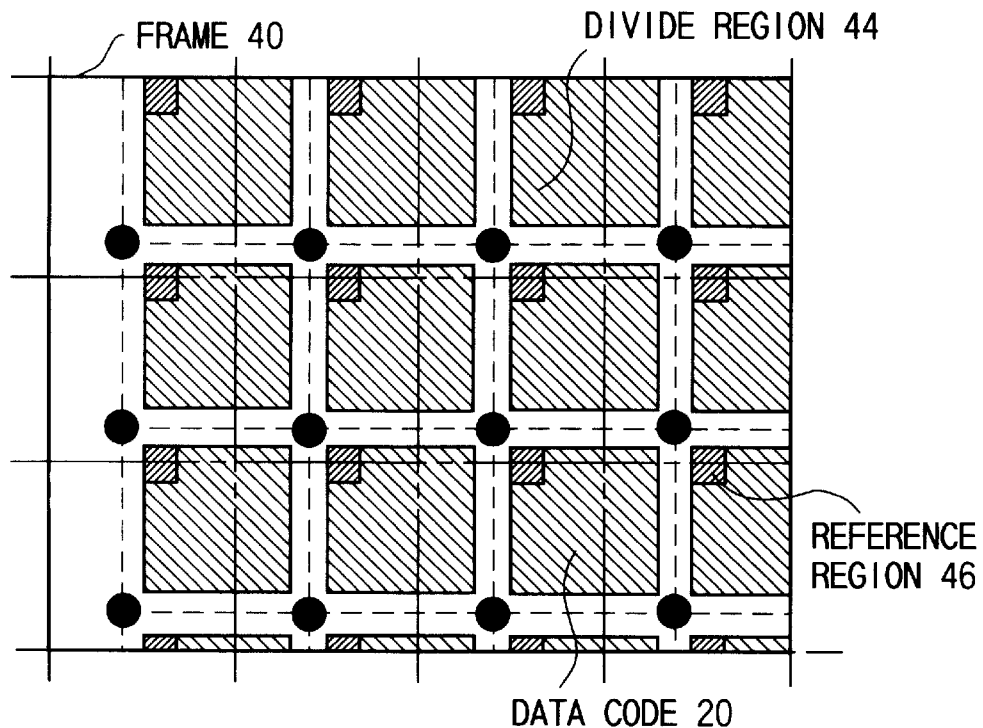
FIG. 51 is a diagram showing a dot code for use in a twenty-second embodiment of the information reproducing system according to the present invention.

In the twenty-second embodiment, reference regions 46 for extracting the characteristic amount (for example, a maximum value and a minimum value) for use in the binarizing process is provided for a portion of the data code 20, as shown in FIG. 51. When the region dividing section 14J divides the frame 40 into the regions, the frame 40 is divided in such a manner that at least one reference region 46 is included in one divided region 44.

The division of the frame 40 is performed such that if the interval of the reference regions 46 are X pixels in the lateral direction and Y pixels in the longitudinal direction on the picked up screen or frame 40 when an image including the reference regions 46 is picked up with a skew angle of 0 degree, then the size of the each divided region 44 must be at least X pixels in the lateral direction and Y pixels in the longitudinal direction.

As a result, at least one reference region 46 is included in each divided region 44 so that the stable characteristic amount is extracted.

By detecting the maximum value of the luminance as the characteristic amount, the binarizing process can be performed on which the light quantity of the divided region 44 is reflected. Thus, a satisfactory result can be obtained even if shading takes place.

A twenty-third embodiment of the information reproducing system according to the present invention will now be described.

Figure 52:
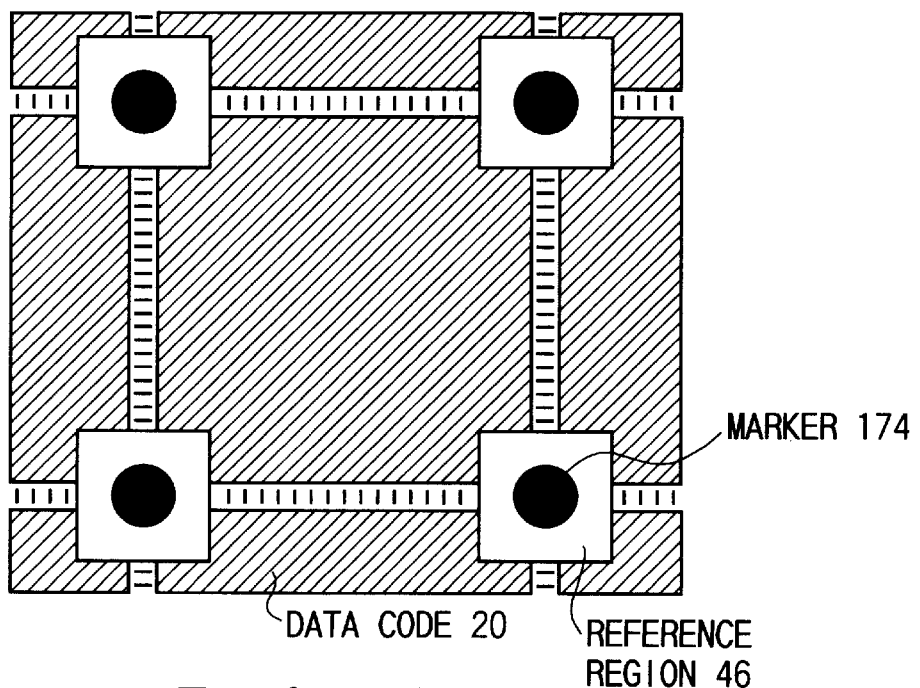
FIG. 52 is a diagram showing a dot code for use in a twenty-third embodiment of the information reproducing system according to the present invention.

In the twenty-third embodiment, as shown in FIG. 52, at least either of the marker 174 and an inhibition region adjacent to the marker 174 is used as the reference region 46.

The above-mentioned marker 174 is a relatively wide region in which connected black portions exist, while the inhibition region adjacent to the marker 174 is a relatively wide region in which connected while portions exist. Accordingly, the characteristic amount is extracted from the marker 174 above or the adjacent inhibition region so that a stable binarizing process is performed. If a low-pass filter is provided to detect the maximum and minimum luminance, the minimum value can be detected from the marker 174 and the maximum value can be detected from the inhibition region adjacent to the marker 174.

By making the reference region 46 to be the marker 174 or the adjacent region, the necessity of recording the reference region 46 individually from the code can be eliminated. Thus, the recording area can effectively be used and the detection can easily be performed.

A twenty-fourth embodiment of the information reproducing system according to the present invention will now be described.

Figures 53A, 53B:
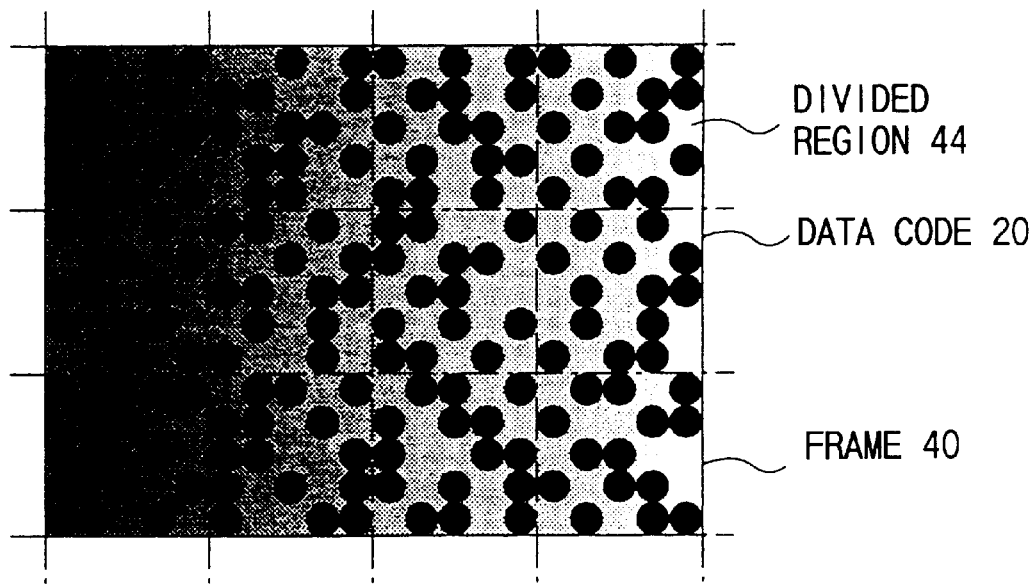
FIG. 53A is a diagram showing a shaded code image for explaining a twenty-fourth embodiment of the information reproducing system according to the present invention.
FIG. 53B is a diagram showing the maximum luminance and the threshold value for each of divided regions.

The twenty-fourth embodiment, as shown in FIG. 53A, has a structure such that the shaded code image is divided as is performed in the twenty-first embodiment and the characteristic amount is extracted in divided region units in such a manner that the maximum value of the luminance is extracted for the divided region units.

The state of shading is correspondingly denoted by the maximum values of the luminance in the region rather than the minimum values, the maximum values being widely distributed in the dot code 170. Accordingly, as shown in FIG. 53B, the maximum value max of the luminance is obtained from each of the divided regions and the threshold value is determined to correspond to the maximum value max. If a value which is 50% of the maximum value of the luminance is employed as the threshold value th which is then binarized, coping with more intense shading can be performed.

As described above, the characteristic amount is made to be the maximum value of the luminance so that the reference region 46 is made to be the ground color portion of the information recording medium 12. Since the ground color portion is widely distributed over the dot code, stable characteristic amounts can be extracted even if the divided region 44 is made to be a relatively small region. Since the state of the quantity of illumination in each of the divided regions 44 is satisfactorily reflected on the maximum values, the threshold value adaptable to shading can effectively be calculated.

A twenty-fifth embodiment of the information reproducing system according to the present invention will now be described.

The twenty-fifth embodiment is structured such that a characteristic amount extracting section 14K extracts the maximum value of the luminance of each of the divided regions as a first characteristic amount and extracts the minimum value of the luminance from the overall screen as the second characteristic amount. A threshold value calculating section 14L calculates the threshold value for each of the divided regions from the maximum and minimum values of the luminance in accordance with a predetermined interior division ratio.

That is, the maximum value of the luminance is detected from each of the divided regions 44, while the minimum value is obtained from the picked up screen, that is, the overall surface of the frame. The thus-obtained maximum and minimum values are used to calculate the threshold value in accordance with the predetermined interior division ratio k.

If the maximum value max and the minimum value min are obtained in each of the divided regions 44 of the image shaded as shown in FIG. 54A, a result as shown in FIG. 54B is obtained. In this case, since the characteristic amount can significantly be extracted from the region, such as the marker 174 in which black portions successively exist, the minimum value is obtained from the divided regions in each of which the marker 174 exists so as to be used as the minimum value fr_min of the overall portion of the frame which corresponds to the minimum value of each of the divided regions 44.

The state of shading is significantly be reflected by the maximum value of the luminance in the region and the maximum value is distributed over a wide range in the code. On the other hand, the minimum values of the luminance appear only in the marker regions 48 and thus distributed eccentrically. However, change is the luminance attributable to shading can be restrained. Accordingly, the maximum value is detected from each of the divided regions 44, while the minimum value of the luminance is detected from the overall portion of the frame. Thus, even if the divided regions 44 are made to be small such that the marker region 48 is not included, the threshold value corresponding to shading can therefore be set.

As described above, the maximum and minimum values of the luminance are used to calculate the threshold value in accordance with the interior division ratio so that the threshold value is calculated to be adaptable to the quantity of light.

By extracting the maximum value of the luminance from each of the divided regions, coping with shading can be performed. The minimum value of the luminance which cannot stably be extracted from each of the divided regions is extracted from the overall portion of the screen. Thus, even if the black level is raised in the recording condition, coping with it can be performed.

A twenty-sixth embodiment of the information reproducing system according to the present invention will now be described.

In a case where the minimum value of the luminance is detected from the overall portion of the frame, the threshold value in each of the divided regions 44 cannot be calculated until the process of the overall portion of the frame is completed. Accordingly, the twenty-sixth embodiment is structured such that the dot codes 170 are successively read in such a manner that the characteristic amount extracting section 14K, as shown in FIG. 55, detects the maximum value max of the luminance from each of the divided regions 44. On the other hand, the minimum value min of the luminance is made to be the minimum value fr_min of the overall portion of the previous frame. Then, the threshold value calculating section 14L calculates the threshold value in each of the divided region units from the maximum and minimum values of the luminance in accordance with a predetermined interior division ratio.

As described above, the minimum value extracted from the previous field or frame is used so that the present field or frame are subjected to the binarizing process in the divided region units.

A twenty-seventh embodiment of the information reproducing system according to the present invention will now be described.

In a case where the present frame is binarized with the threshold value calculated from the peak value of the previous frame, division of the region for preventing the influence of shading results in the state of shading being not changed as shown in FIG. 56A among frames. Thus, the illumination condition for the divided region s_fr2 is considered to be constant.

As scanning is performed, point A on the information recording medium is moved to the upper portion of the frame, as shown in FIG. 56B. If the information recording medium 12 has ground color irregularity 50 at this time, also the ground color irregularity 50 is moved, thus causing different irregularity to be generated in the same divided region of the next frame. No problem arises in a case where the peak value is detected from the overall portion of the frame. However, in a case where the peak value is detected in the divided region units, the difference in the divided regions in which the ground color irregularity 50 exists between the previous frame and the present frame causes the threshold value to be determined in accordance with the peak value detected from each of the divided regions to be changed considerably.

Accordingly, in the twenty-seven embodiment, the characteristic amount extracting section 14K, as shown in FIG. 57, comprises a maximum value detection circuit 14K1 for detecting the maximum value of the luminance in each of the divided regions and a maximum value averaging section 14K2 for averaging the extracted maximum values for at least two fields or frames adjacent in terms of time, for example, for three frames. The maximum value averaging section 14K2 stores the maximum value for, for example, two previous frames extracted by the maximum value detection circuit 14K1 in the maximum value storage circuit 14K2a for each of the divided regions. The maximum value averaging circuit 14K2b calculates an average value of the stored maximum value and the maximum value of the present frame extracted by the maximum value detection circuit 14K1 for each of the divided regions.

By averaging the maximum value of the luminance of the at least two or more fields or frames adjacent in terms of time, for example, by averaging the maximum value of the luminance of the same divided regions over three frames, change in the maximum value attributable to the ground color irregularity 50, that is, change in the threshold value attributable to the change in the maximum value can be prevented.

A twenty-eighth embodiment of the information reproducing system according to the present invention will now be described.

The binarizing method in which the threshold value is calculated from the maximum and minimum values detected from the detection region of the present frame with a predetermined interior division ratio and the same region of the next frame is binarized encounters a risk that the threshold value is set to the background level when the code is not included in the detection region because the code level is made to be the substantially the same as the background level.

Figure 58:
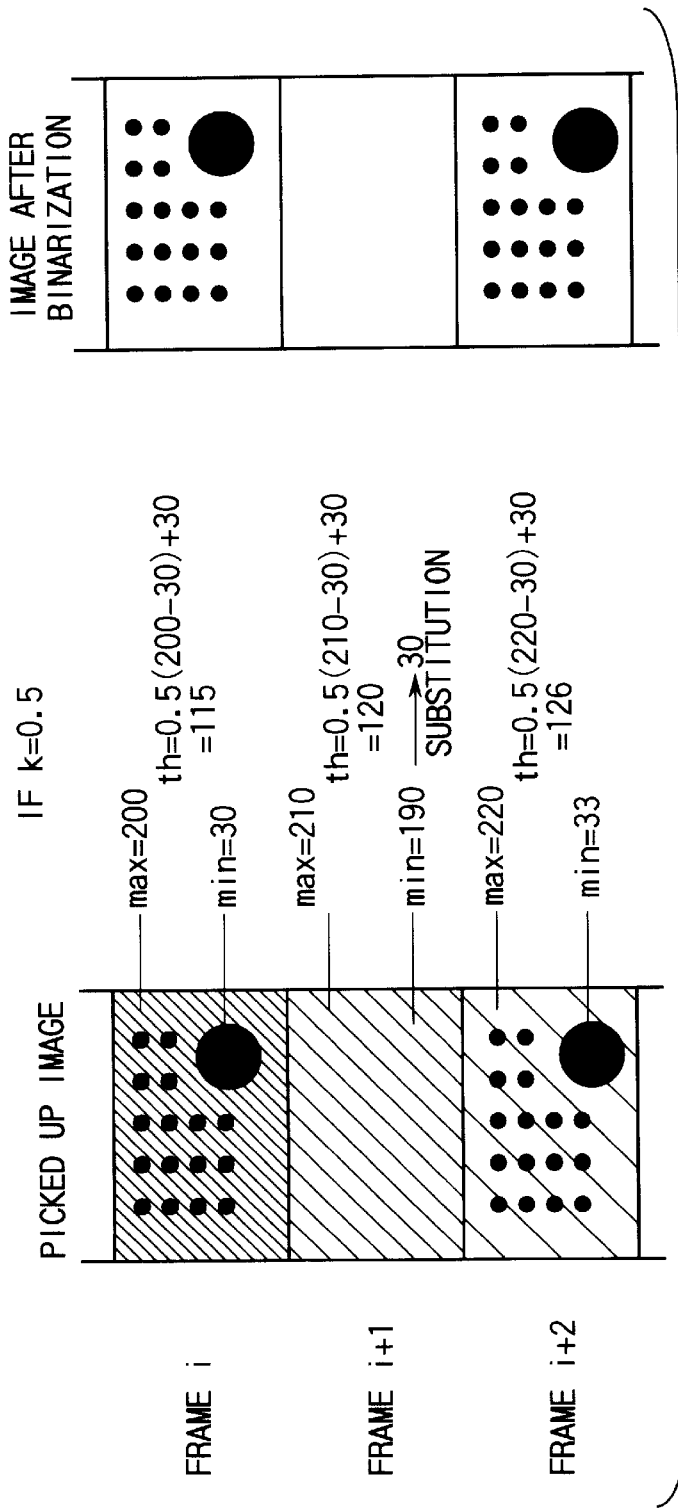
FIG. 58 is a diagram showing a state where the ground color is gradually brightened as the time passes in a certain divided region of a picked up image and an image which has been binarized for explaining a twenty-eighth embodiment of the information reproducing system according to the present invention.

In an example case, as shown in FIG. 58, where the ground color of certain divided regions in which the pick up image exists is gradually brightened as the time and the image of the code has been picked up in the first frame frame_i and the third frame frame_i+2 but the code has not been picked up in the second frame frame_i+1, the maximum value max of the luminance is gradually enlarged as "200, 210, 220". The minimum value min is unintentionally made as "30, 190, 33". Thus, an excessively large value is realized at the second frame frame_i+1. Therefore, when the next frame frame_i+2 is binarized with the threshold value calculated from the maximum and minimum values of the second frame frame_i+1, the binarization cannot correctly be performed.

Therefore, the twenty-eighth embodiment has a structure such that existence of the dot code 170 is detected. If the dot code 170 not exists, the minimum value min is replaced by the minimum value of the previous frame. As a result, the minimum value min of the second frame frame_i+1 is replaced from "190" to "30". Therefore, "120" is obtained as the threshold value of the third frame frame_i+2 which is able to follow the actual threshold value "126". Since the maximum value is not replaced, the threshold value is able to follow the state where the quantity of light is gradually changed.

Figure 59:
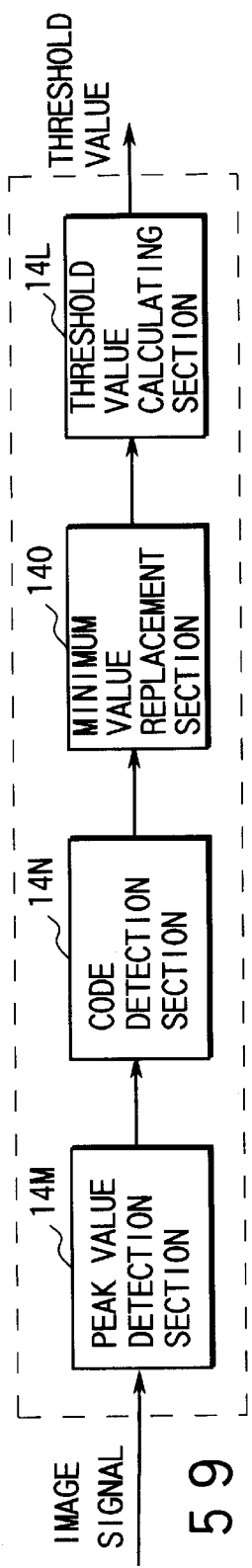
FIG. 59 is a block diagram showing a twenty-eighth embodiment of an information reproducing system according to the present invention.

FIG. 59 is a diagram showing the structure of the binarizing section 14 according to the twenty-eighth embodiment for replacing the minimum value when the dot code 170 does not exist. That is, a peak value detection section 14M detects the maximum and minimum values of the luminance from a predetermined detection region. A code detection section 14N detects whether the dot code 170 exists in the detection region. A minimum value replacement section 14O replaces the minimum value in the detection region with the minimum value of the previous field or frame in the case where the code detection section 14N has not detected the dot code 170. A threshold value calculating section 14L calculates the threshold value for the binarization in the same region of the next field or frame from the maximum value and the replaced minimum value in accordance with a predetermined interior division ratio.

By replacing the minimum value when the dot code 170 does not exist, setting of the threshold value to the background level when the dot code 170 has been out of the detection region and thus the minimum value (the code level) is made to be the substantially the same as the maximum value (the background level) can be prevented.

Moreover, reference to the background level enables the threshold value to follow change in the quantity of light.

A twenty-ninth embodiment of the information reproducing system according to the present invention will now be described.

Figure 60:
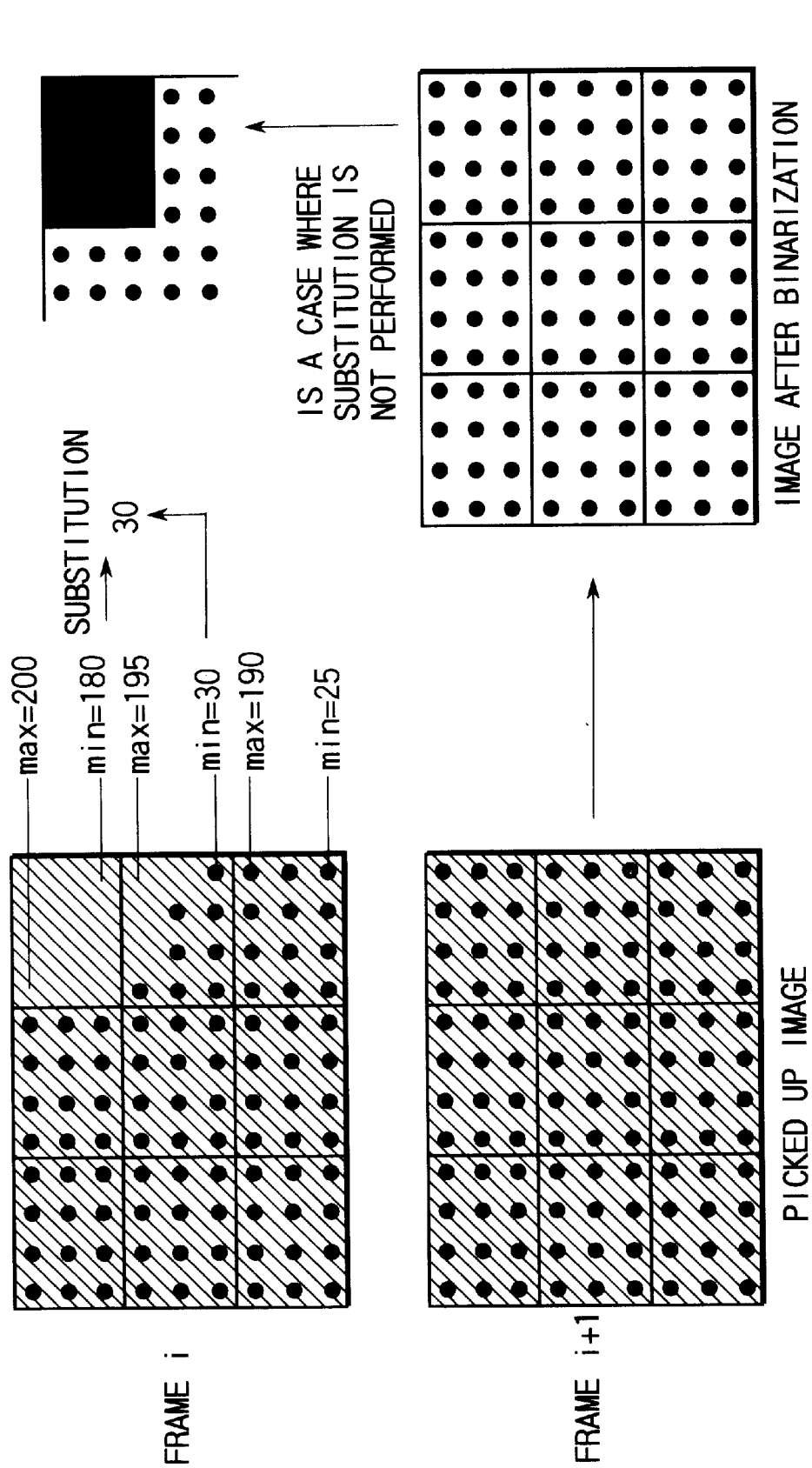
FIG. 60 is a diagram showing the operation of a twenty-ninth embodiment of the information reproducing system according to the present invention.

The twenty-ninth embodiment is structured such that, if the code detection section 14N does not detect the dot code 170, the minimum value replacement section 14O does not replace the minimum value in the detection region with the minimum value of the subject region of the previous frame as is performed in the twenty-eighth embodiment. In the twenty-ninth embodiment, as shown in FIG. 60, replacement with the minimum value of the detection region adjacent to the subject region is performed.

By replacing with the minimum value of the spatially adjacent region is performed if the dot code 170 does not exist, setting of the threshold value to the background level when the dot code 170 is out of the detection region and thus the minimum value (the code level) is made to be the substantially the same as the maximum value (the background level) can be prevented. Moreover, reference to the background level enables the threshold value to follow change in the quantity of light.

A thirtieth embodiment of the present invention will now be described.

The thirtieth embodiment has a structure such that the code detection section 14N according to the twenty-eighth or the twenty-ninth embodiment determines whether or not the ratio of the maximum value (the background level) and the minimum value (code level) detected by the peak value detection section 14M is larger than a predetermined threshold value. If the ratio is not larger than the threshold value, a consideration is made that the dot code 170 does not exist in the detection region.

Figure 61:
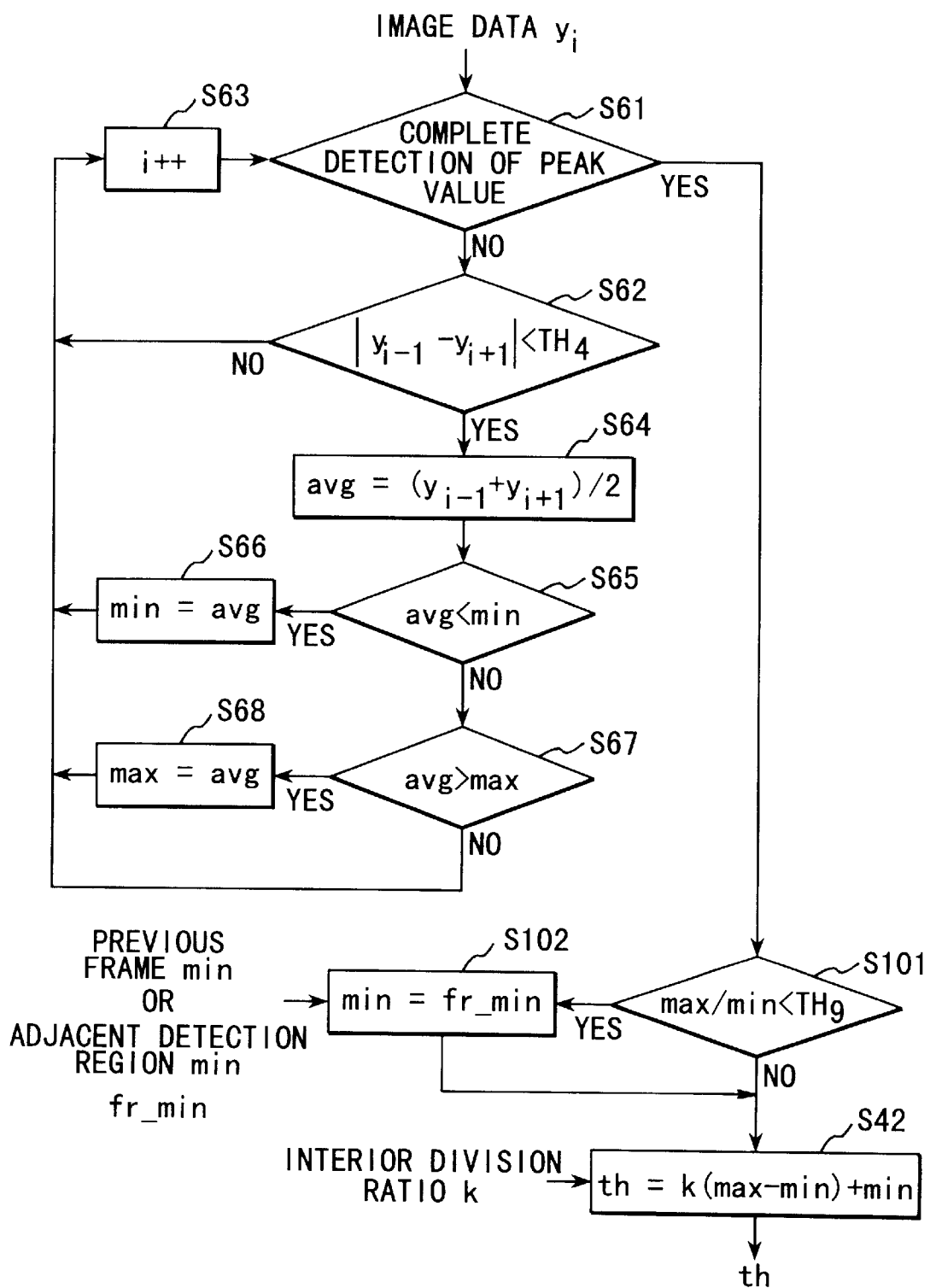
FIG. 61 is a flow chart showing the operation of the information reproducing system according to a thirtieth embodiment of the present invention.

As shown in FIG. 61, in steps S61 to S68, peak values max and min are detected by the peak value detection section 14M. The code detection section 14N determines whether or not the ratio of the maximum value to the minimum value, that is, max/min is larger than a predetermined ninth threshold value $TH_9$ (step S101). If the ratio is larger than the ninth threshold value $TH_9$, the threshold value calculating section 14L uses the detected peak values max, min and the interior division ratio k to calculate the threshold value th for the binarizing process in accordance with the foregoing equation (1) (step S42).

If the ratio of the maximum value to the minimum value is smaller than the ninth threshold value $TH_9$, the minimum value replacement section 14O replaces the detected minimum value min with the minimum value min of the previous frame or minimum value fr_min of the detection region adjacent to the subject frame (step S102). Then, the operation proceeds to step S42 so that the threshold value th for the binarizing process is calculated.

Thus, the known peak value can be used to easily and reliably determine the existence of the code.

Preferred aspects formed by combining the first to thirtieth embodiments are as follows, and the combination will be described as a thirty-first embodiment.

Figure 62:
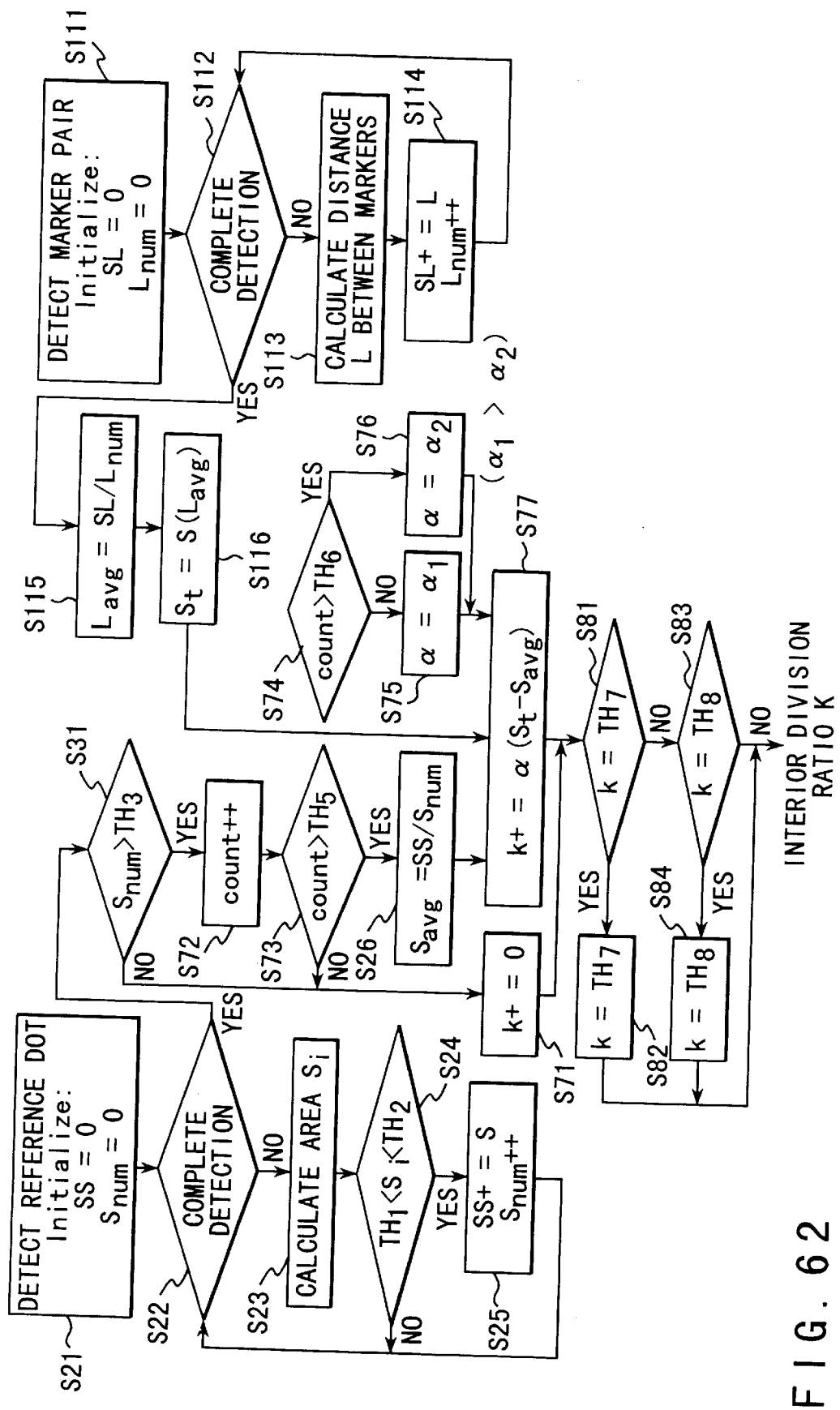
FIG. 62 is a flow chart of a process for calculating the interior division ratio according to the thirty-first embodiment of the present invention.

FIG. 62 is a flow chart showing a process for calculating the interior division ratio according to the thirty-first embodiment. To detect the reference dots 18, for example, the pattern dots 278, the reference dot total area register SS and the reference dot number register $S_{num}$ are initialized to "0" (step S21). Then, whether or not the detection has been completed is determined (step S22). If the detection has not been completed, area $S_i$ of the i-th reference dot 18 is calculated (step S23). Then, whether or not the calculated area $S_i$ is in a predetermined range, that is whether or not the same is between the first threshold value $TH_1$ and the second threshold value $TH_2$ is determined (step S24). If the calculated area $S_i$ is not in the foregoing range, the calculated area $S_i$ is deleted as an erroneously calculated dot area attributable to a stain, a patchy portion and blurring. Then, the operation returns to step S22 so that a process for a next reference dot 18 is performed. If the area $S_i$ is in the foregoing range, the calculated area S is added to the value of the register SS. Moreover, the value of the reference dot number register $S_{num}$ is increased (step S25), and then the operation returns to step S22.

When the detection of the reference dots 18 has been completed, whether or not the value of the reference dot number register $S_{num}$ indicating the total sum of the reference dots 18 is larger than a predetermined number, that is, the third threshold value $TH_3$ is determined (step S31). If the value is smaller than the third threshold value $TH_3$, a fact is confirmed that the sufficiently large number of dots have not been detected. Therefore, if the average area is obtained by using the foregoing value, reliability deteriorates. Therefore, if the value is not larger than the third threshold value $TH_3$, "0" is added to the interior division ratio k, that is, the interior division ratio k is not modified (step S71).

If the value is larger than the third threshold value $TH_3$, the counter register count is increased (step S72), and whether or not the value of the counter register count is larger than the fifth threshold value $TH_5$ is determined (step S73). The fifth threshold value $TH_5$ is "1". The fact that the value is smaller than the fifth threshold value $TH_5$ means passing through the loop at the first time. In this case, since a sufficiently large number of dots have been detected from the frame 40, the operation proceeds to step S71 so that the interior division ratio k is not changed.

If the value is larger than the fifth threshold value $TH_5$, the value of the reference dot total area register SS is divided by the value of the reference dot number register $S_{num}$ so that average area $S_{avg}$ is calculated (step S26).

Simultaneously, whether or not the value of the counter register count is larger than sixth threshold value $TH_6$ is determined (step S74). If the value is smaller than the sixth threshold value $TH_6$, that is, assuming that the sixth threshold value $TH_6$ is "2", the coefficient $\alpha$ is set such that $\alpha_1 = 1/16$ at the first time (count=2) (step S75). If the value is larger than the sixth threshold value $TH_6$, that is, at the second and ensuing time (count>1), $\alpha$ is set such that $\alpha_2 = 1/32$ (step S76).

In the thirty-first embodiment, the dot area, which is changed due to the change in the magnification and distortion when the image has been picked up, is corrected to normalize the area by the distance between the markers. To detect the marker pairs, the intermarker total distance register SL and the intermarker distance detection number register $L_{num}$ are initialized to "0" (step S111). Then, whether or not the detection has been completed is determined (step S112). If the detection has not been completed, the distance L between the markers is calculated (step S113). Then, the calculated distance L is added to the total distance register SL between markers, and the value of the intermarker distance detection number register $L_{num}$ is increased (step S114), and then the operation returns to step S112.

After the detection of the marker pairs has been completed, the value of the total distance register SL between markers is divided by the value of the intermarker distance detection number register $L_{num}$ so that average intermarker distance $L_{avg}$ is calculated (step S115). In accordance with the calculated average intermarker distance $L_{avg}$, a target value $S_t$ of the area of the reference dot 18 is calculated by using a predetermined function $S(L_{avg})$ (step S116). The predetermined function $S(L_{avg})$ is, for example, $S(L_{avg})=a(L_{avg})^2$ or $S(L_{avg})=b \cdot L_{avg}+c$ or the like obtained due to approximation of the foregoing function in a specific region (where a, block and code are coefficient such that a=1/12, b=3, c=2 or the like).

When the average area $S_{avg}$, the coefficient $\alpha$ and the target value $S_t$ have been calculated, a value obtained by multiplying the difference (that is, $S_t-S_{avg}$) between the target value $S_t$ and the average area $S_{avg}$ by the foregoing coefficient $\alpha$ is, as the modification amount of the interior division ratio, added to the present interior division ratio k so that a new interior division ratio k is obtained (step S77).

When the interior division ratio k has been obtained in step S71 or step S77, it is clipped to be included in a predetermined range so that a final interior division ratio k is determined. That is, whether or not the calculated interior division ratio k is larger than the seventh threshold value $TH_7$, for example, "25/32" is determined (step S81). If the interior division ratio k is larger than the seventh threshold value $TH_7$, the value of the seventh threshold value $TH_7$ is determined to the final interior division ratio k (step S82). If it is not larger than the seventh threshold value $TH_7$, whether or not the calculated interior division ratio k is smaller than an eighth threshold value $TH_8$, for example, "10/32", is determined (step S83). If it is smaller than the eighth threshold value $TH_8$, the value of the eighth threshold value $TH_8$ is determined to be the final interior division ratio k (step S84). If it is not smaller than the eighth threshold value $TH_8$, the calculated interior division ratio k is as it is determined to be the final interior division ratio k.

Figure 63:
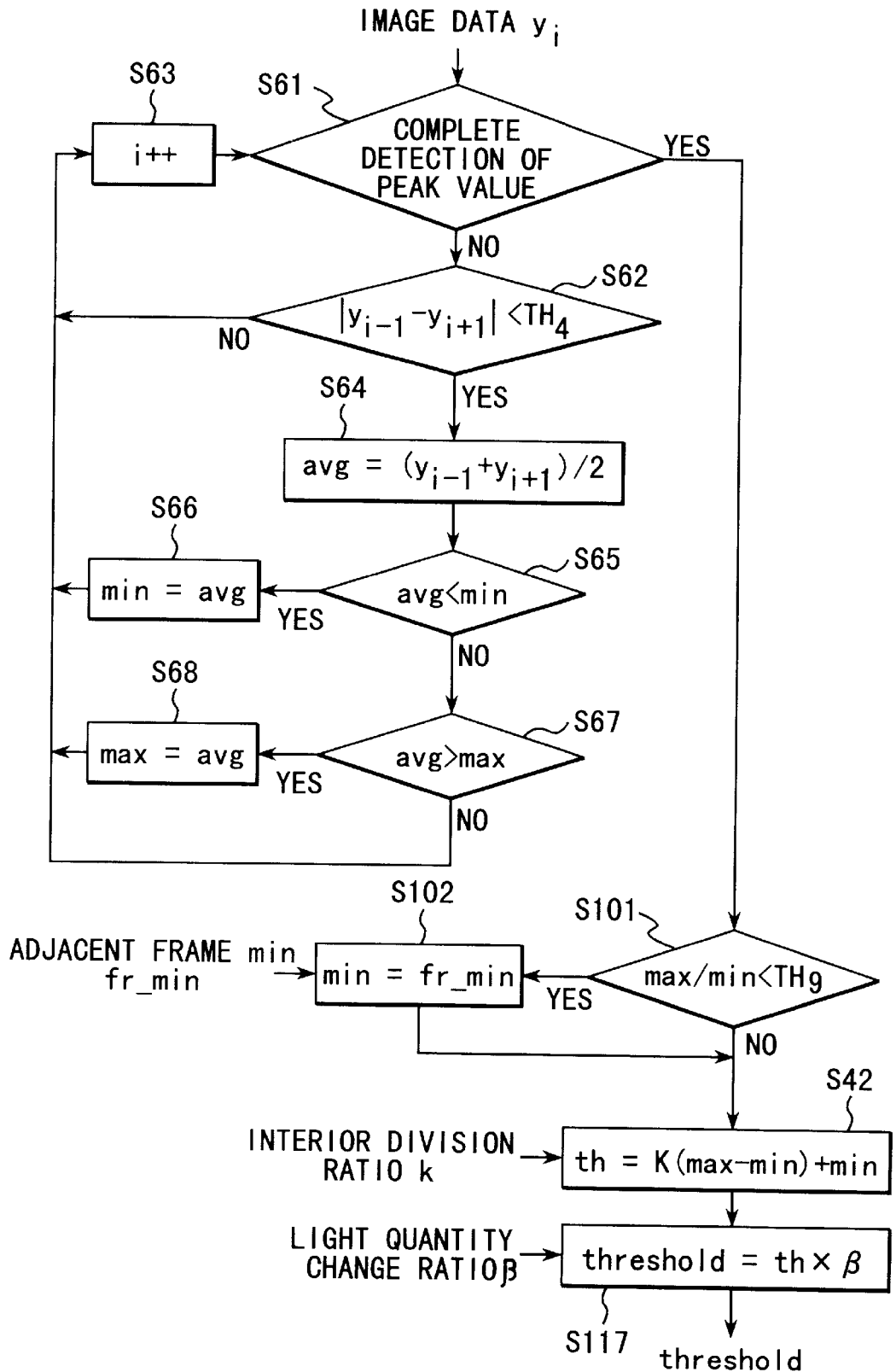
FIG. 63 is a flow chart of a process for calculating the threshold value in a thirty-first embodiment of the information reproducing system according to the present invention.

FIG. 63 is a flow chart for a process for calculating the threshold value in the thirty-first embodiment.

Initially, whether or not the detection of the peak value has been completed is determined (step S61). If the detection has not been completed, the absolute value of the difference between the pixels in front of the i-th pixel $y_i$ of interest and in the rear of the same, that is, $y_{i-1}$ and $y_{i+1}$ is obtained to determine whether or not the absolute value is smaller than the fourth threshold value $TH_4$ (step S62). If the absolute value is not smaller than the fourth threshold value $TH_4$, a consideration is performed that the pixel value of the pixel $y_i$ is not a minimal value and the detection of the maximum and minimum values is not performed but the value of the i register is increased (step S63). Then, the operation proceeds to a process of a next pixel.

If the absolute value of the difference between the pixel values $y_{i-1}$ and $y_{i+1}$ is smaller than the fourth threshold value $TH_4$, a consideration is performed that the foregoing portion is a portion in which a maximal value is taken. Thus, the average value avg is calculated (step S64).

Then, whether or not the calculated average value avg is smaller than the minimum value min obtained in the process of the previous pixel is determined (step S65). If it is smaller than the minimum value minimum value, the average value avg is made to be a new minimum value min (step S66). Then, the operation proceeds to step S63. If it is not smaller than the minimum value min, whether or not the average value avg is larger than the maximum value max obtained in the process of the previous pixel is determined (step S67). If it is larger than the maximum value max, the average value avg is made to be a new maximum value max (step S68). Then, the operation proceeds to step S63. If it is not larger than the maximum value max, the original maximum and minimum values are maintained and then the operation proceeds to step S63.

By repeating the foregoing process, the peak value of the luminance, that is, the maximum value max and minimum value min are detected.

After the detection of the peak value has been completed, whether or not the ratio max/min of the maximum value to the minimum value is smaller than the ninth threshold value $TH_9$ is determined (step S101). If the ratio is larger than the ninth threshold value $TH_9$, the detected peak value max, minimum value and the interior division ratio k of the previous frame calculated by the process for calculating the interior division ratio are used to calculate the threshold value th in accordance with the foregoing equation (1) (step S42).

If the ratio of the maximum and minimum values is smaller than the ninth threshold value $TH_9$, the detected minimum value min is replaced by the minimum value fr_min of the previous frame (step S102). Then, the operation proceeds to step S42 so that the threshold value th is calculated.

Then, the threshold value th is multiplied by light quantity change rate β so that the threshold value threshold for the binarizing process is calculated (step S117). Symbol β indicates a change rate when the quantity of light is changed by the light source 198 and it is expressed as follows when the quantity of light for the frame from which the peak value has been detected is L1 and the quantity of light of the frame which is binarized by using the calculated threshold value is L2:

$$\beta = \frac{L2}{L1}$$

Figure 64:
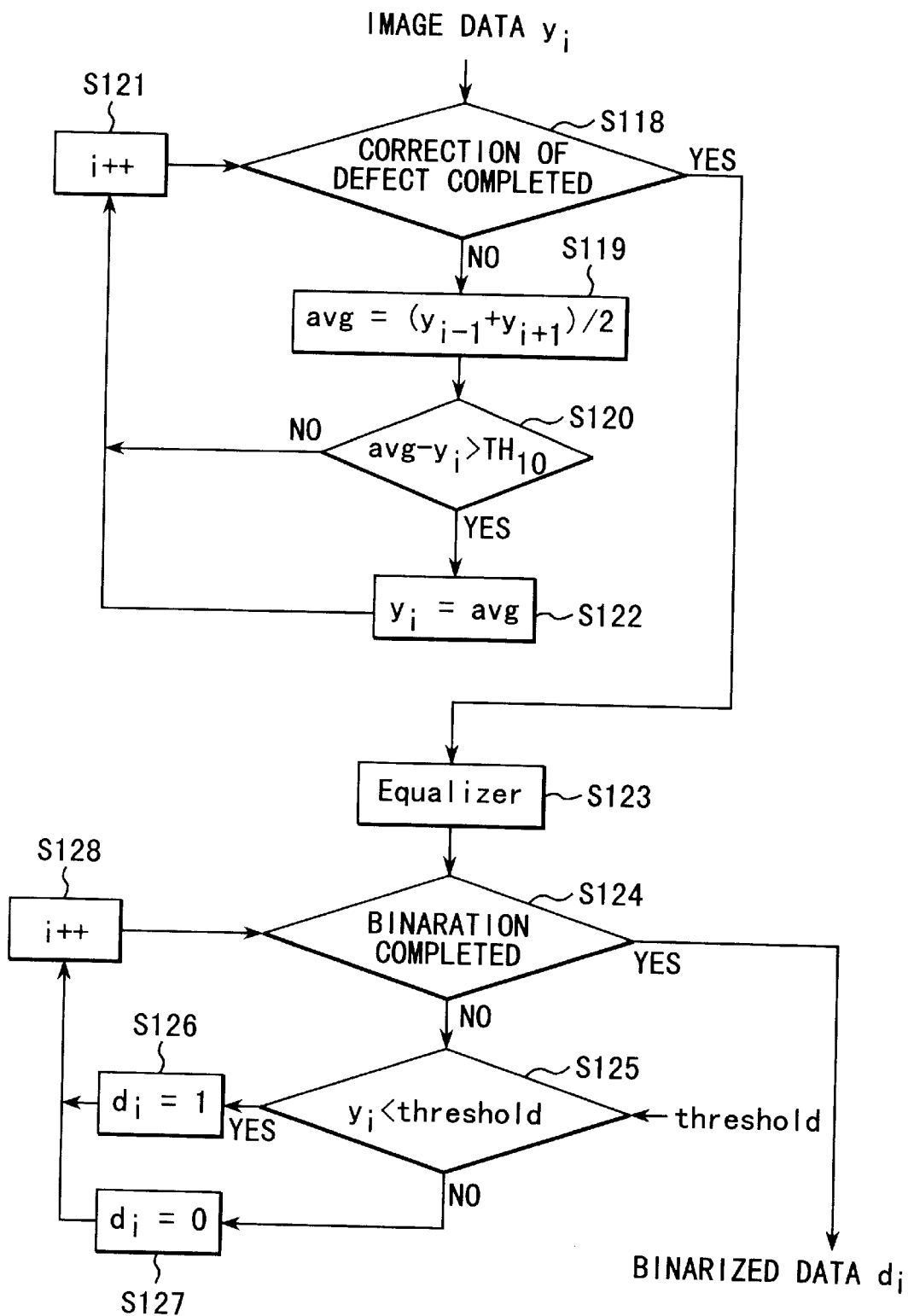
FIG. 64 is a flow chart of a binarizing process according to the thirty-first embodiment of the information reproducing system according to the present invention.

FIG. 64 is a flow chart of the binarizing process according to the thirtieth embodiment.

Initially, whether or not correction of a defect of a pixel has been completed is determined (step S118). If the correction has not been completed, average pixel value avg of pixels $y_{i-1}$ and $y_{i+1}$ in front and in the rear of the i-th pixel $y_i$ of interest is calculated (step S119). Then, whether or not the difference between the calculated average value avg and the value of the pixel $y_i$ of interest is larger than tenth threshold value $TH_{10}$ is determined (step S120). If it is not larger than the tenth threshold value $TH_{10}$, a fact can be said that the pixel $y_i$ of interest has no defect. Therefore, a process of the next pixel is performed by increasing i (step S121), and then the operation returns to step S118. If it is larger than the tenth threshold value $TH_{10}$, a fact can be said that the pixel $y_i$ of interest has a defect. Therefore, a replacement from pixel value of the pixel $y_i$ of interest to the calculated average value avg is performed (step S122). Then, the operation proceeds to step S121.

After correction of defects of all of the pixels has been completed, image data of the pixel is equalized by an equalizer (step S123). Then, the threshold value for the binarizing process obtained in the process of the previous frame is binarized.

That is, whether or not the binarizing process has been completed is determined (step S124). If the binarizing process has not been completed, whether or not the value of the pixel $y_i$ of interest is smaller than the threshold value threshold for the binarizing process is determined (step S125). If the value is smaller than the threshold value threshold, data di for binarization is determined to be "1" (step S126). If the value is smaller than the threshold value threshold, it is determined to be "0" (step S127). Then, to process the next pixel, i is increased (step S128), and then the operation returns to step S124.

After all of the pixels have been binarized, binarized data di for all of the pixels in the subject frame 40 is transmitted.

As described above, the thirty-first embodiment comprises the interior division ratio calculating processing section, the threshold value calculating processing section and the binarization processing section. If each of the processes is performed in three continuous frames (or fields in the case where the process is performed in each field), the image memory can be omitted and thus the binarization can be performed real time. The foregoing process is realized by using the characteristic that the threshold value of the present frame can be determined by using the state of the previous frame because the illumination condition and the recording condition are not considerably changed among the successive frames in a case where the images of the dot codes 170 are continuously picked up.

Figure 65:
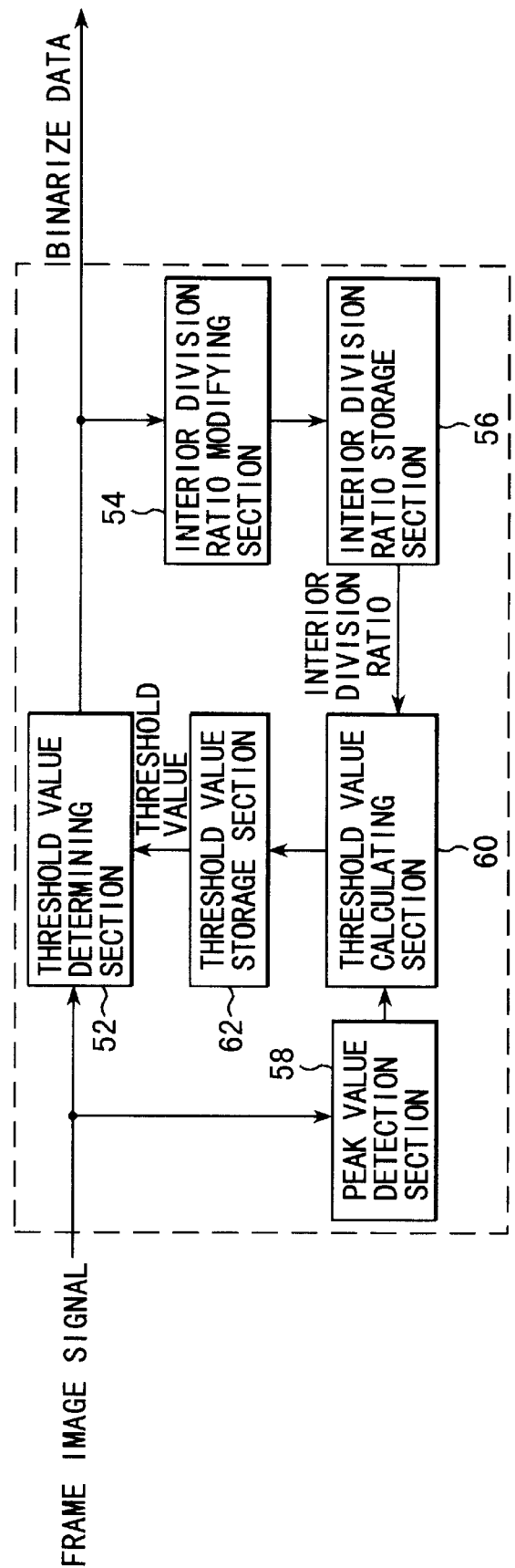
FIG. 65 is a block diagram showing a thirty-first embodiment of an information reproducing system according to the present invention.

That is, as shown in FIG. 65, a threshold value determining section 52 binarizes an image signal of the present frame (frame i) with an appropriate threshold value for the binarization. Then, a reference dot is detected from the binarized image, and the interior division ratio is modified from the area by an interior division ratio modification section 54. Then, the modified interior division ratio is stored by an interior division ratio storage section 56. Then, a peak value detection section 58 detects the peak value from the image signal of a next frame (frame i+1). A threshold value calculating section 60 calculates the threshold value from the peak value and the stored interior division ratio (of the frame i). The calculated threshold value is stored in a threshold value storage section 62. Then, an image signal of a next frame (frame i+2) is binarized by the stored threshold value (of frame i+1).

As described above, the code reading section 10 successively reads the dot codes, and the binarizing section 14 modifies the interior division ratio of the two frames before the read and continuous image signals with the area of the detected reference dot. In accordance with the modified interior division ratio, the peak value of the previous frame is interior-divided so that the threshold value is calculated. In accordance with the calculated threshold value, the present frame is binarized. Therefore, the memory for storing the images can be omitted and the real time process can be performed.

When the binarization is performed by using the modified interior division ratio and the interior division ratio is again modified, a delay of two frames takes place in the foregoing structure. Therefore, it is preferable that the interior division ratio be controlled while being separated into two independent systems consisting of odd-number frames and even-number frames.

Figure 66A:
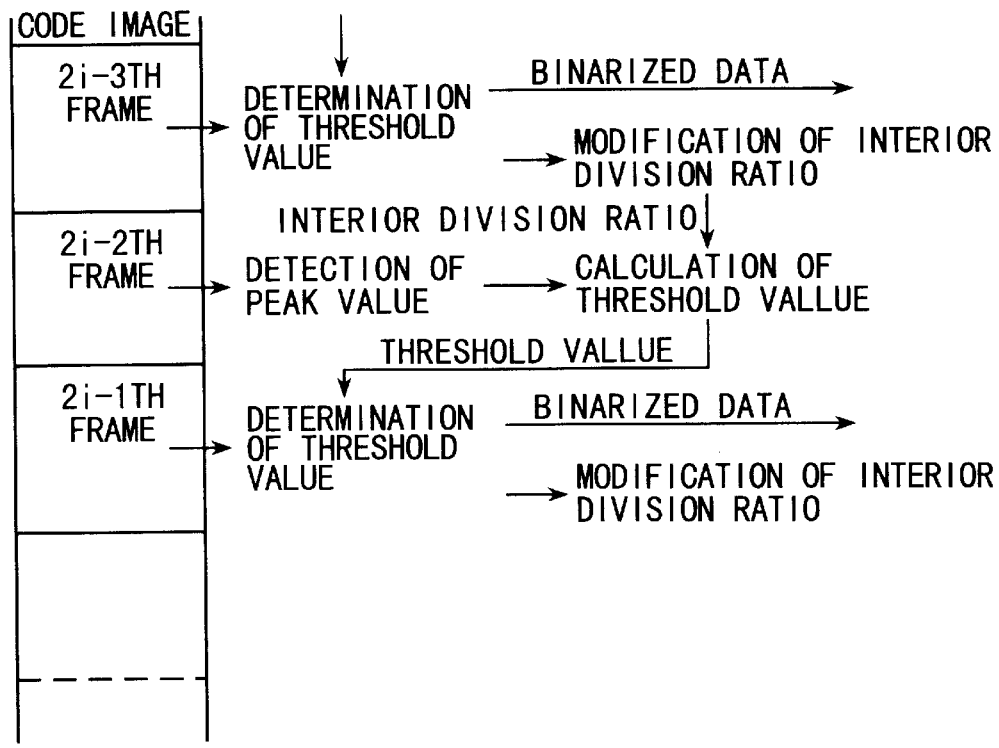
FIGS. 66A and 66B are diagrams showing the flow of a process in the thirty-first embodiment of the information reproducing system according to the present invention.
Figure 66B:
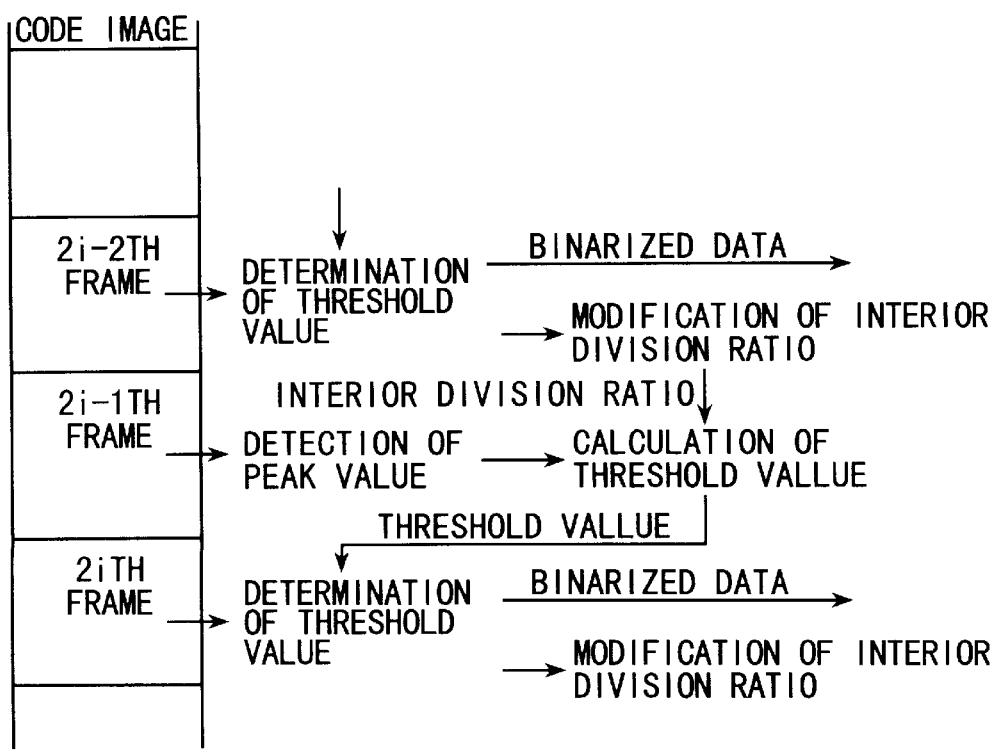

That is, as can be understood from FIG. 66A, binarized data is transmitted from every other frames. Therefore, blocks which can be read in only the missed frames is skipped from reading. To prevent this, the scanning speed may be sufficiently reduced to prevent omitting from reading of the block if the code is read from every other frames. As an alternative to this, binarization operations shifting from each other by one frame may be in parallel performed as shown in FIG. 66B. The parallel binarizing operations enables the process to be a common process because the same process is not performed in the same frames. Therefore, values different in only the interior division ratios are required to be held. Therefore, the two systems of interior division ratios are held and the interior division ratio of the different type may be used for the odd-number frames and the even-number frames.

A flow of the process in the foregoing case will now be described with reference to a time chart shown in FIG. 67.

That is, as can be understood from FIG. 67, the parallel binarizing processes are performed such that the same process is not performed between a system 1 and a system 2 in the same frame. Therefore, the processes can sequentially be performed in accordance with the time chart. Each value are held in a period as shown in FIG. 67 and thus only the different interior division ratios must be held for the two systems.

As a result, the scanning speed can be maintained, omission of reading of the block can be prevented, the memory for storing the image can be omitted and the real time process can be performed.

The information recording medium 12 will now be described.

A first embodiment of the information recording medium according to the present invention is used in the information reproducing system comprising the code reading section 10 for reading the dot code 170 from the information recording medium 12 on which multimedia information including at least any one of audio information, image information and digital code data is recorded in the form of the dot code 170 which can optically be read; the binarizing section 14 for generating binarized data from the image signal corresponding to the dot code 170 read by the code reading section 10; and the information reproducing section 16 for restoring binarized data generated by the binarizing section 14 to original multimedia information so as to reproduce the original multimedia information. In particular, the information recording medium 12 is characterized by the reference dot 18 which serves as a reference when the threshold value is modified in such a manner that the area of the detected dot approaches a predetermined target value.

By providing the reference dot 18 as described above, binarization on which the dot area is accurately reflected can be performed without dependency upon the dot expansion and contraction in the recording condition.

As shown in FIG. 10A, modulation is performed in such a manner that an isolated dot is formed in the data dots 282 and the isolated dot is used as the reference dot 18. In this case, the isolated dot in the dot code is used and therefore the recording area can effectively be used.

Moreover, another region for the reference dot is provided individually from the data dots 282, as shown in FIG. 10B and the isolated dot is recorded in the provided region so that the reference dot 18 is formed. In the foregoing case, existence of the reference dot 18 at a predetermined position individually from the data dots 282 enables the detection to be performed easily.

As an alternative to this, the reference dot 18 may be provided in the vicinity of the reading end of the data dots 282 as shown in FIG. 11A to form a recording format arranged such that the reference dot 18 is initially scanned. In the foregoing case, the threshold value can be modified when scanning of the data code 20 is started. Moreover, the recording area can effectively be used afterwards as the data code recording region.

As shown in FIG. 11B, blocks of the data dots 282 each having a somewhat size may be formed so as to repeatedly form the reference dots 18. In the foregoing case, periodical existence of the reference dots 18 enables modification of the threshold value to be performed when required.

A second embodiment of the information recording medium according to the present invention will now be described.

In the second embodiment, in place of using the reference dot 18 as the reference for modifying the threshold value, the binarizing section 14 detects the maximum and minimum values of the image signal level corresponding to the dot code 170. Code data binarized by the threshold value calculated from the maximum and minimum and in accordance with a predetermined interior division ratio is used to detect a dot. Thus, it is used as a reference for modifying the interior division ratio in such a manner that the area of the detected dot area approaches a predetermined target value.

Thus, binarization on which the dot area is accurately reflected can be performed without dependency upon dot expansion and contraction of the recording condition and also without dependency of the illumination condition when the image is picked up.

A third embodiment of the information recording medium according to the present invention will now be described.

Figure 68A:
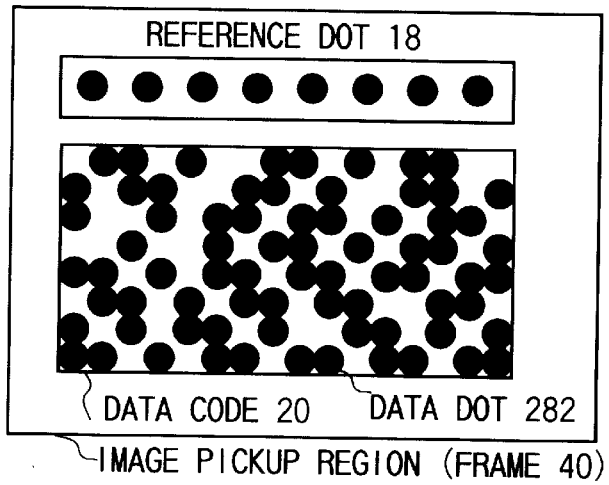
FIGS. 68A and 68B are diagrams respectively showing dot codes recorded on an information recording medium according to a third embodiment of the present invention.
Figure 68B:
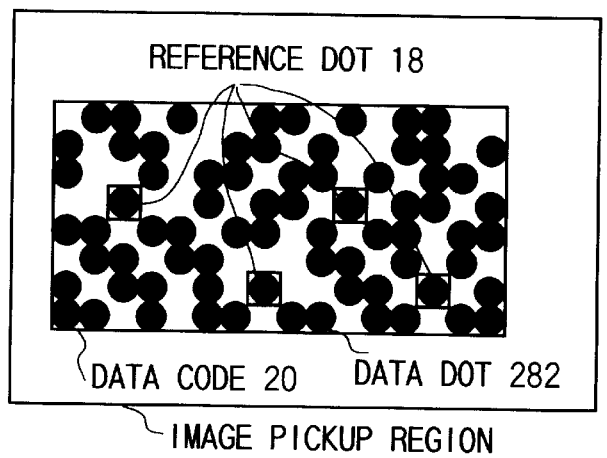

In the third embodiment, the information recording medium 12, as shown in FIGS. 68A and 68B, has recorded images of a plurality of reference dots 18 in the image pickup region (the frame 40).

Since recording is performed in such a manner that a plurality of the reference dots 18 exist in the image pickup region, that is, in the frame, the accuracy of the area can be improved by using the average area as described in the seventh embodiment of the information reproducing system.

That is, the averaging operation compensates the change in the area occurring attributable to the relative position. Even if a stain, a patchy portion and blurring take place, the defective portion may be omitted because a sufficiently large number of the reference dots 18 can be detected. Therefore, the average area can stably be calculated. As described above, the plural reference dots 18 can be detected in the image pickup region and the binarizing section 14 calculates the average area so that influence of noise is compensated and further accurate calculation of the area is enabled.

A fourth embodiment of the information recording medium according to the present invention will now be described.

In the fourth embodiment, the information recording medium 12 has a reference region 46 from which the characteristic amount for the binarization is extracted by the binarizing section 14.

Figure 69A:
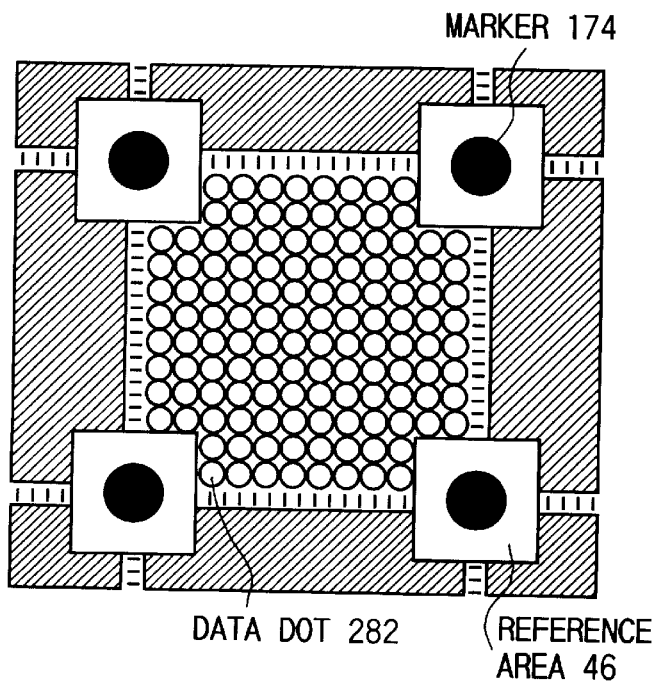
FIGS. 69A and 69B are diagrams respectively showing dot codes recorded on an information recording medium according to a fourth embodiment of the present invention.
Figure 69B:
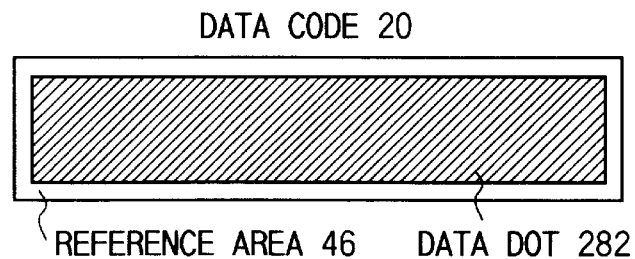

That is, as has been described in the twenty-second embodiment of the information reproducing system, the reference region 46 for extracting the characteristic amount for the binarization is provided for the information recording medium 12. As the reference region 46, either of a black region or a white region each having a area larger than that of the data dots 282, for example, the marker 174 or an inhibition region adjacent to the marker 174 may be employed, as shown in FIG. 69A. As shown in FIG. 69B, the outer periphery of the data code 20 may be employed.

Since the reference region 46 exists individually from the code, a stable characteristic amount, for example, the maximum and minimum values of the luminance can be extracted.

A fifth embodiment of the information recording medium according to the present invention will now be described.

The fifth embodiment is structured such that the information recording medium 12 according to the first or the second embodiment has a dot interval measuring dot for measuring the dot interval for correcting at least either of the reference dot area detected by the binarizing section 14 or the predetermined target value.

That is, as has been described in the sixth embodiment of the information reproducing system, the interval between dots is measured to correct the area of the reference dot 18 when the reference dot 18 has been detected, this embodiment is characterized in that the interval measuring dot 38 is recorded.

Figure 70A:
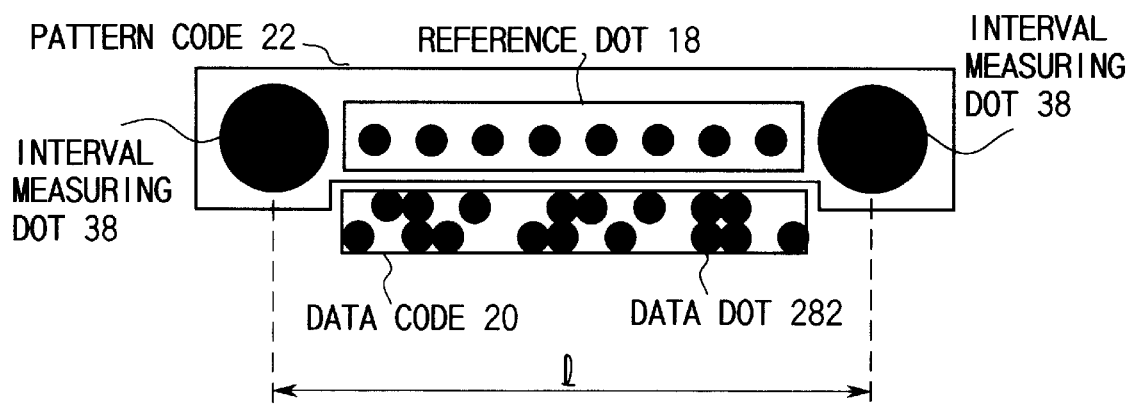
FIGS. 70A and 70B are diagrams respectively showing dot codes recorded on an information recording medium according to a fifth embodiment of the present invention.
Figure 70B:
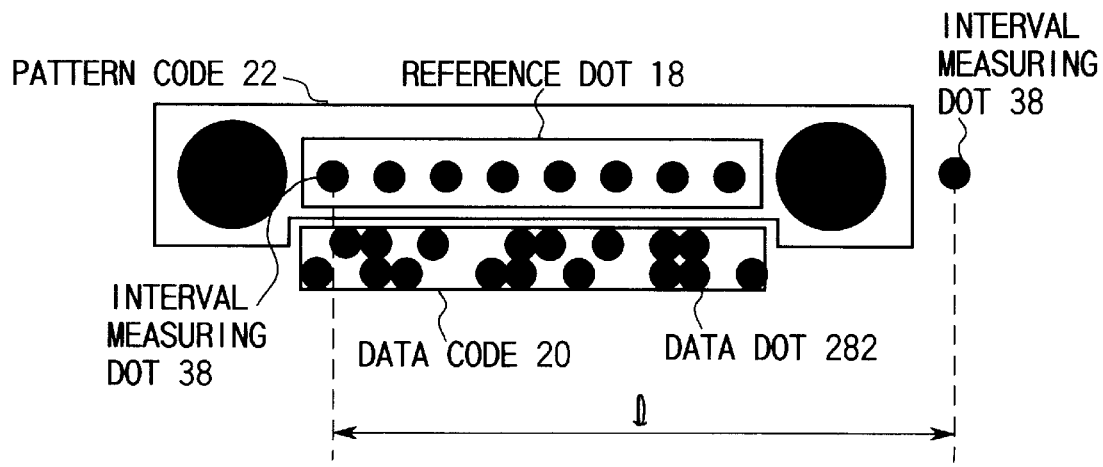

As the interval measuring dot, the marker 174 may be used, as shown in FIG. 70A, or a predetermined dot amount the reference dots 18, for example, a dot positioned to the right of the marker may be used, as shown in FIG. 70B.

As described above, the distance between predetermined dots is measure, the image pickup magnification and state of distortion can be detected. In accordance with the detected state, the dot area or the target value is corrected so that binarization is performed to correspond to change in the magnification and distortion.

The information recording apparatus will now be described.

Figure 71A:
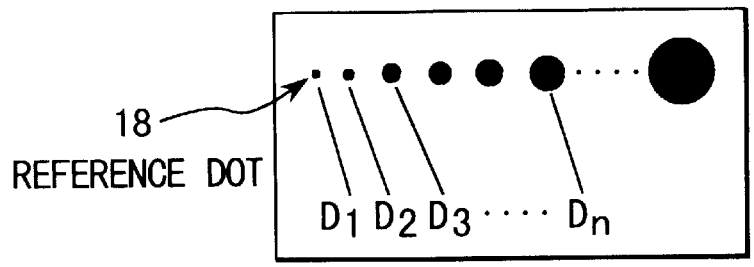
FIG. 71A is a diagram showing reference dots to be printed before an actual dot code is printed by an information reproducing apparatus according to a first embodiment the present invention.
Figure 71B:
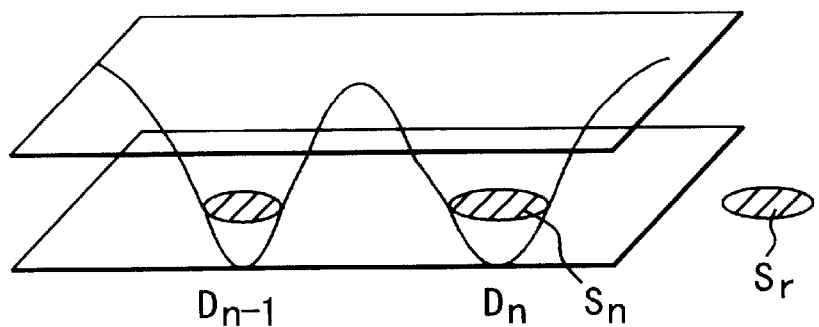
FIG. 71B is a diagram showing the contrast between the area of the reference dots shown in FIG. 71A and a reference value.

The information recording apparatus according to the present invention uses the above-mentioned information reproducing system. In a first embodiment of the information recording apparatus is structured such that at least two types of reference dots $D_1, D_2, \ldots, D_n, \ldots$ at least having different area or shape, for example, different areas as shown in FIG. 71A are recorded on the information recording medium 12. By using the foregoing information reproducing system, the recorded reference dots 18 are read so as to be binarized. As shown in FIG. 71B, areas $S_1, S_2, S_n, \ldots$ of each of the read reference dots 18 and a predetermined reference value $S_r$ are subjected to comparisons. Then, reference dots 18 having the difference smaller than a predetermined threshold value are selected. In accordance with the selected reference dots 18, a dot code 170 corresponding to multimedia information which must actually be recorded is recorded on the information recording medium 12.

Figure 73:
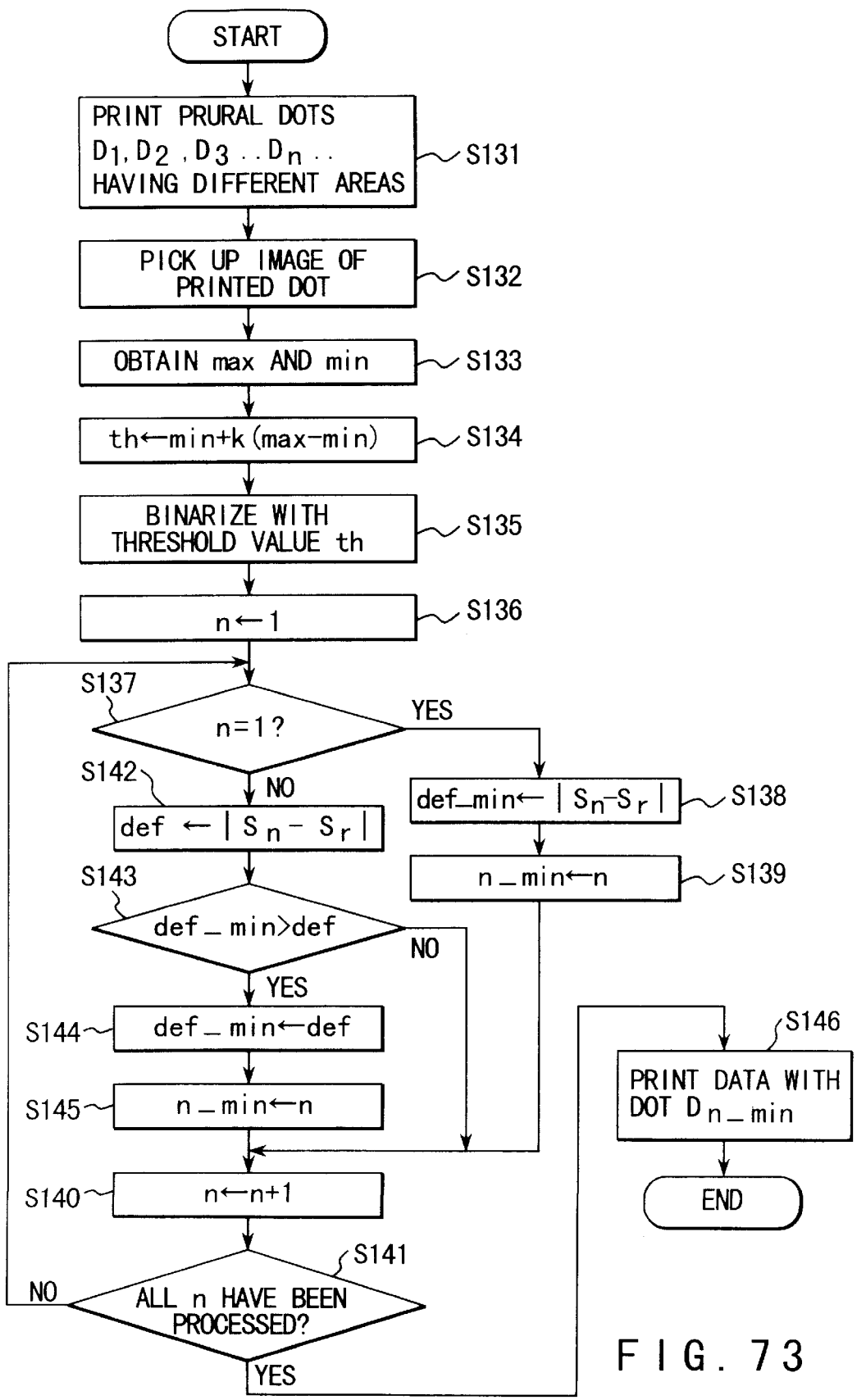
FIG. 73 is a flow chart showing the operation of the information recording apparatus according to the first embodiment of the present invention.

FIG. 72 is a block diagram showing the above-mentioned information recording apparatus. FIG. 73 is an operation flow chart.

Initially, a printing section 64 prints a plurality of reference dots $D_1, D_2, \ldots, D_n, \ldots$ having different areas (step S131). Then, an image input section 66 picks up the images of the printed reference dots 18 (step S132). A maximum value and minimum value detection section 68 obtains maximum value max and minimum value min (step S133). A threshold value generating section 70 uses the obtained maximum value max and minimum value min and the interior division ratio k stored in an interior division ratio holding section 72 to calculate threshold value th such that min+k(maximum value−min) (step S134). A binarizing processing section 74 uses the threshold value th to binarize the image signal supplied from the image input section 66 (step S135).

Then, as the initial value of value n, "1" is set to a counter 76 (step S136).

A dot area detection section 78 uses the binarized output from the binarizing processing section 74 to calculate the area $S_n$ of the n-th reference dot 18 and supplies the calculated area $S_n$ to a differentiator 80. The differentiator 80 calculates the difference between the calculated dot area $S_n$ and a predetermined reference value $S_r$ stored in a buffer 82. An absolute value calculator 84 obtains the absolute value of the calculated difference. A comparator 86 subjects the absolute value of the difference and the minimum value of the difference stored in the buffer 82 to a comparison. When the value n of the counter 76 is "1", that is, the process for the first reference dot $D_1$ is performed (step S137), the minimum value def_min of the difference has not been stored in the buffer 82. Therefore, the absolute value of the difference calculated by the absolute value calculator 84 is as it is stored as the minimum value def_min in the buffer 82 (step S138). In this case, the count value n is, as the minimum value dot number n_min for specifying the reference dot 18 having the minimum value, stored in the buffer 82 (step S139).

Then, the value n of the counter 76 is increased (step S140), and then whether or not all of the printed reference dots 18 have been processed is determined (step S141). If all of the reference dots 18 have not been processed, the operation returns to step S137.

When the processes for the second and following reference dots 18 are performed, a determination is performed that the count value n is not "1" in step S137. In this case, the comparator 86 stores the absolute value of the difference calculated by the absolute value calculator 84 in a def register (step S142). Then, whether or not the minimum value def_min of the difference stored in the buffer 82 is larger than the foregoing absolute value is determined by a comparison (step S143). If the absolute value def of the difference stored in the def register is not less than the minimum value def_min of the difference stored in the buffer 82, the operation proceeds to step S140. If it is not larger than def_min, the absolute value def stored in the def register is employed as a new minimum value def_min of the difference which is stored in the buffer 82 (step S144). The count value n of the counter 76 is stored in the buffer 82 as the minimum value dot number n_min (step S145). Then, the operation proceeds to step S140.

When the all of the printed reference dots 18 have been processed and a determination has been performed in step S141 that all of the reference dots 18 have been processed, a dot number instruction section 88 instructs the printing section 64 to print data with reference dot $Dn_{n\_min}$ indicated by minimum value dot number n_min stored in the buffer 82 (step S146). In a case where dots are arranged in the descending order of the area, a structure may be employed in which all of the dots are not processed as described above. The process may be completed at a moment updating is interrupted from minimum value def_min of the difference has been updated so as to instruct the dot number.

In response to this, the printing section 64 prints the dot code 170 corresponding to the actual multimedia information on the information recording medium 12.

As a result, dots can stably be recorded in such a manner that the dot area after the binarizing process has been performed is a predetermined reference value.

A second embodiment of the information recording apparatus according to the present invention will now be described.

In the second embodiment, when two or more types of reference dots 18 having at least different area or shape are recorded on the information recording medium 12, recording is performed such that at least either of the area or the shape is different in each of predetermined steps of the minimum resolving power of the information recording apparatus.

Figure 74:
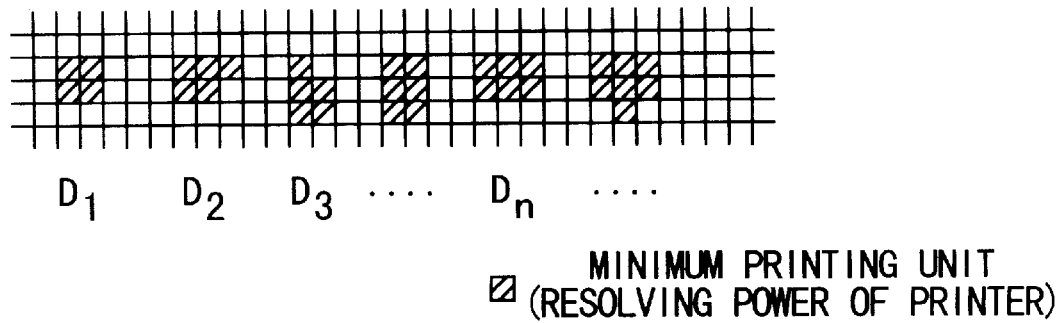
FIG. 74 is a diagram showing the operation of a second embodiment of the information recording apparatus according to the present invention.

In a case where one area shown in FIG. 74 corresponds to the minimum resolving power of the information recording apparatus, for example, reference dots 18 in the five same units may be recorded variously such as reference dots $D_2$ and $D_3$. Therefore, a plurality of dots having areas or shapes changed with the minimum resolving power unit are recorded to select an optimum dot.

As a result, dots can selectively be recorded with the minimum steps for the information recording apparatus and with the optimum dot area and shape.

A third embodiment of the information recording apparatus according to the present invention will now be described.

Figure 75A:
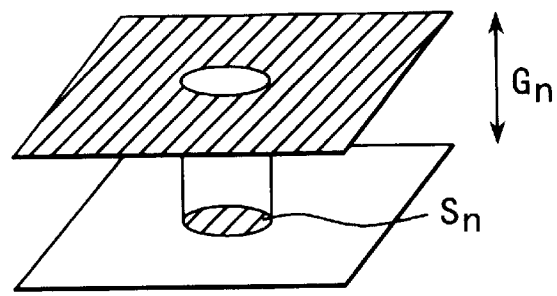
FIG. 75A is a diagram showing the difference in the density between the background region and a reference dot according to a third embodiment of the information recording apparatus according to the present invention.
Figure 75B:
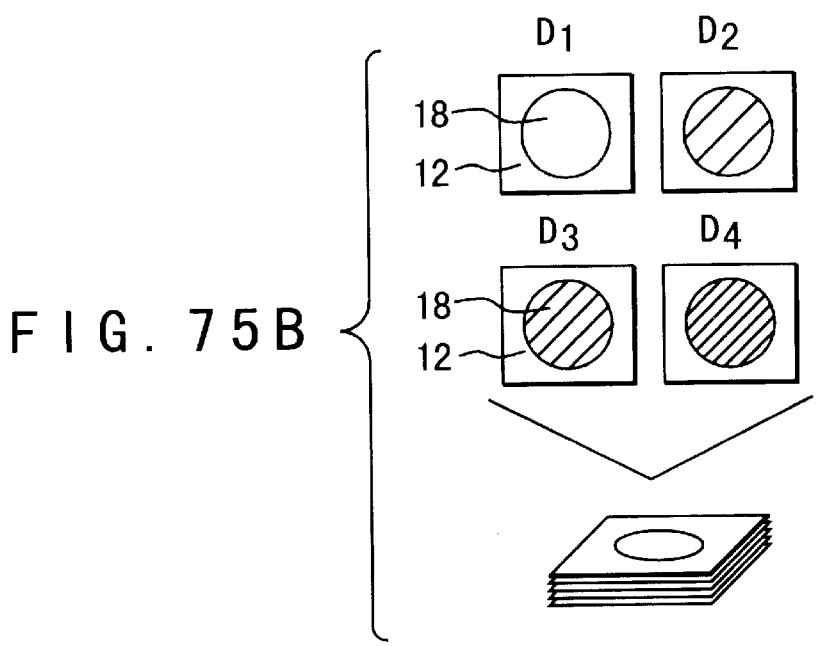
FIG. 75B is diagram showing reference dots to be printed before an actual dot code is printed by an information recording apparatus according to a third embodiment of the present invention.
Figure 75C:
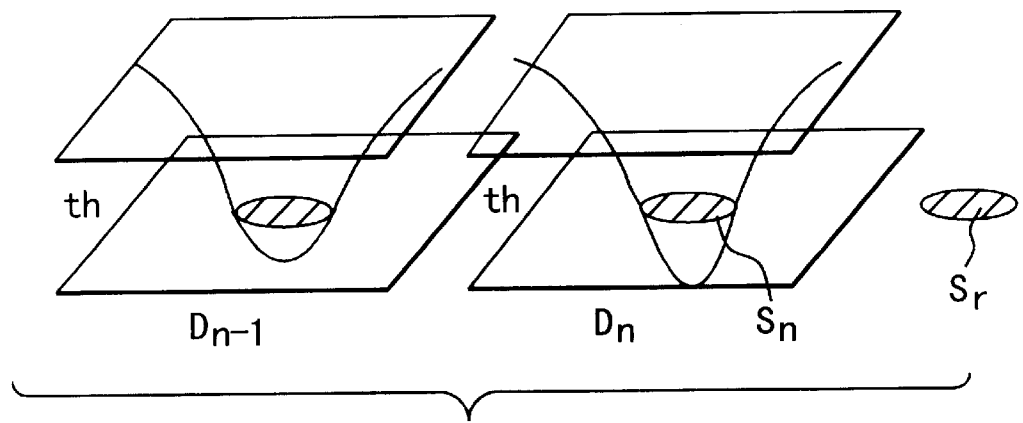
FIG. 75C is a diagram showing the contrast between the area of the reference dot shown in FIG. 71A and a reference value.

In the third embodiment, as shown in FIG. 75A, assuming that the difference between the density of the dot $S_n$ and that of the background region is $G_n$, reference dots 18 having different density difference $G_n$ are recorded on the information recording medium 12. By using the information reproducing system, the recorded reference dots 18 are read and binarized, and then the area of each of the read reference dots 18 and a predetermined reference value are subjected to a comparison. By employing the density corresponding to the reference dot 18 having the different smaller than the predetermined threshold value, the dot code 170 corresponding to the multimedia information which must be recorded is recorded on the information recording medium 12. In this case, as shown in FIG. 75B, reference dots $D_1, D_2, \ldots, D_n, \ldots$ are recorded on different information recording medium 12. As shown in FIG. 75C, if a predetermined reference value $S_r$ is larger as a result of a comparison between the area $S_{n-1}$ of a certain reference dot $D_{n-1}$ and the predetermined reference value $S_r$, adjustment is performed to enlarge the difference in the density, that is, thickened to record a next reference dot $D_n$. If the dot area $S_{n-1}$ is larger, adjustment is performed to reduce the difference in the density, that is, light to record a next reference dot $D_n$. The foregoing process is repeated to select the optimum recording density.

Figure 77:
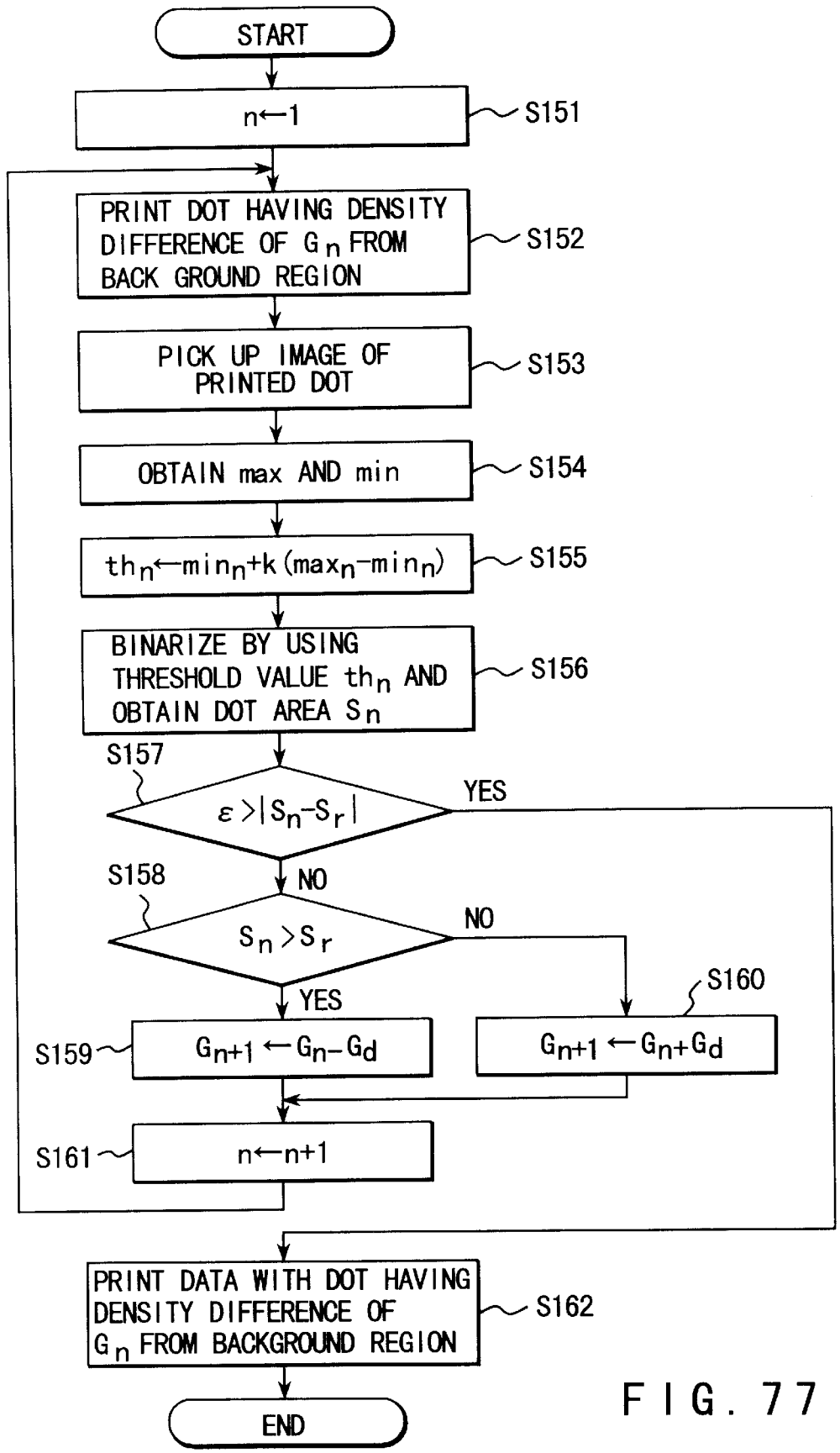
FIG. 77 is a flow chart showing the operation of the information recording apparatus according to the third embodiment of the present invention.

FIG. 76 is a block diagram showing the above-mentioned information recording apparatus, and FIG. 77 is an operation flow chart.

Initially, "1" is initialized to the buffer 82 as the count value n (step S151). Then, a printing density instruction section 90 instructs the printing section 64 to print reference dot $D_n$ ($D_1$ in this case) having the density difference of $G_n$ ($G_1$ in this case) from the background region indicated by the count value n (step S152). When the printing section 64 has printed the reference dot 18 to correspond to this. Then, the image input section 66 picks up the image of the reference dot 18 (step S153). Then, the maximum value and minimum value detection section 68 obtains the maximum value $max_n$ and minimum value $min_n$ (step S154). The threshold value generating section 70 uses the obtained maximum value $max_n$, the minimum value $min_n$ and the interior division ratio k held in the interior division ratio holding section 72 to calculated the threshold value th such that $min_n + k(max_n - min_n)$ (step S155). The binarizing processing section 74 uses the threshold value $th_n$ to binarize an image signal supplied from the image input section 66. Then, the dot area detection section 78 obtains the dot area $S_n$ (step S156). The calculated dot area $S_n$ is supplied to the differentiator 80 and the buffer 82.

The differentiator 80 calculates the difference between the calculated dot area $S_n$ and the predetermined reference area vale $S_r$ stored in the buffer 82. The absolute value calculator 84 obtains the absolute value of the calculated difference. The comparator 86 subjects the absolute value of the difference and the threshold value $\epsilon$ previously set to the buffer 82 to a comparison (step S157). If the absolute value of the difference is larger than the threshold value, the calculated dot area $S_n$ and the predetermined reference area value $S_r$ to a comparison (step S158). If the calculated dot area $S_n$ is larger, a predetermined correction density $G_d$ is subtracted from the value of the density difference $G_n$ so that density difference $G_{n+1}$ for printing a next reference dot 18 is calculated. Then, a result of the calculation is stored in the buffer 82 (step S159). If the calculated dot area $S_n$ is smaller than the predetermined reference area value $S_r$, the predetermined value of the correction density $G_d$ is added to the value of the density difference $G_n$ so that density difference $G_{n+1}$ for printing the next reference dot 18 is calculated. Then, a result of the calculation is stored in the buffer 82 (step S160). Then, the count value n of the buffer 82 is increased (step S161), and then the operation returns to step S152 so that the printing density instruction section 90 instructs the printing section 64 to print the reference dot $D_n$ ($D_2$ in this case) having the density difference from the background region of $G_n$ (which is $G_2$ in this case).

The foregoing process is repeated. When a determination has been performed in step S157 that the above-mentioned of the difference is smaller than the threshold value $\epsilon$, the printing density instruction section 90 instructs the printing section 64 to print the dot code 170 with the dot having the density difference from the background region of $G_n$ (step S162).

To correspond to this, the printing section 64 prints the dot code 170 corresponding to the actual multimedia information with the instructed density difference dot.

As a result, dots can stably be recorded in such a manner that the dot area after the binarization is made to be a predetermined reference value.

A fourth embodiment of the information recording apparatus according to the present invention will now be described.

Figure 78A:
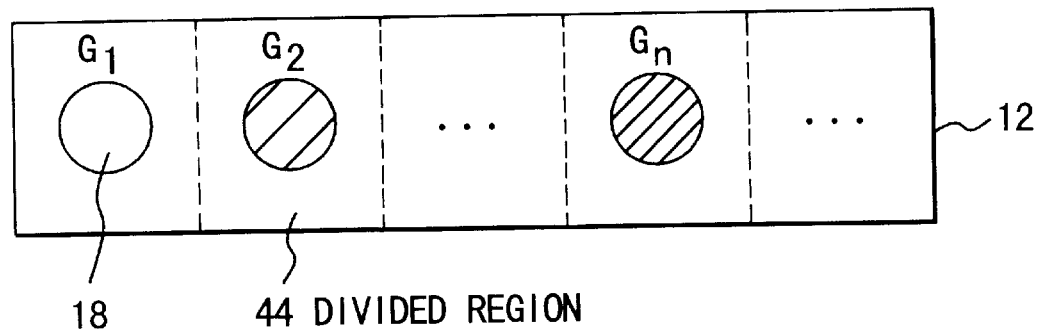
FIG. 78A is diagram showing reference dots to be printed before an actual dot code is printed by an information recording apparatus according to a fourth embodiment of the present invention.
Figure 78B:
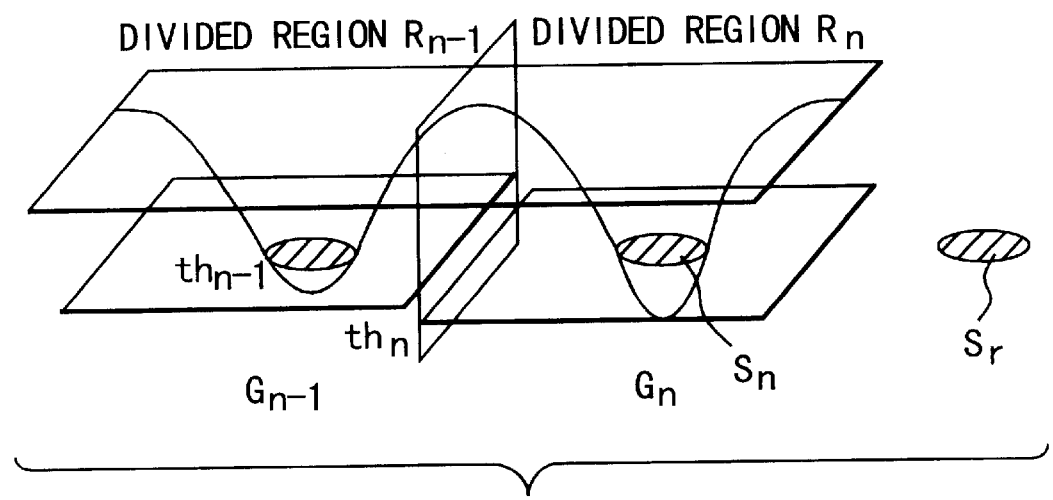
FIG. 78B is a diagram showing the contrast between the areas of the reference dots shown in FIG. 78A and a reference value.

The fourth embodiment is structured such that when the density is adjusted as is performed in the third embodiment, the plural reference dots 18 are not printed on a plurality of information recording mediums 12. As shown in FIG. 78A, a plurality of reference dots 18 having different densities are recorded on one information recording medium 12 as is performed in the first embodiment. The regions are divided to enable the dots to be included in different regions 44. As shown in FIG. 78B, binarization is performed for each of the divided regions so that the density of the optimum dot area is selected.

Figure 80:
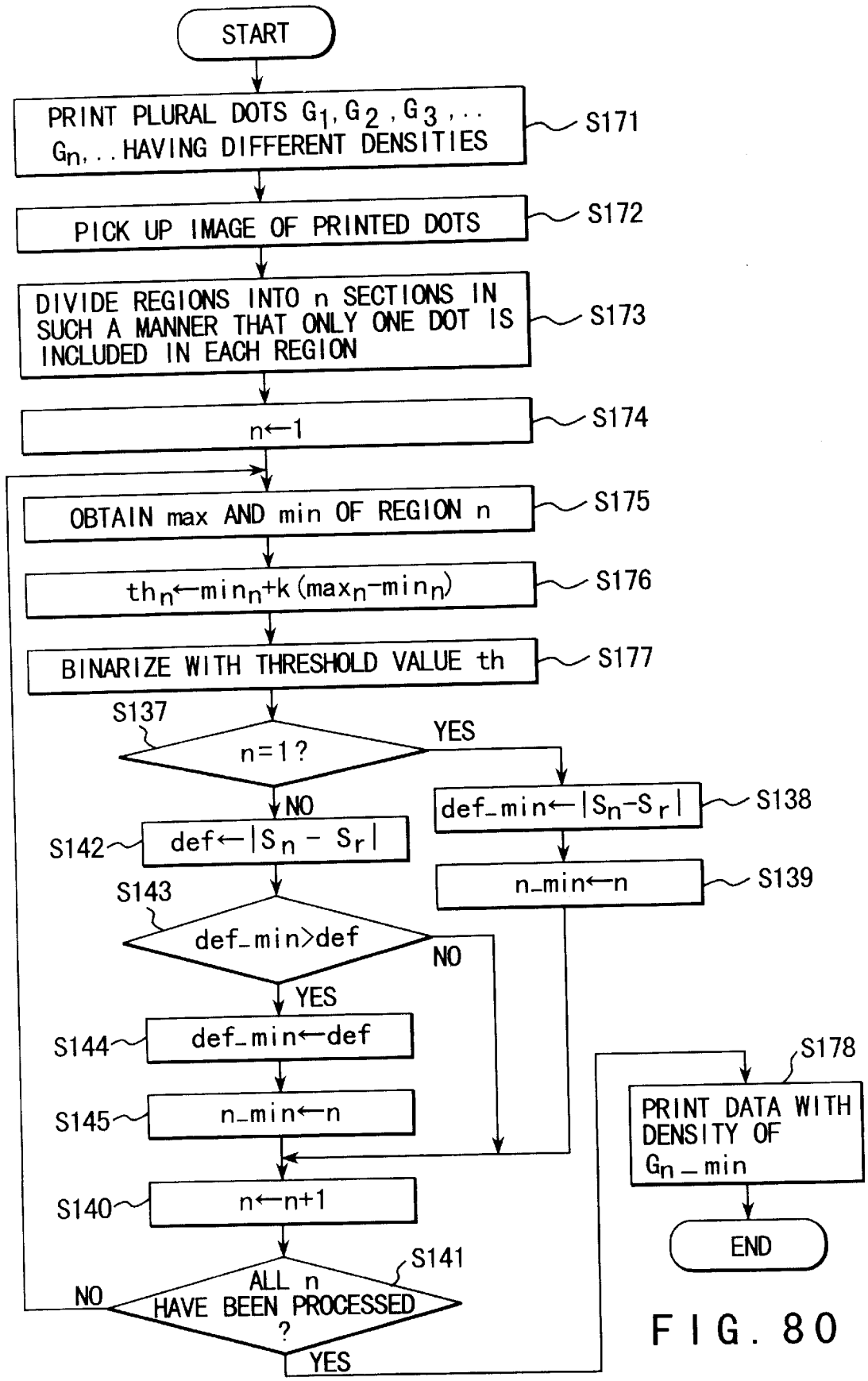
FIG. 80 is a flow chart showing the operation of the information recording apparatus according to the fourth embodiment of the present invention.

FIG. 79 is a block diagram showing the above-mentioned information recording apparatus. FIG. 80 is an operation flow chart.

Initially, the printing section 64 prints a plurality of reference dots $G_1, G_2, \ldots, G_n, \ldots$ having different densities (step S171). Then, the image input section 66 picks up the images of the printed reference dots 18 (step S172). The region dividing section 92 divides the region into n pieces in such a manner that only one dot is included in each region (step S173). Then, "1" is, as an initial value of the value n, set to the counter 76 (step S174).

Then, the maximum value and minimum value detection section 68 obtains the maximum value $max_n$ and minimum value $min_n$ in the region n (step S175). The threshold value generating section 70 uses the obtained maximum value $max_n$ and the minimum value $min_n$ and the interior division ratio k held by the interior division ratio holding section 72 to calculate the threshold value th such that $min_n + k(max_n - min_n)$ (step S176). The binarizing processing section 74 uses the threshold value $th_n$ to binarize the image signal supplied from the image input section 66 (step S177).

The dot area detection section 78 calculates area $S_n$ by using the binary output from the binarizing processing section 74 to calculate the area $S_n$ of the n-th reference dot 18 to supply the calculated area $S_n$ to the differentiator 80. The differentiator 80 calculates the difference between the calculated dot area $S_n$ and the predetermined reference value $S_r$ set to the buffer 82. The absolute value calculator 84 obtains the absolute value of the calculated difference. The comparator 86 subjects the absolute value of the difference and the minimum value of the difference stored in the buffer 82 to a comparison. When the value n of the counter 76 is "1", that is, a process for the first reference dot $G_1$ is performed (step S137), the minimum value def_min of the difference has not been stored in the buffer 82. Therefore, the absolute value of the difference calculated by the absolute value calculator 84 is, as it is, stored in the buffer 82 as the minimum value def_min of the difference (step S138). In this case, the count value n is, as the minimum value dot number n_min for specifying the reference dot 18 having the minimum value, stored in the buffer 82 (step S139).

Then, the value n of the counter 76 is increased (step S140), and then whether or not the process of all of the printed reference dots 18 has been completed is determined (step S141). If the process has not been completed, the operation returns to step S175.

When processes of the second and ensuing reference dots 18 are performed, a determination is performed in step S137 that the count value n is not "1". In this case, the comparator 86 stores, into the def register, the absolute value of the difference calculated by the absolute value calculator 84 (step S142) to determine whether or not the minimum value def_min of the difference stored in the buffer 82 is larger than the absolute value (step S143). If the absolute value def of the difference stored in the def register is larger than the minimum value def_min stored in the buffer 82, the operation proceeds to step S140. If it is not larger than the def_min, the absolute value def of the difference stored in the def register is, as the minimum value def_min of a new difference, stored in the buffer 82 (step S144). The count value n of the counter 76 at this time is, as the minimum value dot number n_min, stored in the buffer 82 (step S145). Then, the operation proceeds to step S140.

As described above, all of the printed reference dots 18 have been processed and the determination has been performed in step S141 that the process of all of the reference dots 18 has been completed, the density number instruction section 94 instructs the printing section 64 to print data with the density of the reference dot $G_n$_min indicated by the minimum value dot number n_min (step S178).

To correspond to this, the printing section 64 prints the dot code 170 corresponding to the actual multimedia information on the information recording medium 12.

As a result, even if dots having different densities are recorded on the same information recording medium 12, an optimum density can be selected.

A fifth embodiment of the information recording apparatus according to the present invention will now be described.

Figure 81:
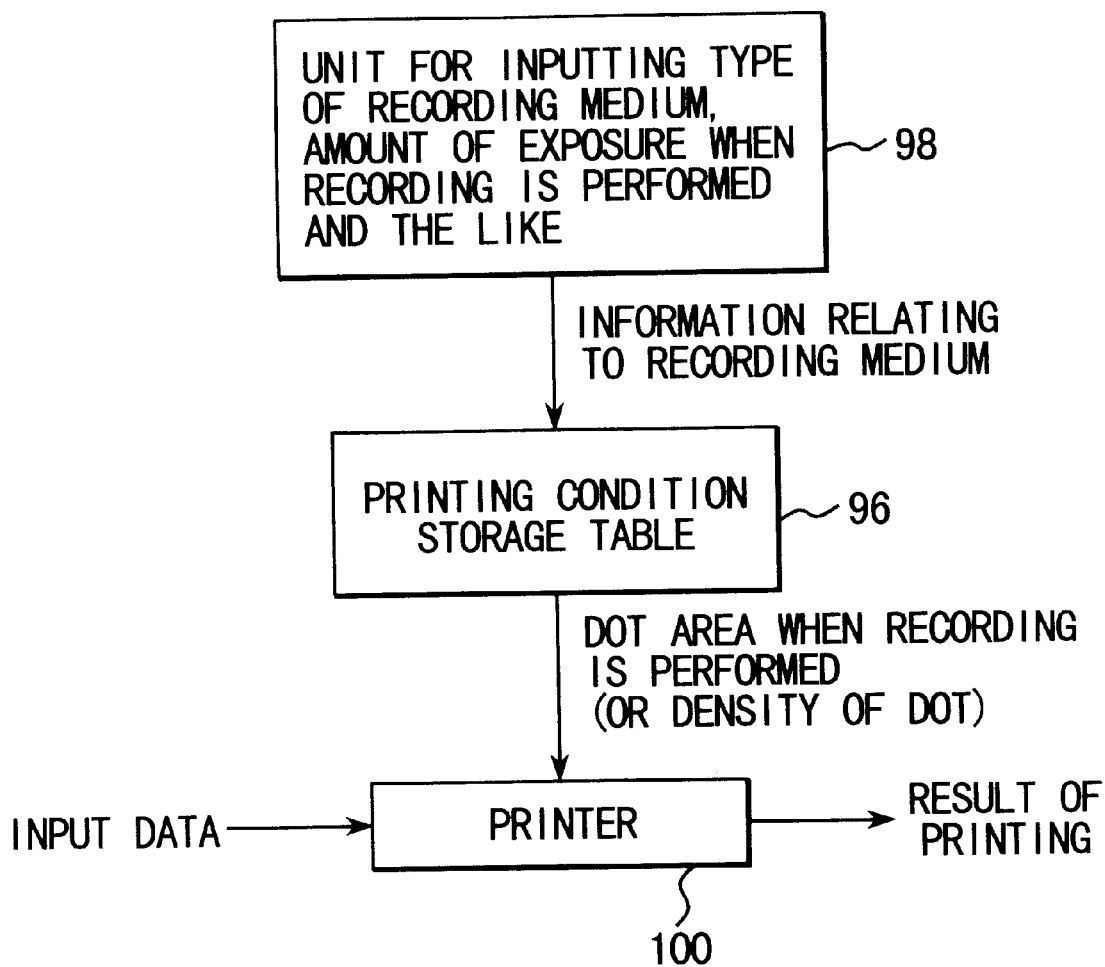
FIG. 81 is a block diagram showing a fifth embodiment of an information recording apparatus according to the present invention.

The fifth embodiment is structured such that the method according to the first to third embodiments in which the area and the density are slightly changed to perform recording and an appropriate area and density are selected is not employed. As shown in FIG. 81, information about the foregoing factors is previously stored in the printing condition storage table 96. Moreover, the dot area or the dot density corresponding to information relating to the information recording medium 12, such as the type of the information recording medium 12 and the amount of exposure at the recording operation and supplied from the input unit 98, are read from the printing condition storage table 96. Then, a printer 100 performs printing with the foregoing area or the density.

Thus, trial printing is not needed and recording can be performed with appropriate recording density or the data area.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

(1) An information reproducing system comprising:

code reading means for reading a desired dot code from an information recording medium on which multimedia information including at least any one of audio information, image information and digital code data has been recorded in the form of a dot code which can optically be read;

binarizing means for generating binarized data from an image signal corresponding to the dot code read by the code reading means; and information reproducing means for restoring binarized data generated by the binarizing means to original multimedia information to reproduce multimedia information, wherein the binarizing means includes:

reference dot detection means which binarizes the image signal with a predetermined threshold value prior to generating binarized data so as to detect a reference dot from the binarized code image;

dot area measuring means for measuring the area of the reference dot detected by the reference dot detection means;

threshold value modifying means for modifying the threshold value in such a manner that the area measured by the dot area measuring means approaches a predetermined target value; and threshold value determining means for binarizing the image signal with the threshold value modified by the threshold value modifying means.

Thus, a binarizing process can be performed to obtain dots of a desired size without dependency on expansion and contraction of the dots attributable to the recording conditions.

Even if the dot has anisotropy or whisker type noise is superimposed on the dot, the binarizing process, which cannot be performed in the case where the dot diameter is used, can effectively be performed.

(2) An information reproducing system according to (1), wherein the binarizing means binarizes the image signal read by the reading means in one of field and frame units.

Since the threshold value of the same code image obtained by measuring the reference dot area is modified so as to be again binarized, binarization can be performed in such a manner that the dot area can accurately be made coincide with the target value.

(3) An information reproducing system according to (1), wherein the code reading means successively reads the code image, and the binarizing means modifies the threshold value of the successive image signals read by the reading means in one of the previous field and previous frame in accordance with the area of the detected reference dot so as to binarize the one of the present field and present frame with the modified threshold value.

In a case where the code images are successively read over a plurality of frames, the light quantity and the recording condition are not considerably changed among the continuous frames. Therefore, the threshold value can be determined while making a reference to the value of the previous frame. As a result, a memory for storing the images can be omitted and a real time process can be performed.

(4) An information reproducing system according to (1), wherein the reference dot is one of a data dot and an insulated dot having substantially the same size and same shape as those of the data dot.

Since a dot recorded in a state approximating the state in which the data dot has been recorded is used as the reference dot or the reference dot is the insulated dot which does not interfere with another dot, the data dot can reliably be allowed to approximate a target area.

(5) An information reproducing system according to (1), wherein the dot code recorded on the information recording medium includes a data code corresponding to multimedia information and a pattern code for determining the position at which the data code is read, and the reference dot is at least a portion of the pattern code.

Since the pattern dot, which is a portion of the pattern code, is an isolated dot having the substantially the same size and the same shape as those of the data dot and the area is measured to detect the centroid for determining the position, use of a result enables the process to be performed efficiently.

Since the marker, which is a portion of the pattern code, is detected in the initial stage of the reading process and the area is measured to detect the centroid for determining the position, use of a result enables the process to be performed efficiently.

(6) An information reproducing system according to (5), wherein the dot area measuring means includes:
dot interval measuring means for measuring the distance between predetermined dots forming the pattern code; and
area correction means for correcting the area of the reference dot or the target value in accordance with the interval between dots measured by the dot interval measuring means.

Since change in the dot area occurring due to vertical movement of the camera is corrected, the area can stably be measured.

Moreover, coping with change in the magnification of the optical system can be performed and codes (50 μm or 60 μm) printed at different magnifications can be read.

(7) An information reproducing system according to (1), wherein the reference dot detection means detects a plurality of reference dots; and the dot area measuring means has average area calculating means for calculating the average area of the detected plural reference dots.

Since the average area of the plural reference dots is calculated, an influence of noise can be compensated and thus the area can be calculated more accurately.

(8) An information reproducing system according to (7), wherein the dot area measuring means has dot selection means for inhibiting input of the area of the reference into the average area calculating means in a case where the measured area of each reference dot is larger than a predetermined range.

Since the dot area calculated erroneously attributable to a stain, a patchy portion and blurring is omitted from the calculation, the average area can stably be calculated.

(9) An information reproducing system according to (1), wherein the threshold value modifying means has threshold value holding means for counting the number of reference dots detected by the reference dot detection means, determines whether or not the counted number of the reference dots satisfies a predetermined number and inhibits modification of the threshold value in a case where the counted number of reference dots is less than the predetermined number.

If a satisfactory large number of reference dots are not detected, the threshold value is not modified. Thus, deterioration in the reliability of the threshold value can be prevented.

(10) An information reproducing system according to (1), wherein the threshold value modifying means includes;
peak value detection means for detecting the maximum value and the minimum value of the luminance from a predetermined detection region;
interior division ratio modifying means for modifying the interior division ratio in accordance with the amount of modification of the interior division ratio calculated from the difference between the area measured by the dot area measuring means and the predetermined target value; and
threshold value calculating means which divides the value detected by the peak value detection means with the interior division ratio modified by the interior division ratio modifying means so as to calculate the threshold value.

As contrasted with the structure in which the threshold value is directly modified, the dot area does not depend upon the change in the quantity of illumination light, the threshold value for the binarization can stably be modified while causing the code recording condition to reflect.

(11) An information reproducing system according to (10), wherein the peak value detection means interrupts following processes for the image signal for a subject frame in one of a case where detected minimum value is larger than a predetermined first threshold value and a case where the detected maximum value is smaller than a predetermined second threshold value.

In a case where no code exists in the image or if the image of the code cannot be picked up because of insufficient quantity of illumination light, the following processes are interrupted. Thus, wasteful processes are omitted and the processing speed can be raised.

(12) An information reproducing system according to (10), wherein the peak value detection means has selective average calculating means for calculating the absolute value of the difference between pixels adjacent to a pixel of interest and for calculating the average value of the adjacent pixels only when a result of the calculation is smaller than a predetermined threshold value so that the peak values are detected from the average value of the calculated luminance.

If a defective pixel exists in the image pickup apparatus in the code reading means, detection of erroneous peak values can be prevented.

(13) An information reproducing system according to (10), wherein the interior division ratio modifying means has an interior division ratio modification amount table for determining the amount of modification of the interior division ratio in accordance with the relationship between dot area S and target value $S_t$ so as to determine amount $\Delta k$ of modification of the interior division ratio from the measured dot area and the predetermined target value in accordance with the interior division ratio modification amount table.

Since the table is used, calculations are not required. Moreover, only one operation is required to approach the optimum interior division ratio.

(14) An information reproducing system according to (10), wherein the interior division ratio modifying means calculates the amount $\Delta k$ of modification of the interior division ratio by using a predetermined coefficient α, the dot area S and the target value $S_t$ in accordance with the following equation:

$$\Delta K = \alpha(S_t - S).$$

Since a memory for storing a table is not required, only simple calculations are required and thus the size of the hardware can be reduced.

(15) An information reproducing system according to (14), wherein the predetermined coefficient α is made to be one of the same and smaller whenever modification is repeated.

Since a large coefficient is used in the initial state of the modification, the following up characteristic can be improved. In a latter half stage in which the interior division ratios have been converged, a small coefficient is used. Thus, oscillation can be prevented.

(16) An information reproducing system according to (10), wherein the interior division ratio modifying means changes the interior division ratio in a stepped manner and provides a hysteresis characteristic.

Since the interior division ratio is changed in the stepped manner, the calculations can be facilitated, and the size of the hardware can be reduced. Since the hysteresis characteristic is provided, change occurring due to noise can be restrained and binarization can stably be performed.

(17) An information reproducing system according to (10), wherein the interior division ratio modifying means has interior division ratio limit means which determines whether or not the modified interior division ratio is in a predetermined range to clip the interior division ratio in a case where the interior division ratio is out of the predetermined range.

Since the interior division ratio is clipped with the predetermined value, output of an abnormal interior division ratio occurring due to a stain, a patchy portion and blurring can be prevented and therefore stable interior division ratio can be output.

(18) An information reproducing system according to (10), wherein
   the reference dot detection means detects a plurality of reference dots, and
   the interior division ratio modifying means has interior division ratio holding means for counting the number of the detected reference dots, for determining whether or not the counted number satisfies a predetermined number and for inhibiting modification of the interior division ratio in a case where the counted number does not satisfy the predetermined number.

If a satisfactory large number of reference dots are not detected, the interior division ratio is not modified. Thus, deterioration in the reliability of the interior division ratio can be prevented.

(19) An information reproducing system according to (10), wherein
   the reading means successively reads the code images,
   the interior division ratio modifying means modifies the interior division ratio to one of a field and a frame which satisfies a predetermined condition for the successive image signals read by the reading means and holds the modified interior division ratio for one of the following field and frame.

Since the recording condition is not considerably changed during the reading operation in a case where the dot code images are continuously read, the modification of the interior division ratio with which the recording condition is corrected is completed in the first half of the frames. Thus, the following modification is inhibited so that a wasteful process is reduced and erroneous modification caused from noise is prevented.

(20) An information reproducing system according to (1), wherein
   the dot code recorded on the information recording medium has an attitude dot disposed in a predetermined region adjacent to the reading start end and including information about the information recording medium for determining the threshold value required by the binarizing means,
   the binarizing means includes:
      attitude dot detection means for detecting the attitude dot;
      attitude reading means which binarizes the image signals read by the reading means in one of field and frame units so as to read information relating the information recording medium from the attitude dot of the binarized image detected by the attitude dot detection means; and
      attitude storage means for storing information read by the attitude reading means and applying information to each of following images.

Since the attitude, such as the material of the information recording medium, the material of the recording material and the recording method can be detected prior to binarizing the code, appropriate parameter for binarization can be provided.

(21) An information reproducing system comprising;
   code reading means for reading a desired dot code from an information recording medium on which multimedia information including at least any one of audio information, image information and digital code data has been recorded in the form of a dot code which can optically be read;
   binarizing means for generating binarized data from an image signal corresponding to the dot code read by the code reading means; and
   information reproducing means for restoring binarized data generated by the binarizing means to original multimedia information to reproduce multimedia information, wherein
   the binarizing means includes:
      region dividing means for dividing the picked up screen of the dot code into a plurality of regions;
      characteristic amount extracting means for extracting the characteristic amount for binarization in region units divided by the region dividing means;
      threshold value calculating means for calculating the threshold value for binarization in accordance with the characteristic amount extracted by the characteristic amount extracting means; and
      threshold value determining means for binarizing the image signal with the threshold value calculated by the threshold value calculating means.

Therefore, a consideration can be performed that the recording condition and illumination condition are constant among regions. By extracting the characteristic amount for each region and by calculating the threshold value, influences of shading and the like can be eliminated satisfactorily.

(22) An information reproducing system according to (21), wherein
   the information recording medium has a reference region for extracting the characteristic amount, and the region dividing means divides the region in such a manner that the divided region includes at least one reference region.

Since at least one reference region is included in each region, the characteristic amount can stably be extracted.

(23) An information reproducing system according to (22), wherein the reference region is at least one of a marker and an inhibition region adjacent to the marker, and the characteristic amount extracting means extracts the characteristic amount from the region.

Since the reference region is the marker or the region adjacent to the marker, the necessity of recording the reference region individually from the code can be eliminated. Thus, the recording area can effectively be used, and the detection of the same can be facilitated.

(24) An information reproducing system according to (21), wherein the characteristic amount extracting means extracts the maximum value of the luminance in each of the divided regions.

The characteristic amount is made to be the maximum value of the luminance so that the reference region is made to be the ground color portion of the information recording medium. Since the ground color portion is widely distributed over the code, the characteristic amount can stably be extracted even if the region is divided into relatively small sections. Since the state of illumination is satisfactorily reflected on the maximum value of the luminance, the threshold value can effectively be calculated to correspond to shading.

(25) An information reproducing system according to (21), wherein the characteristic amount extracting means extracts the maximum value of the luminance of each of the divided regions as a first characteristic amount and extracts the minimum value of the luminance of the overall screen as a second characteristic amount, and the threshold value calculating means calculates the threshold value for each region from the maximum value and the minimum value of the luminance in accordance with a predetermined interior division ratio.

Since the threshold value is calculated from the maximum value and the minimum value of the luminance in accordance with the interior division ratio, the threshold value corresponding to the amount of illumination can be calculated.

Since the maximum value of the luminance is extracted for each region, coping with shading can be performed. The minimum value of the luminance which cannot stably be extracted from each region, it can be extracted from the overall screen. Thus, coping with rise in the black level occurring due to the recording condition can be performed.

(26) An information reproducing system according to (25), wherein the reading means continuously read the code images, and the minimum value of the luminance is extracted from one of the previous field and frame.

By using the minimum value from the previous field or frame, the present filed or the frame can be subjected to the binarizing process in divided region units.

(27) An information reproducing system according to (24) or (25), wherein the characteristic amount extract means has maximum value averaging means which extracts the maximum value of the luminance in each of the divided regions and which averages the extracted maximum value in at least two or more adjacent fields or frames in terms of time.

Therefore, change in the maximum value occurring due to shift of the ground color of the information recording medium can be prevented.

(28) An information reproducing system comprising:

code reading means for reading a desired dot code from an information recording medium on which multimedia information including at least any one of audio information, image information and digital code data has been recorded in the form of a dot code which can optically be read;

binarizing means for generating binarized data from an image signal corresponding to the dot code read by the code reading means; and information reproducing means for restoring binarized data generated by the binarizing means to original multimedia information to reproduce multimedia information, wherein the binarizing means includes:

peak value detection means for detecting the maximum value and the minimum value of the luminance from a predetermined detection region;

code detection means for detecting whether or not a code exists in the detection region;

minimum value replacing means for replacing the minimum value in the detection region with the minimum value of one of the previous field and frame in a case where the code detection means does not detect a code; and threshold value calculating means for calculating the threshold value for binarization for the same region of one of a next field and a next frame from the detected maximum value and the detected or replaced minimum value in accordance with a predetermined interior division ratio.

If the code is out of the detection region, the minimum value (the code level) is made to be substantially the same as the maximum value (the background level) so that setting of the threshold value to the background level is prevented. By making a reference to the background level, following up to change in the amount of illumination is enabled.

(29) An information reproducing system comprising:

code reading means for reading a desired dot code from an information recording medium on which multimedia information including at least any one of audio information, image information and digital code data has been recorded in the form of a dot code which can optically be read;

binarizing means for generating binarized data from an image signal corresponding to the dot code read by the code reading means; and information reproducing means for restoring binarized data generated by the binarizing means to original multimedia information to reproduce multimedia information, wherein the binarizing means includes:

peak value detection means for detecting the maximum value and the minimum value of the luminance from a predetermined detection region;

code detection means for detecting whether or not a code exists in the detection region;

minimum value replacing means for replacing the minimum value in the detection region with the minimum value of the adjacent detection region in a case where the code detection means does not detect a code; and threshold value calculating means for calculating the threshold value for binarization for the same region of one of a next field and a next frame from the detected maximum value and the detected or replaced minimum value in accordance with a predetermined interior division ratio.

If the code is out of the detection region, the minimum value (the code level) is made to be substantially the same as the maximum value (the background level) so that setting of the threshold value to the background level is prevented. By making a reference to the background level, following up to change in the amount of illumination is enabled.

(30) An information reproducing system according to (28) or (29), wherein the code detection means has peak ratio determining means for determining whether or not the ratio of peak values detected by the peak value detection means is larger than a predetermined value.

By using a known peak, whether or not a code exists can reliably be determined with a simple process.

(31) An information recording medium for use in an information reproducing system having code reading means for reading a desired dot code from an information recording medium on which multimedia information including at least any one of audio information, image information and digital code data has been recorded in the form of a dot code which can optically be read; binarizing means for generating binarized data from an image signal corresponding to the dot code read by the code reading means; and information reproducing means for restoring binarized data generated by the binarizing means to original multimedia information to reproduce multimedia information, the information recording medium comprising:

data dots which correspond to the contents of multimedia information and which can optically be read; and a reference dot arranged to be detected by the binarizing means and serving as a reference when the threshold value is modified to allow the area of the detected dot to approach a predetermined target value.

Thus, binarization to which the dot area is accurately reflected can be performed without dependency upon expansion and contraction of dots attributable to the recording condition.

(32) An information recording medium for use in an information reproducing system having code reading means for reading a desired dot code from an information recording medium on which multimedia information including at least any one of audio information, image information and digital code data has been recorded in the form of a dot code which can optically be read; binarizing means for generating binarized data from an image signal corresponding to the dot code read by the code reading means; and information reproducing means for restoring binarized data generated by the binarizing means to original multimedia information to reproduce multimedia information, the information recording medium comprising:

data dots which correspond to the contents of multimedia information and which can optically be read; and a reference dot serving as a reference when the binarizing means detects the maximum value and the minimum value of the image signal level corresponding to the dot code, detects a dot from a code data binarized by a threshold value calculated from the maximum vale and the minimum value in accordance with a predetermined interior division ratio and modifies the interior division ratio in such a manner that area of the detected dot approaches a predetermined target value.

Thus, binarization to which the dot area is accurately reflected can be performed without dependency upon expansion and contraction of dots attributable to the recording condition and upon the state of illumination when an image is picked up.

(33) An information recording medium according to (31) or (32), wherein a plurality of the reference dots are recorded in an image pickup region.

The plural reference dots are arranged to be detected in the image pickup region. The binarizing means calculates the average area of the plural reference dots. Thus, the influence of noise can be eliminated and the area can be calculated further accurately.

(34) An information recording medium according to (32), wherein the information recording medium has a reference region for use when the binarizing means extracts the characteristic amount for binarization.

Since the reference region exists individually from the code, the characteristic amount can stably be extracted.

(35) An information recording medium according to (31) or (32), wherein the information recording medium has dot interval measuring dots for measuring a dot interval for correcting at least one of the area of the reference dot detected by the binarizing means and the predetermined target value.

By measuring the distance between predetermined dots, the image pickup magnification and a state of distortion can be detected. Thus, the dot area or the target value is corrected in accordance with the detected states so that binarization is performed to cope with the change in the magnification and distortion.

(36) An information recording apparatus for recording multimedia information including at least any one of audio information, image information and digital code data in the form of a dot code which can optically be read, comprising:

reference dot recording means for recording at least two types of reference dots having at least different areas of shapes;

reference dot reading means for reading the reference dots recorded by the reference dot recording means to binarize the read reference dots;

reference dot selection means for subjecting the area of each reference dot read by the reference dot reading means and a predetermined reference value to a comparison to select a reference dot having the different smaller than a predetermined threshold value; and recording means for recording a dot code corresponding to multimedia information in accordance with the reference dot selected by the reference dot selection means.

Thus, dots can stably be recorded in such a manner that the area of the binarized dot is made to be predetermined reference value.

(37) An information recording apparatus according to (36), wherein at least two or more types of the reference dots are recorded in such a manner that at least one of the area and the shape is different at each of predetermined steps of a minimum resolving power of the information recording apparatus.

Thus, dots can selectively be recorded with the optimum dot area and shape at the minimum steps which can be recorded by the information recording apparatus.

(38) An information recording apparatus for recording multimedia information including at least any one of audio information, image information and digital code data in the form of a dot code which can optically be read, comprising:

reference dot recording means for recording reference dots having different recording densities;

reference dot reading means for reading the reference dots recorded by the reference dot recording means to binarize the read reference dots;

recording density adjustment means for subjecting the area of each of the reference dots read by the reference dot reading means and a predetermined reference value to a comparison to adjust the recording density in such a manner that the difference is smaller than a predetermined threshold value; and recording means for recording a dot code corresponding to multimedia information in accordance with the recording density adjusted by the recording density adjustment means.

Thus, dots can stably be recorded in such a manner that the area of the binarized dot is made to be predetermined reference value.

(39) An information recording apparatus for recording multimedia information including at least any one of audio information, image information and digital code data in the form of a dot code which can optically be read, comprising:

reference dot recording means for recording at least two or more types of reference dots having different recording densities;

reference dot reading means for dividing a picked up screen in such a manner that only one reference dot recorded by the reference dot recording means is included in a divided region and binarizing each divided region to read the reference dot to binarize the reference dot;

density selection means for subjecting the area of each reference dot read by the reference dot reading means and a predetermined reference value to a comparison and for selecting the density of the reference dot having the difference smaller than a predetermined threshold value; and recording means for recording a dot code corresponding to multimedia information in accordance with the recording density selected by the density selection means.

Even if dots having different densities are recorded on the same information recording medium, optimum density can be selected.

(40) An information recording apparatus for recording multimedia information including at least any one of audio information, image information and digital code data in the form of a dot code which can optically be read, comprising:

input means for inputting information relating to the information recording medium;

storage means for storing the relationship between information relating to a predetermined information recording medium and one of the area of the dot when data is recorded and the recording density; and means for reading corresponding one of the dot area and the recording density from the storage means in accordance with information input by the input means and relating to the information recording medium so as to record a dot code corresponding to multimedia information in accordance with the one of the dot area and the recording density.

Trial printing is not required to record information with appropriate recording density or dot area.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

I claim:

1. An information reproducing system comprising:

code reading means for reading a desired dot code from an information recording medium on which multimedia information including at least any one of audio information, image information and digital code data has been recorded in the form of a dot code which can optically be read;

binarizing means for generating binarized data from an image signal corresponding to the dot code read by said code reading means; and information reproducing means for restoring binarized data generated by said binarizing means to original multimedia information to reproduce multimedia information, wherein said binarizing means includes:

reference dot detection means which binarizes the image signal with a predetermined threshold value prior to generating binarized data so as to detect a reference dot from the binarized code image;

dot area measuring means for measuring the area of the reference dot detected by said reference dot detection means;

threshold value modifying means for modifying the threshold value in such a manner that the area measured by said dot area measuring means approaches a predetermined target value; and threshold value determining means for binarizing the image signal with the threshold value modified by said threshold value modifying means.

2. An information reproducing system according to claim 1, wherein said binarizing means binarizes the image signal read by said reading means in one of field and frame units.

3. An information reproducing system according to claim 1, wherein said code reading means successively reads the code image, and said binarizing means modifies the threshold value of the successive image signals read by said reading means in one of the previous field and previous frame in accordance with the area of the detected reference dot so as to binarize the one of the present field and present frame with the modified threshold value.

4. An information reproducing system according to claim 1, wherein the reference dot is one of a data dot and an insulated dot having substantially the same size and same shape as those of the data dot.

5. An information reproducing system according to claim 1, wherein the dot code recorded on said information recording medium includes a data code corresponding to multimedia information and a pattern code for determining the position at which the data code is read, and the reference dot is at least a portion of the pattern code.

6. An information reproducing system according to claim 5, wherein said dot area measuring means includes:

dot interval measuring means for measuring the distance between predetermined dots forming the pattern code; and area correction means for correcting the area of the reference dot or the target value in accordance with the interval between dots measured by said dot interval measuring means.

7. An information reproducing system according to claim 1, wherein said reference dot detection means detects a plurality of reference dots; and said dot area measuring means has average area calculating means for calculating the average area of the detected plural reference dots.

8. An information reproducing system according to claim 7, wherein
said dot area measuring means has dot selection means for inhibiting input of the area of the reference into said average area calculating means in a case where the measured area of each reference dot is larger than a predetermined range.

9. An information reproducing system according to claim 1, wherein
said threshold value modifying means has threshold value holding means for counting the number of reference dots detected by said reference dot detection means, determines whether or not the counted number of the reference dots satisfies a predetermined number and inhibits modification of the threshold value in a case where the counted number of reference dots is less than the predetermined number.

10. An information reproducing system according to claim 1, wherein
said threshold value modifying means includes;
peak value detection means for detecting the maximum value and the minimum value of the luminance from a predetermined detection region;
interior division ratio modifying means for modifying the interior division ratio in accordance with the amount of modification of the interior division ratio calculated from the difference between the area measured by said dot area measuring means and the predetermined target value; and
threshold value calculating means which divides the value detected by said peak value detection means with the interior division ratio modified by said interior division ratio modifying means so as to calculate the threshold value.

11. An information reproducing system according to claim 10, wherein said peak value detection means interrupts following processes for the image signal for a subject frame in one of a case where detected minimum value is larger than a predetermined first threshold value and a case where the detected maximum value is smaller than a predetermined second threshold value.

12. An information reproducing system according to claim 10, wherein said peak value detection means has selective average calculating means for calculating the absolute value of the difference between pixels adjacent to a pixel of interest and for calculating the average value of the adjacent pixels only when a result of the calculation is smaller than a predetermined threshold value so that the peak values are detected from the average value of the calculated luminance.

13. An information reproducing system according to claim 10, wherein said interior division ratio modifying means has an interior division ratio modification amount table for determining the amount of modification of the interior division ratio in accordance with the relationship between dot area S and target value $S_t$ so as to determine amount $\Delta k$ of modification of the interior division ratio from the measured dot area and the predetermined target value in accordance with said interior division ratio modification amount table.

14. An information reproducing system according to claim 10, wherein said interior division ratio modifying means calculates the amount $\Delta k$ of modification of the interior division ratio by using a predetermined coefficient $\alpha$, the dot area S and the target value $S_t$ in accordance with the following equation:

$$\Delta K = \alpha(S_t - S).$$

15. An information reproducing system according to claim 14, wherein the predetermined coefficient $\alpha$ is made to be one of the same and smaller whenever modification is repeated.

16. An information reproducing system according to claim 10, wherein said interior division ratio modifying means changes the interior division ratio in a stepped manner and provides a hysteresis characteristic.

17. An information reproducing system according to claim 10, wherein said interior division ratio modifying means has interior division ratio limit means which determines whether or not the modified interior division ratio is in a predetermined range to clip the interior division ratio in a case where the interior division ratio is out of the predetermined range.

18. An information reproducing system according to claim 10, wherein
said reference dot detection means detects a plurality of reference dots, and
said interior division ratio modifying means has interior division ratio holding means for counting the number of the detected reference dots, for determining whether or not the counted number satisfies a predetermined number and for inhibiting modification of the interior division ratio in a case where the counted number does not satisfy the predetermined number.

19. An information reproducing system according to claim 10, wherein
said reading means successively reads the code images,
said interior division ratio modifying means modifies the interior division ratio to one of a field and a frame which satisfies a predetermined condition for the successive image signals read by said reading means and holds the modified interior division ratio for one of the following field and frame.

20. An information reproducing system according to claim 1, wherein
the dot code recorded on said information recording medium has an attitude dot disposed in a predetermined region adjacent to the reading start end and including information about said information recording medium for determining the threshold value required by said binarizing means,
said binarizing means includes:
attitude dot detection means for detecting the attitude dot;
attitude reading means which binarizes the image signals read by said reading means in one of field and frame units so as to read information relating said information recording medium from the attitude dot of said binarized image detected by said attitude dot detection means; and
attitude storage means for storing information read by said attitude reading means and applying information to each of following images.

21. An information recording medium for use in an information reproducing system having code reading means for reading a desired dot code from an information recording medium on which multimedia information including at least any one of audio information, image information and digital code data has been recorded in the form of a dot code which can optically be read; binarizing means for generating binarized data from an image signal corresponding to the dot code read by said code reading means; and information reproducing means for restoring binarized data generated by said binarizing means to original multimedia information to reproduce multimedia information, said information recording medium comprising:

- data dots which correspond to the contents of multimedia information and which can optically be read; and
- a reference dot arranged to be detected by said binarizing means and serving as a reference when the threshold value is modified to allow the area of the detected dot to approach a predetermined target value.

22. An information recording medium according to claim 21, wherein a plurality of the reference dots are recorded in an image pickup region.

23. An information recording medium according to claim 21, wherein said information recording medium has dot interval measuring dots for measuring a dot interval for correcting at least one of the area of the reference dot detected by said binarizing means and the predetermined target value.

24. An information recording apparatus for recording multimedia information including at least any one of audio information, image information and digital code data in the form of a dot code which can optically be read, comprising:

- input means for inputting information relating to said information recording medium;
- storage means for storing the relationship between information relating to a predetermined information recording medium and one of the area of the dot when data is recorded and the recording density; and
- means for reading corresponding one of the dot area and the recording density from said storage means in accordance with information input by said input means and relating to said information recording medium so as to record a dot code corresponding to multimedia information in accordance with the one of the dot area and the recording density.

* * * * *